US011434904B2

(12) United States Patent
Dalmas, II et al.

(10) Patent No.: US 11,434,904 B2
(45) Date of Patent: Sep. 6, 2022

(54) VARIABLE VOLUME CHAMBER DEVICE

(71) Applicant: Quest Engines, LLC, Coopersburg, PA (US)

(72) Inventors: Elario Dino Dalmas, II, Macungie, PA (US); Roy A. Blom, Coopersburg, PA (US)

(73) Assignee: QUEST ENGINES, LLC, Coopersburg, PA (US)

( * ) Notice: Subject to any disclaimer, the term of this patent is extended or adjusted under 35 U.S.C. 154(b) by 0 days.

(21) Appl. No.: 16/908,871

(22) Filed: Jun. 23, 2020

(65) Prior Publication Data

US 2020/0325895 A1    Oct. 15, 2020

Related U.S. Application Data

(63) Continuation-in-part of application No. 15/965,009, filed on Apr. 27, 2018, now Pat. No. 10,724,428, which is a continuation-in-part of application No. 15/934,625, filed on Mar. 23, 2018, now Pat. No. 10,526,953, and a continuation-in-part of application No. 15/934,742, filed on Mar. 23, 2018, and a continuation-in-part of application No. 15/936,713, filed on Mar. 27, 2018, now Pat. No. 10,590,834, and a continuation-in-part of application No. 15/937,293,
(Continued)

(51) Int. Cl.
*F01C 1/44*     (2006.01)
*F04C 14/22*    (2006.01)
*F04C 2/32*     (2006.01)
*F01C 21/08*    (2006.01)

(52) U.S. Cl.
CPC .......... *F04C 2/321* (2013.01); *F01C 21/0836* (2013.01); *F04C 14/226* (2013.01)

(58) Field of Classification Search
CPC ...... F02B 2730/013; F01C 1/44; F01C 1/352; F01C 1/328; F01C 1/332; F01C 1/336; F04C 14/226
See application file for complete search history.

(56) References Cited

U.S. PATENT DOCUMENTS 4,354,462 A * 10/1982 Kuechler .............. F01C 11/004
                                                            123/241
6,718,938 B2    4/2004 Szorenyi
(Continued)

FOREIGN PATENT DOCUMENTS

WO    2006046027 A1    5/2006
WO    2007065976 A1    6/2007
(Continued)

*Primary Examiner* — Long T Tran
(74) *Attorney, Agent, or Firm* — David R Yohannan; Yohannan Law

(57) ABSTRACT

A variable volume chamber device is disclosed. The chambers may be defined by the space between four pivotally connected vanes contained within a housing. The vanes may be connected so as to create a sealed interior chamber that may be used as a combustion chamber in an internal combustion engine, or as a pumping chamber in a pump or compressor. The four-vane assembly may also form additional variable volume chambers between the vanes and a surrounding structure. The plurality of variable volume chambers may be interconnected to progressively act on a working fluid.

23 Claims, 34 Drawing Sheets

Related U.S. Application Data filed on Mar. 27, 2018, now Pat. No. 10,989,138, and a continuation-in-part of application No. 15/938,130, filed on Mar. 28, 2018, now Pat. No. 10,590,813, and a continuation-in-part of application No. 15/938,427, filed on Mar. 28, 2018, now Pat. No. 10,753,308, and a continuation-in-part of application No. 15/941,397, filed on Mar. 30, 2018, now Pat. No. 10,598,285.

(60) Provisional application No. 62/491,629, filed on Apr. 28, 2017, provisional application No. 62/501,318, filed on May 4, 2017.

(56) References Cited

U.S. PATENT DOCUMENTS

| | | |
|---|---|---|
| 8,037,862 B1 | 10/2011 | Jacobs |
| 8,714,135 B2 | 5/2014 | Anderson et al. |
| 8,776,759 B2 | 7/2014 | Cruz |
| 8,863,724 B2 | 10/2014 | Shkolnik et al. |
| 9,528,434 B1 * | 12/2016 | Thomassin ............. F02B 53/02 |
| 2010/0224165 A1 * | 9/2010 | Nagy ........................ F01C 3/06 |
| | | 123/205 |
| 2016/0252010 A1 * | 9/2016 | Villeneuve ............ F01C 21/106 |
| | | 123/209 |
| 2017/0328274 A1 * | 11/2017 | Schulz ................... F02B 19/12 |

FOREIGN PATENT DOCUMENTS

| | | |
|---|---|---|
| WO | 2010118518 A1 | 10/2010 |
| WO | 2016145247 A1 | 9/2016 |

* cited by examiner

VARIABLE VOLUME CHAMBER DEVICE

CROSS REFERENCE TO RELATED APPLICATIONS

This application relates to, is a continuation in part of, and claims the priority of U.S. patent application Ser. No. 15,965,009 filed Apr. 27, 2018.

FIELD OF THE INVENTION

The present invention relates generally to devices having variable volume chambers such as, but not limited to, internal combustion engines, fluid pumps and compressors.

BACKGROUND OF THE INVENTION

Many internal combustion engines generate power using cooperative engine cylinder and piston arrangements that define a variable volume chamber for combustion events. Alternatively, cylinder and rotor arrangements are used to harness energy from combustion events. The motion of the engine pistons or the rotors may be used to intake or scavenge an air-fuel mixture or strictly air charge (in fuel injected engines) for combustion and expel spent exhaust gases in multicycle operations, such as, for example, in 2-cycle and 4-cycle operations. There are many inefficiencies in both piston and rotor type internal combustion engines which it would be beneficial to decrease or eliminate. Such inefficiencies may result, at least in part, from the nature of the variable volume chamber used to generate power from combustion events.

For example, the pistons in a piston type engine must constantly accelerate, travel, deaccelerate, stop, and reverse their motion in the region of bottom dead center and top dead center positons to create a variable volume chamber. While this constantly reversing pumping motion of the piston produces a variable volume chamber formed between the piston head and the surrounding cylinder, it eliminates conservation of momentum, thereby reducing efficiency. Accordingly, there is a need for engines and methods of engine operation that use variable volume combustion chambers while preserving at least some of the momentum built up through repeated combustion events.

Rotary engines are known for their superior mechanical efficiency as compared with piston type engines due to the fluid, non-stop motion of the rotary engine elements that preserve momentum. However, engine efficiency and power may also be a function of the mass of air in the combustion chamber. The air mass that can be loaded into the combustion chamber is a function of the pressure differential between the combustion chamber and the intake air source (e.g., manifold) during the intake cycle, as well as the effective size and flow characteristics of the intake port, and the duration of the intake cycle event. Piston type engines take advantage of a variable volume combustion chamber to further increase the pressure of a combustion charge by decreasing the volume of the chamber once it is loaded with the charge. Increasing any one or more of the combustion charge pressure, the effective size and/or flow profile of the intake port, and/or the effective intake cycle duration, will tend to increase air mass in the combustion chamber, and thus improve efficiency and power. Rotary type engines are less able to compress a combustion charge as compared with a piston type engine, decreasing efficiency as a result. Accordingly, there is a need for engines and methods of engine operation that increase and/or improve combustion charge pressure, intake port size and flow, and/or intake event duration, while at the same time improving upon the preservation of engine momentum.

One method of increasing combustion charge pressure is to use a turbocharger or a supercharger to boost the pressure of intake air supplied for the combustion process. Existing turbochargers and superchargers add weight, cost, and complexity when they utilize add-on elements that are otherwise unneeded for engine operation. Accordingly, there is a need for engines and methods of engine operation that use combustion generating components to also supercharge the intake air supply, thereby eliminating or reducing the need for dedicated supercharging add-on components.

Rotary engines, such as a Wankel rotary engine, have other advantages over reciprocating piston engines, such as: fewer components resulting from elimination of the valve train; lower vibration due to the elimination of reciprocating mass; lower weight and size for the power output; and smoother power delivery into a higher RPM range. However, Wankel rotary engines are not optimal in terms of fuel economy due to lower combustion chamber compression ratios, or in terms of emissions due to the more complete and faster combustion in piston engines. Accordingly, there is a need for engines and methods of engine operation that provide one or more of the benefits of both rotor type and piston type engines at the same time.

Existing piston type and rotor type engines almost universally require liquid lubricant, such as engine oil, to lubricate the interface between the piston or rotor and the cylinder within which it moves. Lubrication systems are usually mission critical and the failure of a lubrication system can be catastrophic. The need for a lubricant brings with it many disadvantages. The lubricant wears out and becomes contaminated over time, and thus requires replacement, adding expense and inconvenience to engine operation. Many lubricants require pumps and passages to reapply the lubricant to moving parts. Pumps and passages, and other elements of an active lubrication system need to operate correctly and require seals between interconnected elements. Lubrication system leaks naturally occur as seals deteriorate over time, and pumps leak and wear out, adding still further maintenance expense and inconvenience to engine operation. Leaks can also permit lubricant to enter the combustion chamber, interfering with combustion, and fouling injectors and spark or glow plugs. Lubricant in the combustion chamber can also result in unwanted exhaust emissions. Leaks can also result in the contamination of the lubricant with combustion by-products. All of the foregoing issues are attendant to the use of lubricants, and all add failure modes and maintenance costs. Accordingly, there is a need for internal combustion engines and methods of engine operation that depend less, or not at all, on lubricants.

The ability to limit or eliminate the use of lubricants in an engine may be a function of the sealing area for the combustion chamber. A larger sealing area for a given pressure difference across the seal permits the use of less effective seals, or produces a stronger sealing action and longer seal life. A larger seal area may also eliminate or reduce the prevalence of chamber hot spots and heat transfer issues, and permit better utilization of the thermodynamic energy produced. Accordingly, there is a need for internal combustion engines and methods of engine operation that include larger seal areas for a given combustion chamber displacement.

Two additional factors which impact engine efficiency are flame front propagation during combustion of fuel, and effective force transfer from the expansion of combustion gases to the piston used to generate power. Improved flame front propagation may provide more complete combustion and thus enhance fuel economy. Improved force transfer from combustion expansion may also improve fuel economy. Accordingly, there is a need for engines with superior flame front propagation and force transfer from expanding combustion gasses to the power generating elements.

Internal combustion engines generate waste heat as a matter of course which is dumped into the ambient environment using one or more cooling systems such as radiators and exhaust systems. Waste heat is by definition not used to generate output power and thus represents a form of inefficiency. Accordingly, there is a need for internal combustion engines which utilize what would otherwise be waste heat to generate positive power.

Boosting the pressure of air in internal combustion engines may benefit efficiency in many respects. Superchargers provide one means for boosting air pressures, however, they add cost and weight, take up space, and require maintenance. Accordingly, there is a need for superchargers that are superior to existing superchargers in terms of cost, weight, space utilization, and maintenance requirements.

The variable volume chamber of a piston type internal combustion engine may be used in non-engine applications to provide a fluid pump or compressor. However, the efficiency of piston type pumps and compressors is reduced for many of the same reasons that the efficiency of piston type engines is sub-optimal. For example, the lack of preservation of piston momentum negatively affects the efficiency of piston type pumps and compressors.

Accordingly, there is a need for pumps and compressors that avoid one or more of the disadvantages of known piston type pumps and compressors.

Internal combustion engines are heat engine machines which convert resulting thermal- and pressure-based energy from the chemical combustion of fuel into usable work. If gases are heated during intake, this causes a less dense charge to be loaded which requires less fuel. This consequently makes less heat and pressure during combustion. Accordingly, there is a need for internal combustion engines that have greater separation for the cold and hot potions of the combustion cycle to preserve charge density.

Post-combustion pressure may be lost to combustion chamber cooling which decreases harnessed work and therefore total thermal efficiency of an internal combustion engine. Accordingly, there is a need to have an internal combustion engine with a different cooling rate and/or strategy for the cold and hot portions of the combustion cycle.

Internal combustion engines require precise timing and control of the combustion chemical reaction. The fuel must be ignited at precisely the correct time for peak efficiency and not prematurely by engine hot spots created during the previous combustion cycle, such as by hot exhaust valves or spark plugs. This may be important when using fuels with low minimum energy ignition, such as Hydrogen. It also may be important for low minimum ignition energy air to fuel ratios, such as in engines utilizing increased intake air pressures. Accordingly, there is a need for internal combustion engines in which fewer hot components are presented to the incoming charge until the charge is near or at combustion.

NOx emissions are known to be increased by hot spots within an internal combustion engine's combustion chamber. These hot spots may be components which are exposed to combustion temperatures and not cooled, such as hot exhaust valves and spark plug ground electrodes. Accordingly, there is a need to have an internal combustion engine with reduced exposure to hot spots during the combustion cycle.

Internal combustion engines with NOx emissions above regulated thresholds must be treated by a catalytic converter in the exhaust system. Catalytic converter systems have a high initial investment cost and replacement cost. Accordingly, there is a need to have an internal combustion engine with reduced or eliminated NOx emissions before treatment by a catalytic converter.

Internal combustion engines may be operated most efficiently using an Engine Control Unit (ECU). Advanced ECUs allow monitoring of process variables, control of ignition timing, control of valve timing, control of fuel delivery, and direct monitoring of the combustion process within the combustion chamber. Accordingly, there is a need for internal combustion engines that are compatible with available ECUs and sensors.

Internal combustion engines may be operated most efficiently when given greater control over charge loading for changing operating conditions. Variable valve actuation (VVA) allows for the adjustment of charge loading for differing RPMs and load conditions. It allows ECUs to have another process control which may effectively increase efficiency of the engine. Accordingly, there is a need for internal combustion engines that are compatible with available variable valve actuation.

Internal combustion engines with variable valve timing tend to require more complex mechanisms which increase manufacturing cost, initial consumer cost, and maintenance cost. Accordingly, there is a need for internal combustion engines with simpler variable valve actuation mechanisms.

Internal combustion engine cycle to cycle combustion variance may be reduced by a strong induced swirl during intake. Accordingly, there is a need to have an internal combustion engine with an available method(s) to induce a strong enough swirl during the intake portion of the combustion cycle.

Internal combustion engines may benefit from reinforcing swirl during component movement in the compression phase of the cycle. Accordingly, there is a need to have an internal combustion engine with component movements which induce a strong reinforcing swirl during the combustion cycle.

Internal combustion engines may benefit from cooperatively directed sink flows to maintain swirl during expansion. Accordingly, there is a need to have an internal combustion engine with movements which reinforce swirl during the expansion phase of the combustion cycle.

Wankel-style rotary internal combustion engines have the undesirable effect of the outer surfaces dragging on the advancing charge. This may create a constant leading sink flow and a trailing vortex flow which tends to stifle overall ordered charge swirl. This may create a pronounced and continuing quenching effect along the stator surfaces, which may lead to significant amounts of unburnt hydrocarbons due to incomplete combustion. Accordingly, there is a need to have a rotary-style internal combustion engine with minimal flame front quenching effects.

Lean-burn internal combustion engines are designed to produce lower levels of harmful emissions. This is accomplished by using cooled EGR, less fuel, high mixture swirl, and more precise combustion monitoring/control which results in a more complete burning inside the engine combustion chamber(s). Accordingly, there is a need to have an internal combustion engine with lean burn capabilities to reduce harmful emissions.

Nearly stationary flame fronts may produce the most complete burn of fuels in a combustion chemical reaction. These flame front burn methods are usually only observed in jet engines which struggle to obtain high compression ratios. Accordingly, there is a need to have an internal combustion engine with higher compression ratios and more stationary flame fronts.

Internal combustion engines may be designed to operate in one or more thermal operation cycles, such as Otto, Diesel, Atkinson, Miller, and more recently Brayton. Each thermal cycle has different conditions and different efficiency limits for different operating conditions. Accordingly, there is a need to provide an internal combustion engine that allows implementation for one or more thermal cycles during operation to maintain peak efficiency under more operating conditions.

Four-cycle piston internal combustion engines produce power strokes every other crank shaft rotation. Four-cycle Wankel-style rotary internal combustion engines produce power strokes every crankshaft rotation, which increases the power to weight ratio of the engine. Accordingly, there is a need to have a 4-cycle internal combustion engine with a high number of power strokes per crankshaft rotation.

Two-cycle piston internal combustion engines produce power strokes every crank shaft rotation. Two-cycle Wankel-style rotary internal combustion engines produce two power strokes every crankshaft rotation, which increases the power to weight ratio of the engine. Accordingly, there is a need to have a 2-cycle internal combustion engine with a high number of power strokes per crankshaft rotation.

Internal combustion engines require appropriate intake of the charge and exhaust of the combusted products out of the combustion chamber. Accordingly, there is a need for a method to determine the shape and size of optimal ports/valves when designing or modifying internal combustion engines.

Piston internal combustion engines utilizing offset crankshafts may increase the efficiency of conversion of pressure into work by adjusting the angle at which the force is applied to the crankshaft. Similarly, twin crankshaft piston engines may increase efficiency by balancing opposing forces to obtain more work output. Accordingly, there is a need for an internal combustion engine which takes advantage of both an offset and dual crankshaft.

Piston-based internal combustion engines tend to have many design layout geometries available to configure the engine design to available space requirements. This may determine the layout of the engine block and to some extent assist in determining the crankshaft type. The crankshaft may determine piston movements, firing order, maximum RPM, vibration characteristics, and exhaust sound characteristics. Inline and Boxer piston engine block layouts tend to be paired with flat plane crankshafts, while V-style or W-style block layouts tend to have higher numbers of cross-plane crankshafts implemented. Wankel-style rotary engines are traditionally laid out only inline and do not have this ability without severely redesigning the mechanism. Accordingly, there is a need for internal combustion engines with layout design flexibility.

Boxer-style opposing piston internal combustion engines may have better primary and secondary balance and offer a lower center of gravity than other piston configurations. These engines require less counter-weights on the crankshaft and allow for a shorter more rigid crankshaft. However, this configuration induces a rocking couple due to the opposing pistons not being directly in alignment. Accordingly, there is a need for an improved opposing chamber internal combustion engine configuration using simpler mechanisms with less vibration and balance issues.

Twin crankshaft internal combustion engines usually employ two crankshafts in counter-rotating directions. This assists with some balancing forces but necessitates using more expensive gears or a more complex chain setup to transfer the generated power out of the engine. Accordingly, there is a need for a simplified twin crankshaft configuration of an internal combustion engine using opposing side-lobe counterweights to allow adequate balancing and simplify the power output mechanism.

OBJECTS OF THE INVENTION

Accordingly, it is an object of some, but not necessarily all embodiments of the present invention to provide engines and methods of engine operation that preserve at least some of the momentum of the moving parts built up through repeated combustion events. The use of interconnected pivoting vanes to define variable volume chambers used for combustion, supercharging and/or heat engine functions may permit built up momentum to be preserved.

It is also an object of some, but not necessarily all, embodiments of the present invention to provide engines with the advantages of rotary engines without the disadvantage of having relatively lower combustion chamber compression ratios. The use of interconnected pivoting vanes to define a variable volume combustion chamber can provide compression ratios that are comparable to or exceed those attained with piston type engines, and that exceed those achieved with known rotor type engines.

It is also an object of some, but not necessarily all, embodiments of the present invention to provide engines and methods of engine operation that increase and/or improve intake air pressure using existing engine components and avoiding the need for dedicated add-on turbochargers or superchargers. Embodiments of the invention may use interconnected pivoting vanes to define a combustion chamber, and may provide internal superchargers that utilize the same interconnected pivoting vanes that are used for combustion to define variable volume supercharger chambers. This permits previously underutilized space to be more efficiently employed to benefit engine power. Locating internal superchargers directly within the engine may reduce associated power losses due to pumping and power transfer when compared with an externally located supercharger driven by pulleys, belts, or gears from a crankshaft output.

It is also an object of some, but not necessarily all embodiments of the present invention to provide engines, and methods of engine operation that provide the benefits of rotary type engines, while at the same time providing desired levels of combustion charge compression. Such benefits may include one or more of: fewer components, elimination of certain valves, lower vibration, lower weight and size, higher RPM capability, and smoother power delivery. Embodiments of the invention may use interconnected pivoting vanes to define one or more variable volume chambers that generally follow a smooth curved motion path providing many, if not all, the benefits of rotary type engines while also providing for desired levels of combustion charge compression.

It is also an object of some, but not necessarily all embodiments of the present invention to provide engines, and methods of engine operation that depend less on the use of lubricants, such as oil. It is also an object of some, but not necessarily all embodiments of the present invention to provide engines and methods of engine operation that limit or prevent the infiltration of oil into the combustion and supercharging chambers, thereby reducing objectionable emissions. By removing oil from the system, where practical, the oil aerosols are eliminated from the exhaust gasses, thereby preventing oil and oil by-product accumulation on the valves, injectors, spark plugs, turbochargers, catalytic converters, and other engine system components. It is also an object of some, but not necessarily all embodiments of the present invention to provide engines and methods of engine operation that limit or prevent the infiltration of combustion by products and by-products into the oil, which can introduce carbon particles, unspent hydro-carbons, and other particulates which can contaminate and modify the pH of the oil. Reducing or eliminating these oil contamination sources may prevent oil system corrosion and prolong the oil service life thereby decreasing required maintenance costs and decreasing ancillary oil handling, stocking, and recycling costs. Embodiments of the invention may use interconnected pivoting vanes that move relative to adjacent walls while maintaining a seal equivalent with such walls without the use of lubricants to achieve one or more of the foregoing objects. The pivoting vanes and/or the adjacent walls may be provided with fields of pockets that form a sealing system without the need for lubricants. The pivoting vanes may also provide a greater sealing area as compared with alternatives, which may make the non-lubricant sealing system more viable.

It is also an object of some, but not necessarily all embodiments of the present invention to provide engines, and methods of engine operation that provide desirable levels of flame front propagation and/or force transfer from expanding combustion gasses to power generating elements. To this end, embodiments of the invention may use interconnected pivoting vanes that promote optimal and/or shortened flame front propagation during combustion. The pivoting vanes may also permit the use of multiple spark plugs and improved spark plug location vis-à-vis the combustion charge and power generating elements.

It is also an object of some, but not necessarily all embodiments of the present invention to provide engines, and methods of engine operation that capture energy from what would otherwise be waste heat, and use such energy for power generation. Embodiments of the invention may use interconnected pivoting vanes to define a heat engine to capture waste heat energy and use it for power generation. Further, the interconnected pivoting vanes forming the heat engine may already be included in the engine to generate power from combustion events thereby deriving extra power generating benefits from already existing components and avoiding excessive added weight, cost or complexity.

It is also an object of some, but not necessarily all embodiments of the present invention to provide engines, and methods of engine operation that include improved external supercharger designs. Embodiments of the invention may include superchargers that are superior in terms of cost, weight, performance, maintenance and complexity.

It is also an object of some, but not necessarily all embodiments of the present invention to provide variable volume chambers that may be used for non-power generating applications, such as for pumps and compressors. To this end, embodiments of the invention may use interconnected pivoting vanes to define one or more variable volume chambers that may act independently or in concert to pump or pressurize fluids.

It is also an object of some, but not necessarily all, embodiments of the present invention to provide an internal combustion engine, and methods of engine operation which may allow greater separation of the cold and hot potions of the combustion cycle. The pivoting action of the components which comprise the engine chamber allows the revealing of differing amounts of surface area and of spatially separate locations of the side plate at differing crank angles. It is also an object of some, but not necessarily all, embodiments of the present invention to provide an internal combustion engine which allows a differing cooling rate and/or strategy for the cold and hot portions of the combustion cycle.

It is also an object of some, but not necessarily all, embodiments of the present invention to provide an internal combustion engine which presents less engine hot spots to the start of the combustion reaction. These hot spots may be created during the previous combustion cycle, such as by hot exhaust valves or spark plugs ground electrodes. Less hot spot exposure time may: allow for the repeatable utilization of fuels such as Hydrogen, encourage the intake of a denser charge, prevent pre-ignition/detonation, and reduce NOx emissions.

It is also an object of some, but not necessarily all, embodiments of the present invention to provide an internal combustion engine which is compatible with OEM and after-market commercially available Engine Control Units (ECUs) and sensors.

It is also an object of some, but not necessarily all, embodiments of the present invention to provide an internal combustion engine which may be configured with variable valve timing mechanisms. This allows the engine control unit (ECU) to adapt to charging load and RPM conditions. It is also an object of some, but not necessarily all, embodiments of the present invention to provide a low-cost, low-component count, and simple variable valve actuation (VVA) mechanism for the wall based ports in the present invention.

It is also an object of some, but not necessarily all, embodiments of the present invention to provide an internal combustion engine which may reduce cycle combustion variance and increase combustion efficiency by inducing a strong swirl during intake. It is also an object of some, but not necessarily all, embodiments of the present invention to provide an internal combustion engine which may enhance swirl during component movement in the compression and expansion phases of the combustion cycle. It is also an object of some, but not necessarily all, embodiments of the present invention to provide an internal combustion engine, and methods of engine operation which induce minimal flame front quenching effects.

It is also an object of some, but not necessarily all, embodiments of the present invention to provide an internal combustion engine, and methods of engine operation which is compatible with current and future lean-burn strategies. Such strategies may involve running at over-air air to fuel ratios, retaining exhaust gases in the combustion chamber for the following combustion cycle, cooling combustion chamber exhaust gases and re-introducing them with the intake cycle, providing high mixture swirl, and precise combustion monitoring/control.

It is also an object of some, but not necessarily all, embodiments of the present invention to provide an internal combustion engine, and methods of engine operation in which the flame front(s) may remain nearly stationary as the combustion chamber components move and change angles around the burning charge. This may urge the charge from the squish area(s) towards the flame front and produce a more complete burn of the fuel(s).

It is also an object of some, but not necessarily all, embodiments of the present invention to provide an internal combustion engine, and methods of engine operation in which different thermal operation cycles may provide greater performance and/or greater efficiency as necessary under varying operating conditions. This may allow an Engine Control Unit (ECU) to implement differing thermal cycles via changing engine operating variables in response to user demands and changing operating conditions.

It is also an object of some, but not necessarily all embodiments of the present invention to provide variable volume chambers that may be used for 2-cycle, 4-cycle, or multi-cycle processes. Such processes may be, but are not limited to use in: compressors, pumps, heat engines, and combustion engines.

It is also an object of some, but not necessarily all embodiments of the present invention to provide a method to select appropriately sized ports/valves when designing or modifying variable volume chambers mechanisms. It is also an object of some, but not necessarily all embodiments of the present invention to present a possible scientific physical and mathematical understanding of the mechanisms, forces, and chemistry within variable volume chambers mechanisms.

It is also an object of some, but not necessarily all, embodiments of the present invention to provide an internal combustion engine which may be configured with a dual offset crankshaft.

It is also an object of some, but not necessarily all, embodiments of the present invention to provide an internal combustion engine which may have multiple combustion chambers configured in many different arrangements, which may generally include, but not be limited to: Flat-plane, Cross-plane, Boxer, Opposing, Vee, Inline, W, and Radial.

It is also an object of some, but not necessarily all, embodiments of the present invention to provide an internal combustion engine which may produce less vibration. It is also an object of some, but not necessarily all, embodiments of the present invention to provide an internal combustion engine which may allow configurations which have less balance issues during design.

It is also an object of some, but not necessarily all, embodiments of the present invention to provide an internal combustion engine which may use counter-weight shapes other than the traditional U-shapes. It is also an object of some, but not necessarily all, embodiments of the present invention to provide an internal combustion engine that may provide a simplified twin crankshaft configuration of an internal combustion engine using opposing side-lobe counterweights to allow adequate balancing and simplify the power output mechanism. It is also an object of some, but not necessarily all, embodiments of the present invention to provide an internal combustion engine, and methods of engine operation which may allow greater separation of the cold and hot potions of the combustion cycle. The pivoting action of the components which comprise the engine chamber allows the revealing of differing amounts of surface area and of spatially separate locations of the side plate at differing crank angles. It is also an object of some, but not necessarily all, embodiments of the present invention to provide an internal combustion engine which allows a differing cooling rate and/or strategy for the cold and hot portions of the combustion cycle.

It is also an object of some, but not necessarily all, embodiments of the present invention to provide an internal combustion engine which presents less engine hot spots to the start of the combustion reaction. These hot spots may be created during the previous combustion cycle, such as by hot exhaust valves or spark plugs ground electrodes. Less hot spot exposure time may: allow for the repeatable utilization of fuels such as Hydrogen, encourage the intake of a denser charge, prevent pre-ignition/detonation, and reduce NOx emissions.

It is also an object of some, but not necessarily all, embodiments of the present invention to provide an internal combustion engine which is compatible with OEM and after-market commercially available Engine Control Units (ECUs) and sensors.

It is also an object of some, but not necessarily all, embodiments of the present invention to provide an internal combustion engine which may be configured with variable valve timing mechanisms. This allows the engine control unit (ECU) to adapt to charging load and RPM conditions. It is also an object of some, but not necessarily all, embodiments of the present invention to provide a low-cost, low-component count, and simple variable valve actuation (VVA) mechanism for the wall based ports in the present invention.

It is also an object of some, but not necessarily all, embodiments of the present invention to provide an internal combustion engine which may reduce cycle combustion variance and increase combustion efficiency by inducing a strong swirl during intake. It is also an object of some, but not necessarily all, embodiments of the present invention to provide an internal combustion engine which may enhance swirl during component movement in the compression and expansion phases of the combustion cycle. It is also an object of some, but not necessarily all, embodiments of the present invention to provide an internal combustion engine, and methods of engine operation which induce minimal flame front quenching effects.

It is also an object of some, but not necessarily all, embodiments of the present invention to provide an internal combustion engine, and methods of engine operation which is compatible with current and future lean-burn strategies. Such strategies may involve running at over-air air to fuel ratios, retaining exhaust gases in the combustion chamber for the following combustion cycle, cooling combustion chamber exhaust gases and re-introducing them with the intake cycle, providing high mixture swirl, and precise combustion monitoring/control.

It is also an object of some, but not necessarily all, embodiments of the present invention to provide an internal combustion engine, and methods of engine operation in which the flame front(s) may remain nearly stationary as the combustion chamber components move and change angles around the burning charge. This may urge the charge from the squish area(s) towards the flame front and produce a more complete burn of the fuel(s).

It is also an object of some, but not necessarily all, embodiments of the present invention to provide an internal combustion engine, and methods of engine operation in which different thermal operation cycles may provide greater performance and/or greater efficiency as necessary under varying operating conditions. This may allow an Engine Control Unit (ECU) to implement differing thermal cycles via changing engine operating variables in response to user demands and changing operating conditions.

It is also an object of some, but not necessarily all embodiments of the present invention to provide variable volume chambers that may be used for 2-cycle, 4-cycle, or multi-cycle processes. Such processes may be, but are not limited to use in: compressors, pumps, heat engines, and combustion engines.

It is also an object of some, but not necessarily all embodiments of the present invention to provide a method to select appropriately sized ports/valves when designing or modifying variable volume chambers mechanisms. It is also an object of some, but not necessarily all embodiments of the present invention to present a possible scientific physical and mathematical understanding of the mechanisms, forces, and chemistry within variable volume chambers mechanisms.

It is also an object of some, but not necessarily all, embodiments of the present invention to provide an internal combustion engine which may be configured with a dual offset crankshaft.

It is also an object of some, but not necessarily all, embodiments of the present invention to provide an internal combustion engine which may have multiple combustion chambers configured in many different arrangements, which may generally include, but not be limited to: Flat-plane, Cross-plane, Boxer, Opposing, Vee, Inline, W, and Radial.

It is also an object of some, but not necessarily all, embodiments of the present invention to provide an internal combustion engine which may produce less vibration. It is also an object of some, but not necessarily all, embodiments of the present invention to provide an internal combustion engine which may allow configurations which have less balance issues during design.

It is also an object of some, but not necessarily all, embodiments of the present invention to provide an internal combustion engine which may use counter-weight shapes other than the traditional U-shapes. It is also an object of some, but not necessarily all, embodiments of the present invention to provide an internal combustion engine that may provide a simplified twin crankshaft configuration of an internal combustion engine using opposing side-lobe counterweights to allow adequate balancing and simplify the power output mechanism.

These and other advantages of some, but not necessarily all, embodiments of the present invention will be apparent to those of ordinary skill in the art.

SUMMARY OF THE INVENTION

Responsive to the foregoing challenges, Applicant has developed an innovative variable volume chamber device comprising: a first surface included in a first member spaced from and fixed relative to a second surface included in a second member, wherein the first surface extends in a first reference plane, the second surface extends in a second reference plane, and the first reference plane is parallel to the second reference plane; a first variable volume chamber disposed between the first surface and the second surface, said first variable volume chamber defined at least in part by the first surface, the second surface, and a first assembly including a first vane, a second vane, a third vane, and a fourth vane; a first pivotal connection between the first vane and the second vane, wherein the first pivotal connection is maintained in a fixed location relative to the first surface and the second surface; a second pivotal connection between the second vane and the third vane; a third pivotal connection between the third vane and the fourth vane; and a fourth pivotal connection between the first vane and the fourth vane.

Applicant has further developed an innovative variable volume chamber device comprising: a first surface included in a first structure spaced from and fixed relative to a second surface included in a second structure, wherein the first surface extends in a first reference plane, the second surface extends in a second reference plane, and the first reference plane is parallel to the second reference plane; a first variable volume chamber disposed between the first surface and the second surface, said first variable volume chamber defined at least in part by the first surface, the second surface, and a first assembly including a first vane, a second vane, a third vane, and a fourth vane; a first pivotal connection between the first vane and the second vane; a second pivotal connection between the second vane and the third vane; a third pivotal connection between the third vane and the fourth vane; a fourth pivotal connection between the first vane and the fourth vane; and a drive bar having a first point and a second point distal from the first point, wherein the drive bar first point is connected to the first assembly at the third pivotal connection, and wherein the drive bar second point is connected directly or indirectly to a crankshaft.

Applicant has still further developed an innovative variable volume chamber device comprising: a first surface included in a first member spaced from and fixed relative to a second surface included in a second member, wherein the first surface extends in a first reference plane, the second surface extends in a second reference plane, and the first reference plane is parallel to the second reference plane; a first variable volume chamber disposed between the first surface and the second surface, said first variable volume chamber defined at least in part by the first surface, the second surface, and a first assembly including a first vane, a second vane, a third vane, and a fourth vane; a first pivotal connection between the first vane and the second vane; a second pivotal connection between the second vane and the third vane; a third pivotal connection between the third vane and the fourth vane; a fourth pivotal connection between the first vane and the fourth vane; a vane-surrounding structure surrounding at least a portion of the first vane and the second vane; and a second variable volume chamber defined at least in part by the first vane and the vane-surrounding structure.

Applicant has still further developed an innovative internal combustion engine comprising: a variable volume internal supercharger chamber; a variable volume combustion chamber; a variable volume heat engine chamber; one or more first working fluid passages connecting the variable volume supercharger chamber to the variable volume combustion chamber; and one or more second working fluid passages connecting the variable volume combustion chamber to the variable volume heat engine chamber.

Applicant has still further developed an innovative variable volume chamber device comprising: a housing; an assembly including a first vane, a second vane, a third vane, and a fourth vane disposed within said housing, wherein the first vane is pivotally connected to the second vane at a fixed location relative to the housing, wherein the second vane is pivotally connected to the third vane, wherein the third vane is pivotally connected to the fourth vane, wherein the fourth vane is pivotally connected to the first vane, and wherein said assembly defines a variable volume chamber.

Applicant has still further developed an innovative method of: repeatedly moving a variable volume chamber to a first engine region for the cool inlet events; and repeatedly moving the variable volume chamber to a second engine region for hot combustion events.

Applicant has still further developed an innovative variable volume chamber device comprising: an engine, pump, or compressor housing; a variable volume chamber provided in the housing; an inlet or outlet port provided in the housing communicating with the variable volume chamber; a slide gate or a rotary gate provided adjacent to the inlet or outlet port, said slide gate or rotary gate configured to selectively block a variable portion of the inlet or outlet port; and an actuator connected to the slide gate or rotary gate.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF EMBODIMENTS OF THE INVENTION

Figure 1:
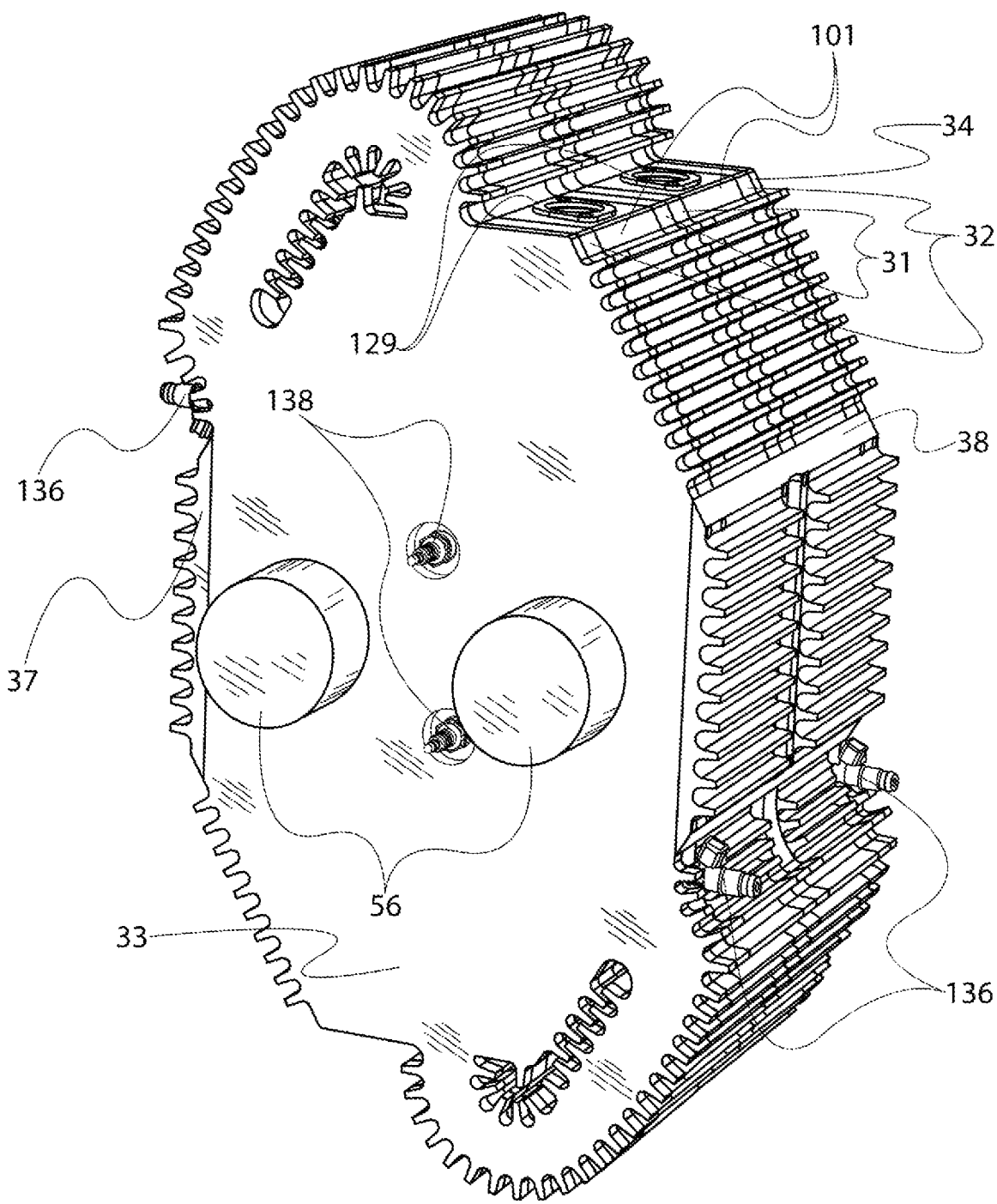
FIG. 1 is an isometric view of a two layer internal combustion engine in accordance with a first embodiment of the present invention.

Reference will now be made in detail to embodiments of the present invention, examples of which are illustrated in the accompanying drawings. With reference to FIG. 1, a first example internal combustion engine embodiment of the invention is illustrated. In this example, the engine may incorporate two adjacent layers including two variable volume combustion chambers per layer. It is appreciated that alternative engine embodiments and pump embodiments may have more or less layers, and more or less variable volume chambers per layer. Starting at the portion of the engine closest to the viewer in FIG. 1 and progressing away from the viewer, the first layer may include a first end plate 33 connected to first type-B side plate 32. The first end plate 33 and the first type-B side plate 32 may have aligned openings extending through them to accommodate first and second output crankshafts 56, and first and second spark plugs 138. The first type-B side plate 32 also may include openings through it to accommodate first and second fuel injectors 136.

The first type-B side plate 32 may be spaced from a first type-A side plate 31 by a number of external and internal intermediate parts. The external intermediate parts may include a first horseshoe 101 and a second (lower) horseshoe, along with a type-A side cover 37 and a type-B side cover 38.

A second layer of the engine may be adjacent and connected to the first layer. The second layer may include a second type-A side plate 31 connected to the first type-A side plate 31. The second layer may further include a second type-B side plate 32 spaced from the second type-A side plate by a third horseshoe 101, a fourth horseshoe, the type-A side cover 37, and the type-B side cover 38. A second end plate 34 may connect to the second type-B side plate 32, thereby completing the two-layer stack. The second end plate 34, the second type-B side plate 32, and the third and fourth horseshoes 101 may include the same number and type of openings as their counterparts in the first layer of the engine. The first end plate 33, the second end plate 34, the type-A side plates 31, the type-B side plates 32, the horseshoes 101, the type-A side cover 37, and the type-B side cover 38 may each have a plurality of cooling fins formed along an outer edge. Each horseshoe 101 may include an exhaust opening 129 extending through the horseshoe.

Figure 2:
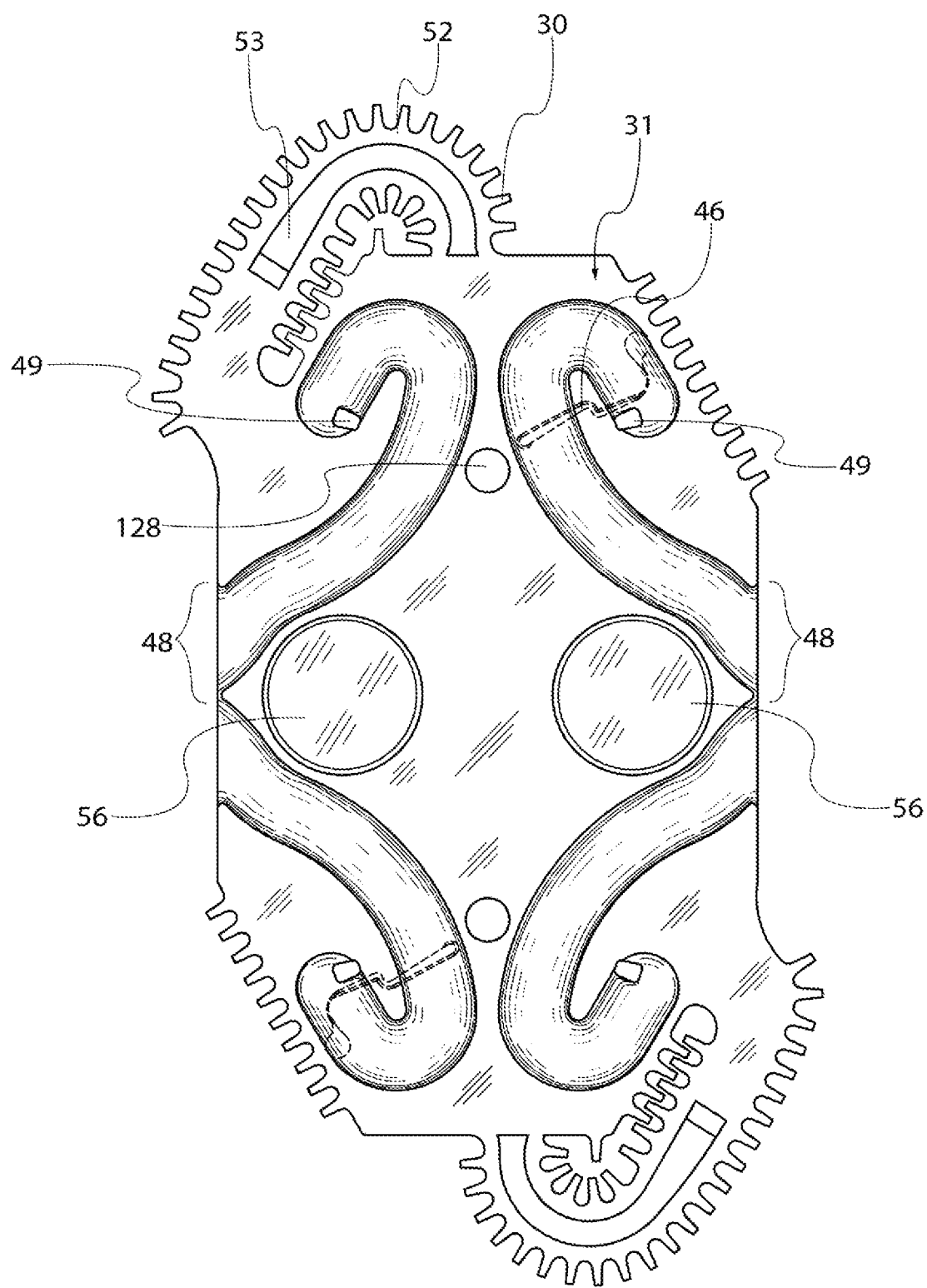
FIG. 2 is a plan view of a first type of side plate included in the engine of FIG. 1.

With reference to FIG. 2, each of the type-A side plates 31 may include a combustion-chamber-facing generally flat interior surface (opposite of that shown) that extends in a first reference plane, and an outer edge formed with cooling fins 30. Portions of first and second intercoolers 52, which include first intercooler passages 53, are provided at opposing corners of the type-A side plates 31. The type-A side plates 31 also may include openings to receive first and second output crankshafts 56 spaced from each other on reference centerlines bisecting the type-A side plates. First and second bores or recesses 128 are provided in the type-A side plates 31 to receive the king pins (shown in FIG. 3).

Each of the type-A side plates 31 also may include four internal supercharger channels (i.e., passages) 48 formed in the non-combustion-chamber side of the plates (shown). Each of the internal supercharger channels 48 may extend from an open end formed at the central outer edges of the type-A side plates 31 to an internal supercharger air inlet 49 that communicates with the combustion chamber side of the plates. The channels 48 may have a curved hook shape configured to provide an extended flow path that assists in cooling the type-A side plates 31. Cooperating pairs of internal supercharger channels 48 may be provided on opposite sides of reference centerlines bisecting the type-A side plates 31 through the first and second output crankshaft 56 openings. Each cooperating pair of internal supercharger channels 48 may include one channel fitted with a heat engine blowdown port 46 on the combustion chamber side of the type-A side plates 31 (opposite of that shown).

Figure 3:
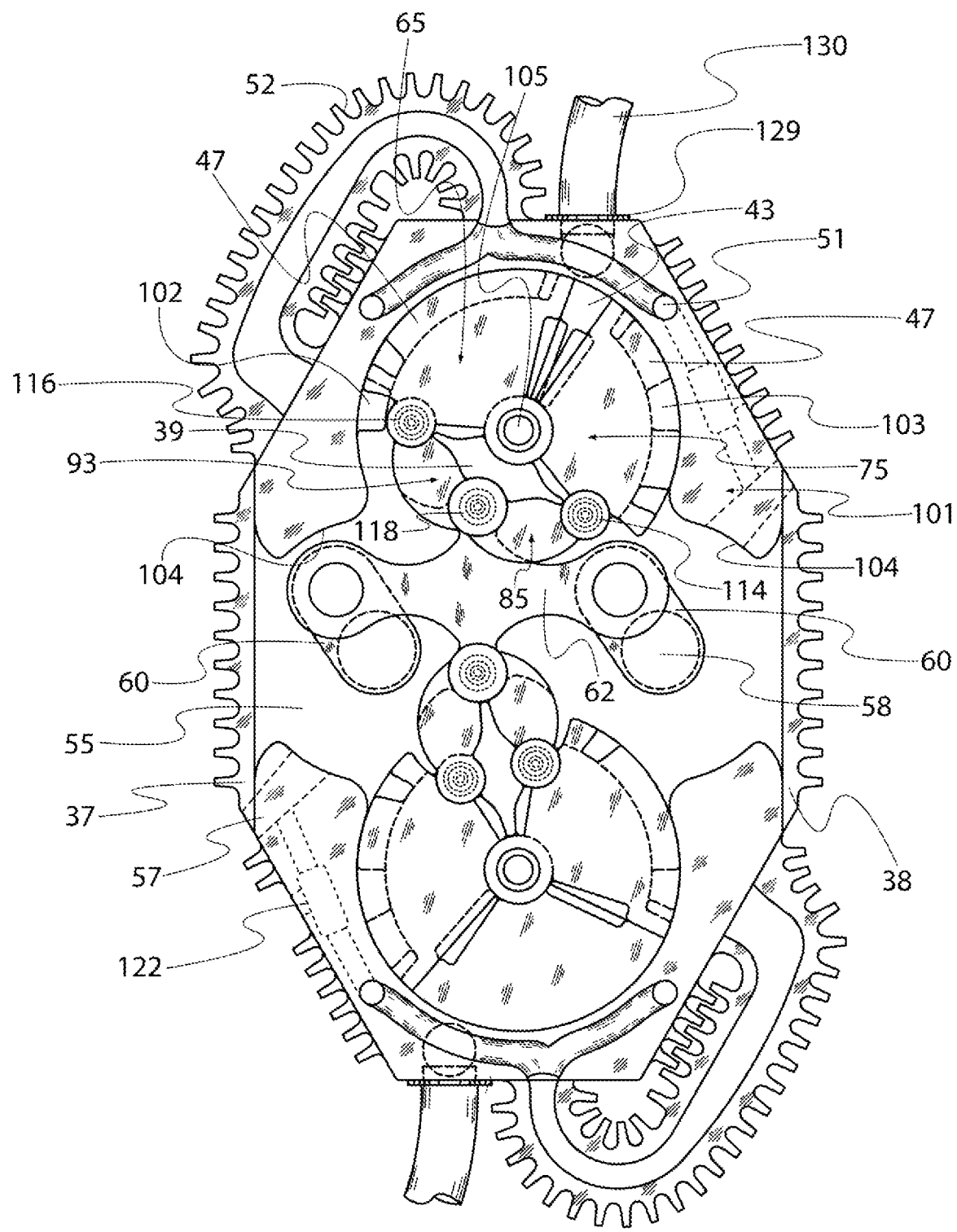
FIG. 3 is a plan view of, inter alia, two vane assemblies, two horseshoes, and two side covers included in the engine of FIG. 1.

With reference to FIG. 3, each half of the engine layer may be provided with a horseshoe 101, an intercooler 52, a king pin 105, and a vane assembly comprised of a type-A vane 65, a type-B vane 75, a type-C vane 85, and a type-D vane 93. The vane assembly in the upper portion of the engine layer may connect pivotally to a vane assembly in the lower portion of the engine layer by a drive bar 62. In turn, the drive bar 62 may connect pivotally to each of the internal crankshafts 58 by cranks 60. The horseshoes 101, the first type-A side cover 37, and the first type-B side cover 38 may, collectively, space the type-A side plate 31 from the type-B side plate 32 to form the second engine layer of the two layers shown in FIG. 1. For ease of discussion, only the upper portion of the engine (vane assembly, horseshoe, etc.) is described, with the understanding that the lower portion of the engine includes like elements, and the second layer of the engine includes like elements to the first layer.

With continued reference to FIG. 3, the horseshoe 101 has a front face (shown) adjacent to and sealed against the type-A side plate 31. The horseshoe 101 also has a rear face adjacent to and sealed against the type-B side plate 32. The horseshoe 101 is, in general terms, a U-shaped frustum having an exhaust opening 129 extending through it, as well as some other passages formed therein. An exhaust pipe 130 may connect to the exhaust opening 129 extending through each horseshoe 101. The horseshoe 101 may include an inner curved wall that is coextensive with a reference cylinder extending from the front face of the horseshoe to the rear face. The inner curved wall may have a constant radius of curvature extending through an arc of more than 180 degrees, but less than 360 degrees so that there is an opening in the curved wall forming the open end of the U-shape. The opening in the curved wall of the U-shaped horseshoe 101 may face towards the center of the engine layer where the internal crankshafts 58 are disposed. A first internal supercharger boss 102 and a second supercharger boss 103 may project inward from generally opposite sides of the curved wall. The horseshoe 101 also may include two windage recesses 104 disposed adjacent to the opening in the curved wall at opposite ends of the U-shaped frustum. An external supercharger inlet passage 57 may extend through the horseshoe 101 from an ambient environment side to the outer chamber 55. A blow-off and transfer valve 122 with accompanying passages may connect the external supercharger inlet passage 57 to the internal supercharger compressed air passage 51 or to ambient environment.

The horseshoe 101 may have an intercooler 52 connected to it, or alternatively, integrally formed with it as a single piece. An internal supercharger compressed air passage 51 may extend through the intercooler 52 and a portion of the horseshoe 101. The internal supercharger compressed air passage 51 may include two sub-passages that extend toward each other along a portion of the outside perimeter of the inner curved wall of the horseshoe 101. The two sub-passages may each include an opening on the surface of the horseshoe 101 that communicates with a corresponding supercharger outlet passage 50 (see FIG. 4) in the type-B side plate 32. Each supercharger outlet passage 50 extends from the combustion chamber side of the type-B side plate 32 to the non-combustion chamber side of the plate where it meets with one of the sub-passages of internal supercharger compressed air passage 51.

Figure 5:
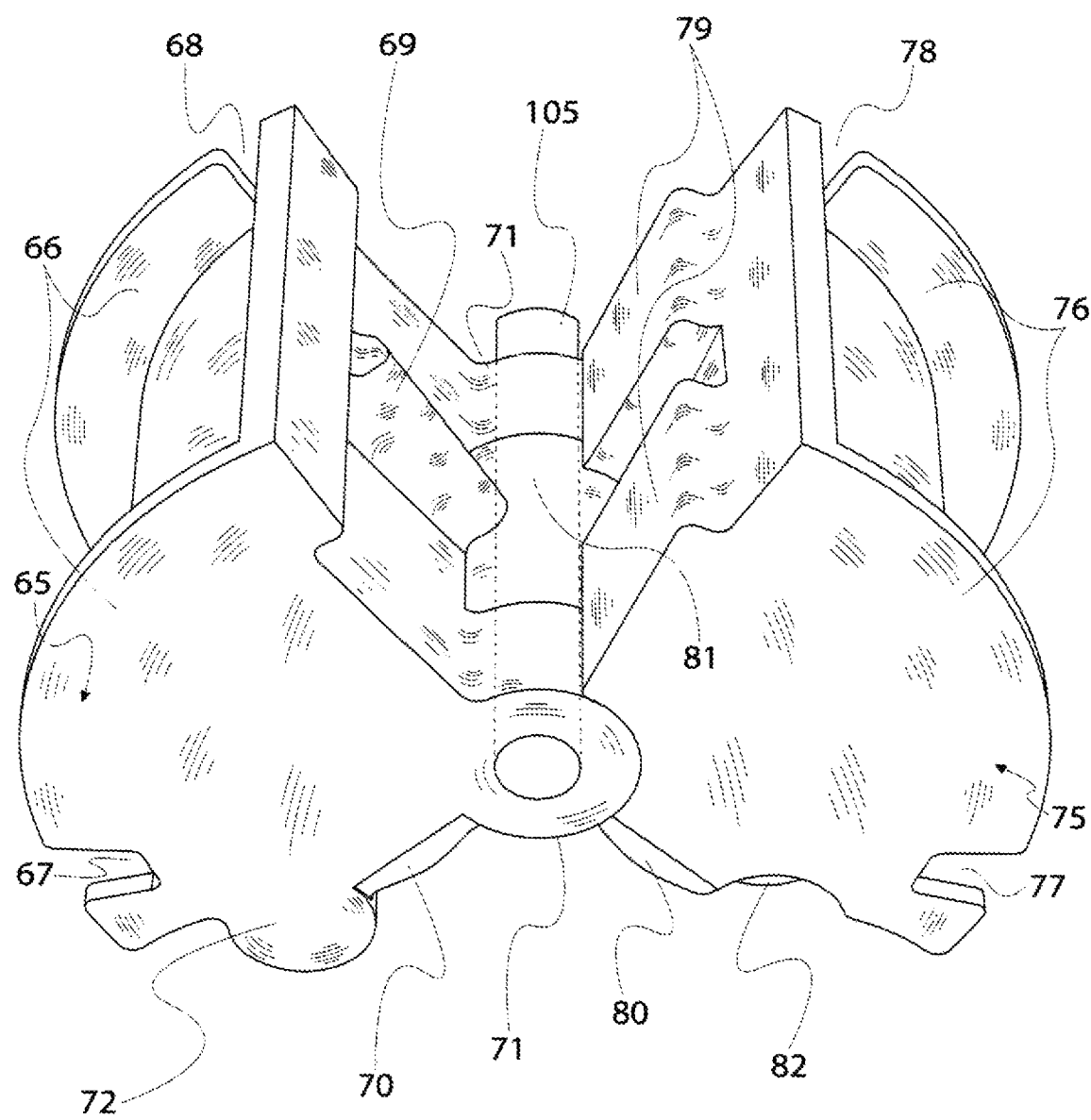
FIG. 5 is an isometric view of first and second vanes pivotally connected by a king pin which are included in the engine of FIG. 1 and shown in FIG. 3.

The vane assembly may be disposed in the space defined by the inner curved wall of the horseshoe 101. With reference to FIGS. 3 and 5, the type-A vane 65 may have a planar front face and a planar rear face that are generally wedge shaped (when viewed end-on as in FIG. 3). Three primary walls may define the wedge shape. The three primary walls may extend between the front face of the type-A vane 65 and the rear face. A first wall and a second wall of the type-A vane 65 extend away from the two type-A king pin bosses 71 towards an outer curved third wall. The type-A king pin bosses 71 may have aligned bores that are configured to receive a king pin 105.

The first and second walls of the type-A vane 65 preferably extend away from the type-A king pin bosses 71 in reference planes that form an oblique angle with each other. The first wall may include a smooth peaked ridge heat engine deflection projection 69 that extends in a direction parallel with, and generally equally spaced from, the reference planes in which the front face and the rear face of the type-A vane 65 extend. The second wall of the type-A vane 65 may include two type-A side bosses 72 that project outward from the second wall and are disposed, respectively, at the front face and the rear face of the vane. A type-A combustion compression wedge 70 may be formed between the type-A side boss 72 and the type-A king pin boss 71 along the front face, and a second compression wedge 70 may be formed between the type-A side boss 72 and the type-A king pin boss 71 along the rear face.

The outer curved third wall of the type-A vane 65 may include a matching pair of internal supercharger fins 66 that project from, and are co-planar with, the front face and the rear face of the vane, respectively. The outer edges of the internal supercharger fins 66 may have a constant radius of curvature that is slightly less than the radius of curvature of the opening defined by the inner curved wall of the horseshoe 101. The curved outer edges of the fins 66 maintain a uniform, and very slight, distance from the cylindrical opening in the horseshoe 101 while pivoting within it. The front face fin 66 may include an internal supercharger inlet slit 67 formed therein. The rear face fin 66 may include an internal supercharger outlet slit 68 that is distal from the inlet slit 67. The internal supercharger fins 66 may define a first internal supercharger chamber 47 between them that is bound on the inside by the portion of the outer curved third wall of the type-A vane extending between the two fins, and bound on the outside by the curved wall of the horseshoe 101. The first internal supercharger boss 102 projecting from the horseshoe 101 forms a wall for the first internal supercharger chamber 47 while permitting the type-A vane 65 to move relative to the boss. Because the first internal supercharger boss 102 blocks fluid flow past it, the volume of the first internal supercharger chamber 47 varies as the type-A vane 65 pivots back and forth.

With continued reference to FIGS. 3 and 5, the type-B vane 75 may have a planar front face and a planar rear face that are generally wedge shaped (when viewed end-on as in FIG. 3). Three primary walls may extend between the front face of the type-B vane 75 and the rear face to define the wedge shape. A first wall and a second wall of the type-B vane 75 extend away from a central type-B king pin boss 81 towards an outer curved third wall. The type-B king pin boss 81 may be sized to be received securely between the two type-A king pin bosses of the type-A vane 65, and have a bore that is configured to receive the king pin 105. The type-A king pin bosses 71 and the type-B king pin boss 81 should be configured to pivot relative to each other when interleaved as shown in FIG. 5 without significant working fluid leakage past the pivot point.

The first and second walls of the type-B vane 75 preferably extend away from the type-B king pin boss 81 in reference planes that form an oblique angle with each other. The angle formed between the first and second wall reference planes for the type-B vane 75 is preferably the same, or nearly the same, as the angle between the first and second wall reference planes for the type-A vane 65. The first wall of the type-B vane 75 may include two symmetrical flat-topped projections 79 that extend inward from the front face and rear face of the type-B vane 75, respectively. The projections 79 may define a central valley between them configured to receive the projection 69 on the type-A vane 65 when the two vanes pivot together. The second wall of the type-B vane 75 may include a type-B side boss 82 that projects away from the second wall and is disposed near a mid-point between the front face and the rear face of the vane. Two type-B combustion compression wedges 80 may extend from the second wall of the type-B vane 75 along the inner portion of the front face and the inner portion of the rear face of the vane, respectively.

The outer curved third wall of the type-B vane 75 may include a matching pair of internal supercharger fins 76 that project from, and are co-planar with, the front face and the rear face of the vane, respectively. The outer edges of the internal supercharger fins 76 may have a constant radius of curvature that is slightly less than that of the opening defined by the inner curved wall of the horseshoe 101. The curved outer edges of the fins 76 may maintain a uniform, and very slight, distance from the cylindrical opening in the horseshoe 101 while pivoting within it. The front face fin 76 may include an internal supercharger inlet slit 77 formed therein. The rear face fin 76 may include an internal supercharger outlet slit 78 that is distal from the inlet slit 77. The internal supercharger fins 76 may define a second internal supercharger chamber 47 between them that is bound on the inside by the portion of the outer curved third wall of the type-B vane 75 extending between the two fins, and bound on the outside by the curved wall of the horseshoe 101. The second internal supercharger boss 103 projecting from the horseshoe 101 forms a wall for the second internal supercharger chamber 47 while permitting the type-B vane 75 to move relative to the boss. Because the second internal supercharger boss 103 blocks fluid flow past it, the volume of the second internal supercharger chamber 47 varies as the type-B vane 75 pivots back and forth.

The type-A vane 65 may pivotally connect to the type-B vane 75 using the king pin 105. The king pin 105 may extend through the type-A king pin bosses 71 interleaved with the type-B king pin boss 81 to provide a fixed pivot point for the two vanes. The king pin 105 may be securely received by a first king pin mount recess 128 in the type-A side plate 31, and/or received by a second king pin mount recess 128 in the type-B side plate 32 (see FIG. 4). The king pin mount recesses 128 constrain the king pin 105 and the king pin pivot point for the type-A vane 65 and type-B vane 75 to a fixed location relative to the type-A side plate 31 and the type-B side plate 32.

Figure 6:
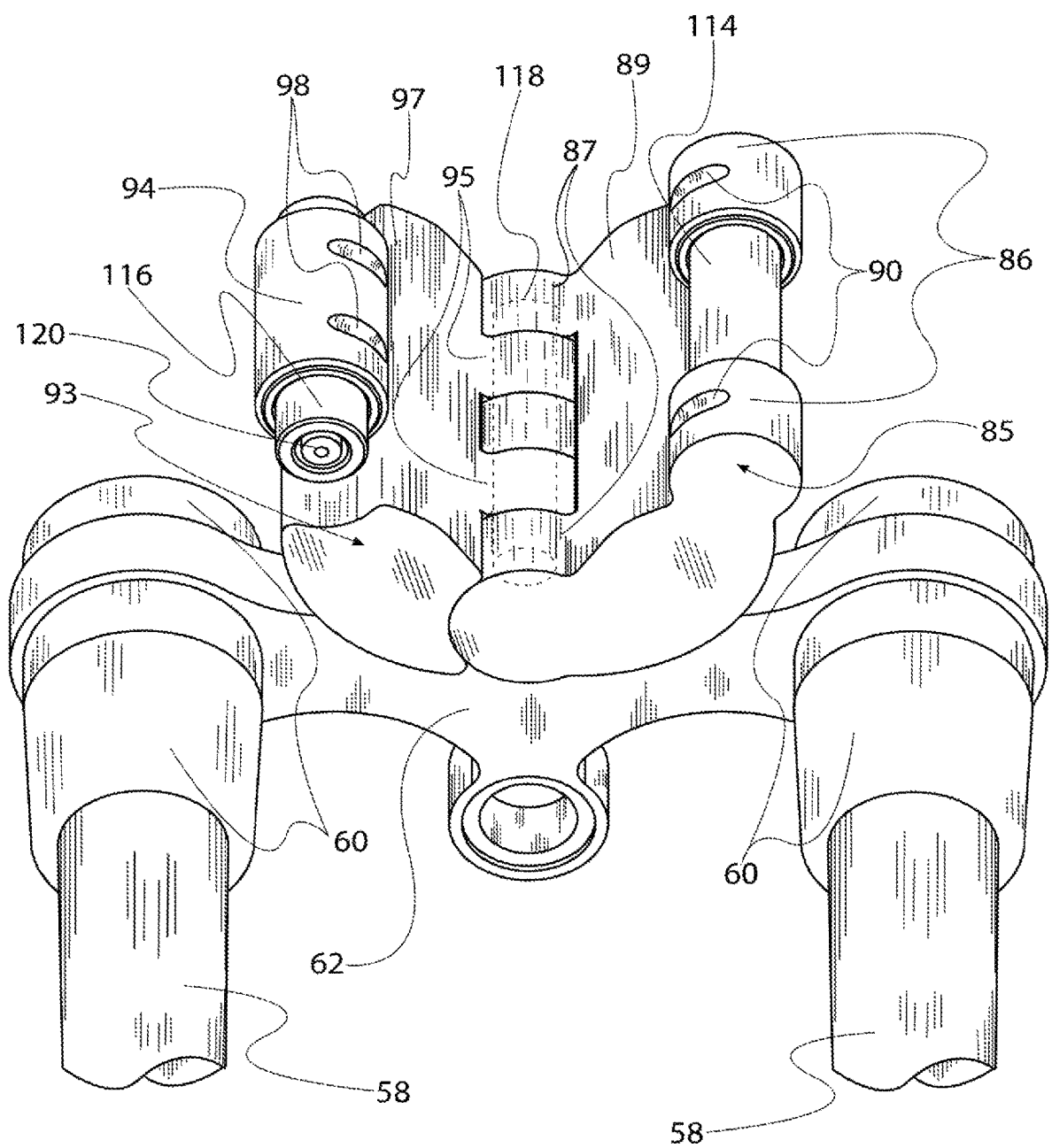
FIG. 6 is an isometric view of third and fourth vanes pivotally connected together and which are included in the engine of FIG. 1 and shown in FIG. 3.

With reference to FIGS. 3 and 6, the type-C vane 85 may have a planar front face and a planar rear face connected to each other by an inner convex wall and an outer convex wall. The inner convex wall and the outer convex wall may be spaced from each other. The inner convex wall may extend from (i) first and second type-C side bosses 86 at one end of the vane to (ii) first and second type-C drive bar bosses 87 provided at the opposite end of the vane. The outer convex wall of the type-C vane 85 also may extend from the first and second type-C side bosses 86 at one end of the vane to the first and second type-C drive bar bosses 87 provided at the opposite end. The type-C side bosses 86 may each have a type-C gas guide slit 90 extending around a portion of the outer circumference of the bosses. The type-C side bosses 86 may have aligned bores configured to receive a type-A side wrist pin 114. The type-C drive bar bosses 87 may have aligned bores configured to receive a drive bar wrist pin 118.

The type-B vane 75 may pivotally connect to the type-C vane 85 using the type-A side wrist pin 114. The type-A side wrist pin 114 may extend through a type-B side boss 82 interleaved with the type-C side bosses 86 to provide a movable pivot point for the type-B vane 75 and the type-C vane 85 relative to the type-A side plate 31 and the type-B side plate 32. The type-B side boss 82 and the type-C side bosses 86 may pivot relative to each other when interleaved without significant working fluid leakage past the pivot point.

With continued reference to FIGS. 3 and 6, the type-D vane 93 may have a planar front face and a planar rear face connected to each other by an inner convex wall and an outer convex wall. The inner convex wall and the outer convex wall may be spaced from each other. The inner convex wall of the type-D vane 93 may extend from a type-D side boss 94 at one end of the vane to first and second type-D drive bar bosses 95 provided at the opposite end. The outer convex wall of the type-D vane 93 also may extend from the type-D side boss 94 at one end of the vane to the type-D drive bar bosses 95 provided at the opposite end. The type-D side boss 94 may have one or more type-D gas guide slits 98 extending around a portion of the outer circumference of the boss. The type-D side boss 94 may have a bore configured to receive a type-B side wrist pin 116. The type-D drive bar bosses 95 may have aligned bores configured to receive the drive bar wrist pin 118. The drive-bar wristpin 118, the type-A side wrist pin 114, and the type-B side wrist pin 116 may have an independent coupling rod 120 (FIG. 6) housed within to maintain the vane mechanism clearances from type-A side plate 31 and the type-B side plate 32.

The type-A vane 65 may pivotally connect to the type-D vane 93 using the type-B side wrist pin 116. The type-B side wrist pin 116 may extend through first and second type-A side bosses 72 interleaved with the type-D side boss 94 to provide a movable pivot point for the type-A vane 65 and the type-D vane 93 relative to the type-A side plate 31 and the type-B side plate 32. The type-A side bosses 72 and the type-D side boss 94 may pivot relative to each other when interleaved without significant working fluid leakage past the pivot point.

The type-C vane 85, the type-D vane 93, and the drive bar 62 may pivotally connect together using the drive bar wrist pin 118. The drive bar wrist pin 118 may extend through the type-D drive bar bosses 95 that interleave with the type-C drive bar bosses 87 and the drive bar 62. The drive bar wrist pin 118 may provide a movable pivot point for the type-C vane 85, the type-D vane 93, and the drive bar 63, relative to the type-A side plate 31 and the type-B side plate 32. The type-C drive bar bosses 87, the type-D drive bar bosses 95, and the drive bar, may pivot relative to each other when interleaved without significant working fluid leakage past the pivot point.

With reference to FIGS. 3 and 6, the drive bar 62 may be pivotally connected to one or more internal crankshafts 58 by one or more corresponding cranks 60. The drive bar 62, cranks 60 and internal crankshafts 58 may be disposed in an outer chamber 55 which constitutes the space within the engine layer that is outside of the horseshoes 101 and the vane assemblies. Preferably, the outer chamber 55 may communicate with an external supercharger inlet port 57 through which pressurized fluid, such as air, may be supplied. Preferably, the outer chamber 55 may be maintained at 1.5 to 3 atmospheres pressure during non-load engine operation although greater pressures may be employed. The pressure of the outer chamber 55 may be varied during the course of engine operation as needed to avoid unacceptable fluid leakage out of the combustion chamber 39 during engine operation.

The crankshafts 56, 58 may extend between the engine layers and out of the engine through the first end plate 33 (FIG. 1). The internal crankshafts 58 may be secured in place within the engine by one or more internal crankshaft bearings 59. The crankshafts 56, 58 may be configured to rotate repeatedly through 360 degrees in response to a rotational driving force received from the drive bar 62 and the cranks 60. The output of the crankshafts may be used for any powering purpose.

Figure 17A:
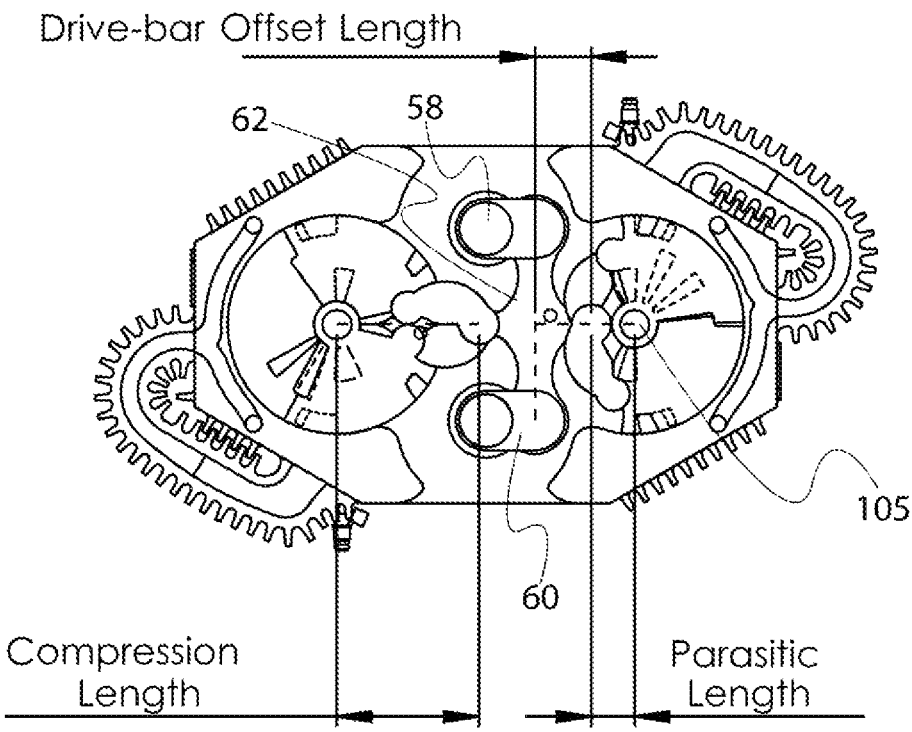
FIGS. 17A and 17B are plan views of the FIG. 3 elements showing the relative offsets of elements in accordance to a preferred embodiment.
Figure 17B:
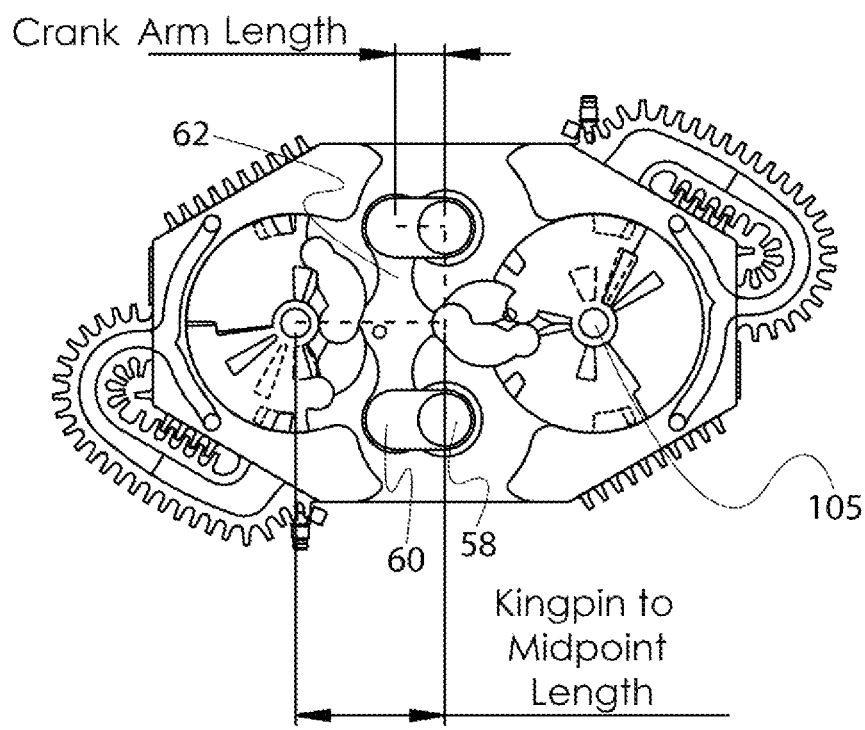

With reference to FIGS. 17A and 17B, the relative dimensions and offsets for the cranks 60, the drive bar 62, the internal crankshafts 58, and the king pins 105 are illustrated for an embodiment including two opposing chambers. These dimensions and offsets may vary in alternative embodiments, and may be a function of desired vane geometry, boss sizes, compression length, parasitic length, and clearances between vanes. In the preferred embodiment, the distance between the king pin 105 and the drive bar wrist pin may be determined for the compression phase and the parasitic phase. The crank 60 length may be determined by subtracting the parasitic length from the compression length and dividing the result by two. The distance from the center of the king pin 105 to the midpoint of a line segment connected between the internal crankshaft 58 centers may be calculated by adding the parasitic length, the drive bar 62 offset length, and the crank 60 length. Alternatively, this distance may be determined by adding the compression length to the drive bar 62 offset length and subtracting the crank 60 length.

Figure 4:
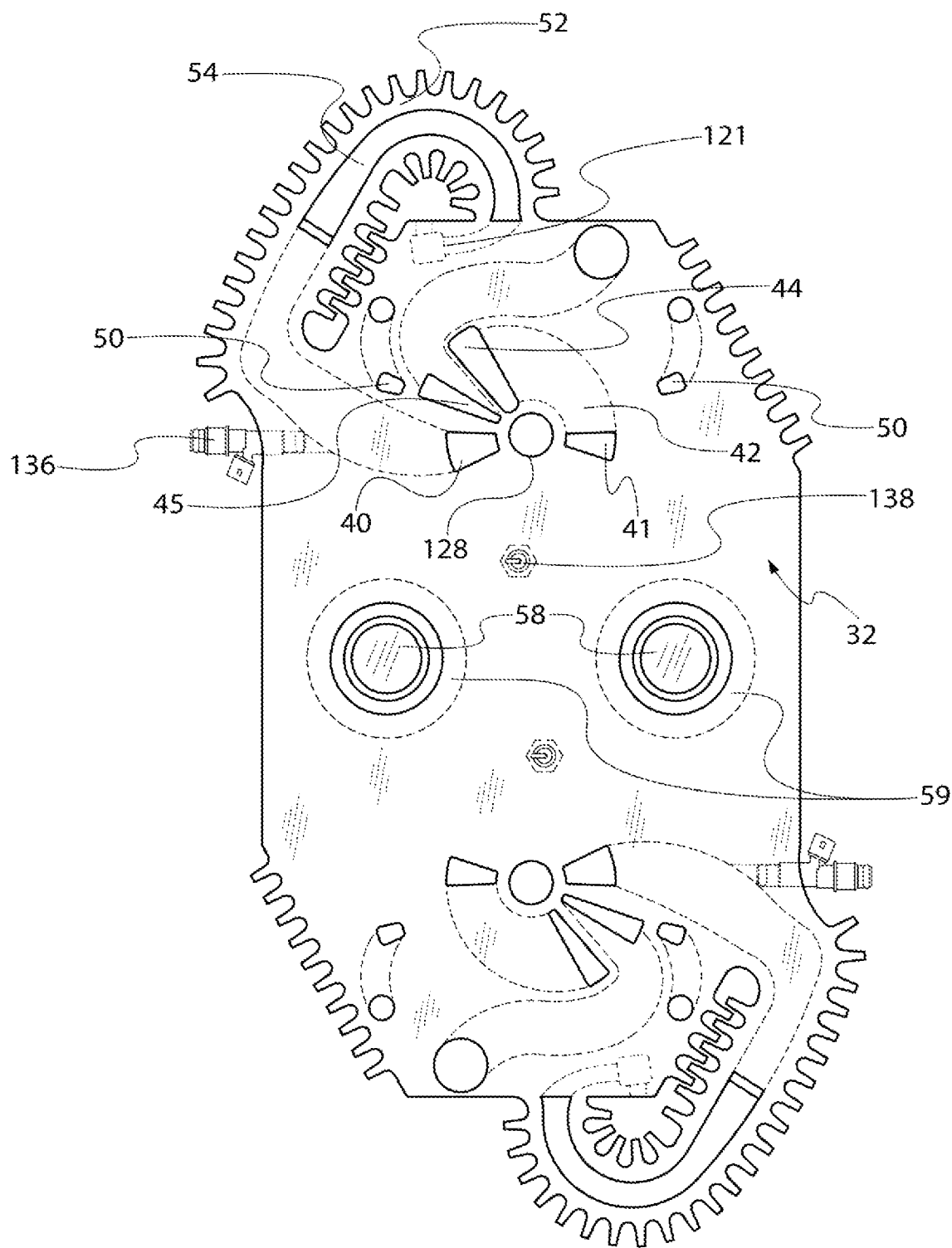
FIG. 4 is a plan view of a second type of side plate included in the engine of FIG. 1.

With reference to FIGS. 3 and 4, each engine layer is completed by a type-B side plate 32. A complete engine layer including a type-A side plate 31, horseshoes 101, a type-A side cover 37, a type-B side cover 38, and a type-B side plate 32, may be held together using any known structures, such as bolts, welds, adhesives, clamps, and the like. Preferably, one or more seals may be maintained between the parts to sufficiently prevent excess leakage of the working fluid out of the combustion chamber 39, and to prevent leakage of the lower pressure working fluid out of the outer chamber 55.

With reference to FIG. 4, each of the type-B side plates 32 may include a combustion-chamber-facing generally flat interior surface (shown) that extends in a second reference plane. The second reference plane is parallel to, and equally spaced from, the first reference plane in which the combustion-chamber-facing generally flat interior surface of the type-A side plate 31 (FIG. 1) extends. Portions of the first and second intercoolers 52, which include first intercooler passages 54, may be provided at opposing corners of the type-B side plates 32. A blow-off passage and valve 121 may connect each first intercooler passage 54 to the ambient environment. The type-B side plates 32 may include openings to receive first and second internal crankshafts 58 spaced from each other on reference centerlines bisecting the type-B side plates. The internal crankshafts 58 and the output crankshafts 56 (FIG. 3) may be supported by one or more crankshaft bearings 59. First and second bores or recesses 128 may be provided in the type-B side plates 32 to receive the king pins 105 (FIG. 3). The type-B side plates 32 may include openings to receive fuel injectors 136 and spark plugs 138. The spark plugs 138 may be located in the type-B side plates 32 so as to be revealed to the combustion chambers 39 when the chambers are near or at a minimum volume.

Each of the type-B side plates 32 also may include six ports extending through the plate within the footprint of the vane assembly. Specifically, a combustion charge inlet port 40 may be located and sized on the type-B side plate 32 to selectively communicate with the combustion chamber 39 when it is increasing in volume. A combustion exhaust port 41 may be located and sized to selectively communicate with the combustion chamber 39 when it is decreasing in volume. The combustion charge inlet port 40 and the combustion exhaust port 41 may be generally trapezoid shaped and extend away from the king pin recess 128 roughly the same distance like spokes extending away from a hub. The centers of the combustion charge inlet port 40 and the combustion exhaust port 41 may be separated from each other by roughly 170-200 degrees relative to the king pin recess 128.

With reference to FIGS. 3, 5 and 6, the inner walls of the type-A vane 65, type-B vane 75, type-C vane 85, and type-D vane 93 define a variable volume chamber 39, which in the engine embodiment shown in FIG. 3 comprises a combustion chamber. More specifically, the drive bar 62, the crank 60, the type-A vane 65, the type-B vane 75, the type-C vane 85 and the type-D vane 93 may connect to make a parallelogramic or rhombic combustion chamber 39 between them with the internal angles dependent upon the drive bar position on its circular path. This parallelogramic or rhombic combustion chamber 39 may be used as an Otto or Atkinson cycle combustion chamber which completes a cycle that is fully equivalent to a two-crank rotation cycle of a four-stroke piston engine having intake, compression, expansion, exhaust, and parasitic events within one crank (360 degree) rotation.

The volume of the combustion chamber 39 may vary as the result of the movement of the type-A vane 65, the type-B vane 75, the type-C vane 85 and the type-D vane 93 while they are pivotally connected. The type-A vane 65 and the type-B vane 75 pivot about the king pin 105 in a back-and-forth motion. The type-C vane 85 and the type-D vane 93 pivot first away from each other and towards the type-A vane 65 and the type-B vane 75, and then towards each other and away from the type-A vane and the type-B vane. As a result of this motion, the combustion chamber 39 achieves a maximum volume twice and two minimum volumes per revolution of the drive bar 62.

With renewed reference to FIG. 4, the type-B side plate 32 may further include a heat engine exhaust port 45 located adjacent to the combustion charge inlet port 40, and a heat engine inlet port 44 located adjacent to the heat engine exhaust port. The heat engine inlet port 44 and the heat engine exhaust port 45 may be generally trapezoid shaped and extend away from the king pin recess 128 roughly the same distance like spokes extending away from a hub. The heat engine inlet port 44 and the heat engine exhaust port 45 may extend away from the king pin recess 128 roughly twice the distance that the combustion chamber inlet port 40 extends away from the king pin recess.

With reference to FIGS. 3 and 4, the heat engine inlet port 44 may be located and sized on the type-B side plate 32 to selectively communicate with, and be exclusively revealed to, the heat engine chamber 43 formed between the type-A vane 65, the type-B vane 75, and the inner curved wall of the horseshoe 101. A transfer channel 42 connects the combustion exhaust port 41 with the heat engine inlet port 44 on the rear face (i.e., non-combustion chamber face) of the type-B side plate 32. The heat engine exhaust port 45 may be located and sized on the type-B side plate 32 to selectively communicate with, and be exclusively revealed to, the heat engine chamber 43. A channel for transferring working fluid may connect the exhaust opening 129 with the heat engine exhaust port 45 via a passage within the horseshoe 101 connecting through to the rear face (i.e., non-combustion chamber face) of the type-B side plate 32.

With reference to FIGS. 3, 4, 5 and 6, the first wall of the type-A vane 65 and the first wall of the type-B vane 75 may define a variable volume heat engine chamber 43 between them bound by the inner curved wall of the horseshoe 101. The volume of the heat engine chamber 43 may reciprocate between a maximum volume and a minimum volume due to the pivoting movement of the type-A vane 65 and the type-B vane 75 about the king pin 105. Working fluid may enter the heat engine chamber 43 through the heat engine inlet port 44 in the type-B side plate 32, and working fluid may exit the heat engine chamber through the heat engine exhaust port 45.

With reference to FIG. 4, the type-B side plate 32 may further include multiple internal supercharger outlet passages 50. Each internal supercharger outlet passage 50 may extend from the combustion chamber side of the type-B side plate 32 to the non-combustion chamber side of the plate where it meets with one of the sub-passages of internal supercharger compressed air passage 51. With reference to FIGS. 2, 3, 4, 5 and 6, the first and second internal supercharger chambers 47 may have variable volumes because the first and second internal supercharger bosses 102 and 103 block fluid flow as the type-A vane 65 and the type-B vane 75 pivot back and forth. These variable volume internal supercharger chambers 47 may communicate with the internal supercharger air inlets 49 in the type-A side plate 31 through the supercharger inlet slits 67 and 77, respectively. The first and second internal supercharger chambers 47 also may communicate with the internal supercharger outlet passages 50 through the supercharger outlet slits 68 and 78, respectively.

Figure 7:
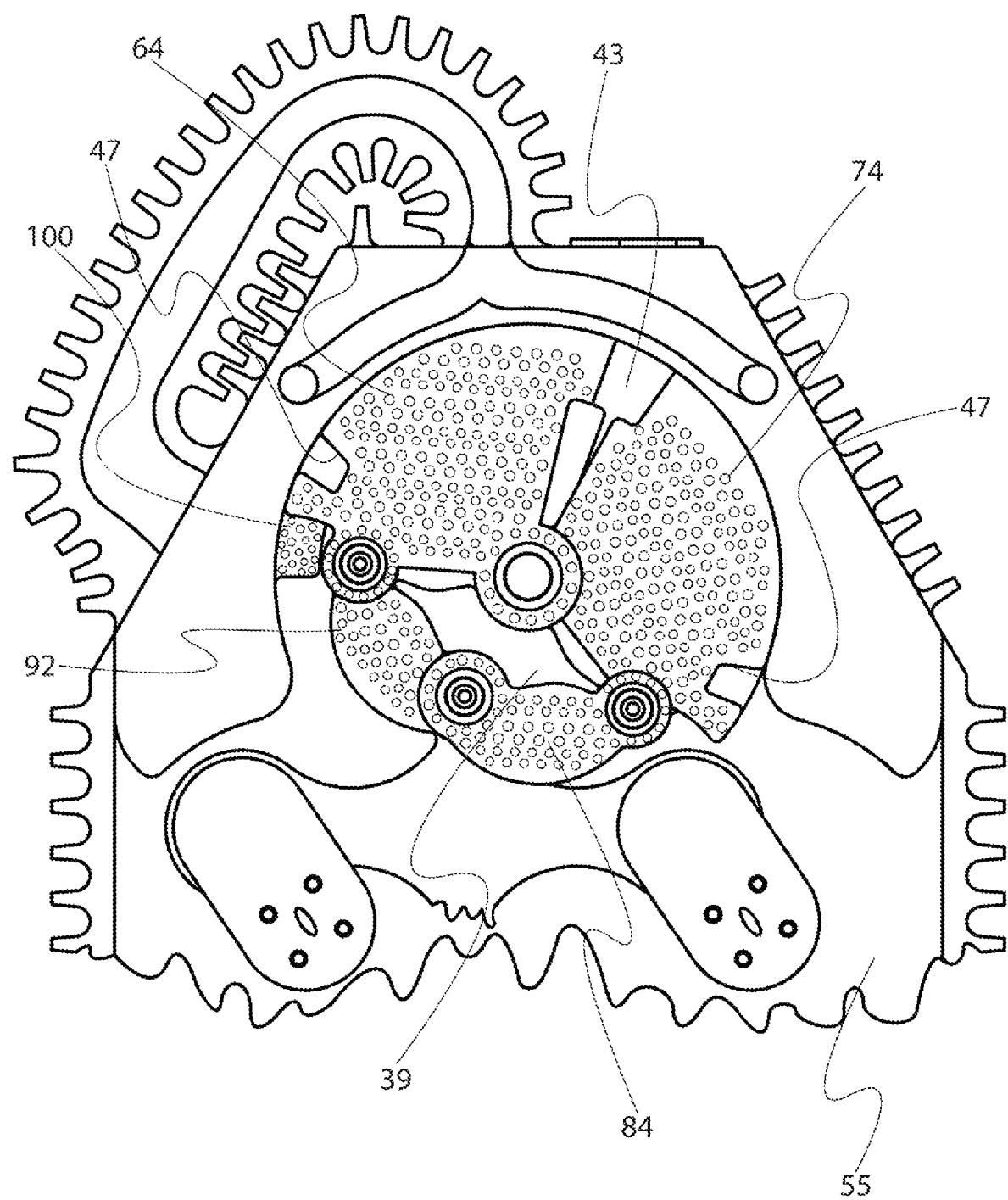
FIG. 7 is a plan view of a vane assembly, horseshoe, drive bar, crank and intercooler shown in FIG. 3 including a sealing system formed on the vane assembly and horseshoe.

With renewed reference to FIGS. 2, 3 and 4, the planar front and rear faces of the first, second, third and fourth vanes 65, 75, 85 and 93 are uniformly spaced from and parallel to the combustion chamber faces of the type-A and type-B side plates 31 and 32. With reference to FIG. 7, the planar front and rear faces of the four vanes may have fluid sealing systems 64, 74, 84 and 92 provided thereon, respectively. Similarly, the first and second internal supercharger bosses 102 and 103 may have a fluid sealing system 100 provided thereon. The fluid sealing systems 64, 74, 84, 92 and 100 may be comprised of a plurality of recesses or pockets separated by lands forming a field of pockets. Preferably, the pockets may be of like shape and dimension in terms of shape at the mouth, shape at the base, height, width, diameter, depth, and/or volume. Preferably, the pockets are formed in or on the surfaces of the referenced vanes and bosses. The pockets in the field may be arranged in at least one row, or more preferably, in a grid pattern consisting of two or more vertically spaced rows of pockets. The number, shape, size and arrangement of the lands and pockets in the field shown in the drawing figures was selected for ease of discussion and illustration and is not considered limiting.

A seal or seal equivalent may be produced over the expanse of the referenced vanes and bosses, from high pressure side to low pressure side, due to the presence of the pockets and lands arranged in an appropriate sealing system field. The seal or its equivalent may be generated as the result of the pressure difference of the working fluid between the high pressure side (e.g., combustion chamber 39 side) and the low pressure side (e.g., the outer chamber 55 side). For example, as the vane assembly moves, the pressure and temperature of the working fluid in the combustion chamber 39 may rise and produce a working fluid pressure differential between the combustion chamber 39 and the outer chamber 55. This pressure differential may cause the working fluid in the space between the vane assembly and the type-A side plate and the type-B side plate, i.e., the seal gap, to flow towards the outer chamber 55. Flow of the working fluid through the seal gap may induce a local Venturi effect at each pocket in the field, which may locally increase the speed and decrease the pressure of the working fluid. The speed and pressure change of the working fluid may be a function of the practical small clearance distance between the vane assembly and the type-A side plate and the type-B side plate.

The pockets preferably may have relatively sharp edges at the junction with the planar front and rear faces of the vanes, i.e., at the junction with the lands. As the working fluid flows over the sharp edge of a pocket, a decrease in local pressure may occur due to turbulence. As a result, the working fluid may expand creating a momentary decrease in pressure and an increase of localized turbulence. Further working fluid flowing over and into each successive pocket may begin a cycle wherein each pocket serves as a Helmholtz-like resonator or resonating column (dependent upon pocket shape deployed), which may cause the working fluid to be drawn into and expelled out of the pocket at a definable frequency creating further localized turbulence.

The resulting turbulence may be a function of the physical properties of the working fluid in the system and the diameter (or height and width), geometry, relational location, and depth of each individual pocket in the field. The resulting turbulence may also be a function of the practical small clearance distance or seal gap due to the ratio of the spatial volume above each land to the spatial volume above and within each pocket. This localized turbulence may interact with the flowing working fluid and generate a vortex motion that impedes further flow of the working fluid. The decrease in flow may momentarily decrease the resonance effect, which in turn may momentarily decrease the localized turbulence, which then may allow the flow rate of the working fluid to momentarily increase again.

When the vane assembly is progressing towards a minimum volume, the working fluid which has passed over the pockets in the upper most row (closest to the combustion chamber 39) may next encounter the pockets in the adjacent row of the pocket field where the described turbulence phenomena repeats, but at a lower starting pressure. This process may repeat as the working fluid passes over successive rows of the sealing system pocket field with successively relatively decreased starting pressure until the local pressure in the seal gap is reduced to the pressure level of the working fluid contained in the outer chamber 55. The repeating cycle of pressure reduction from pocket to pocket in the field may create a seal or the effective equivalent of a seal since no working fluid will flow past the point at which the local pressure in the seal gap is at or below the pressure of the working fluid in the outer chamber 55.

The localized turbulence at each pocket may decrease with time due to the gradual leaking allowed by the resonant action of the pockets. Therefore, the localized turbulence may also be a function of the rate of motion of the vane assembly relative to the type-A side plate and the type-B side plate. The effectiveness of the sealing system may require working fluid pressures that fluctuate to provide energetic flows into the sealing system field by providing a consistent flow in and out of the pockets, thereby maintaining the effectiveness of the sealing system.

The rate of the sealing system leakage may be modified by using different land spacing patterns and pocket geometries within the sealing system field. The land spacing may be selected to induce the pockets to provide counter flow to prior (upper) pockets while forward (lower) pockets may prevent fluid flow to induce internally decaying self-reinforcing oscillations within the sealing system field.

The effectiveness of the sealing system field for a particular application may be a function of the outside dimensions of the sealing system field in addition to the design parameters of the individual pockets. The seal efficiency may be improved by modifying the geometry of some or all of the pockets to include a convergent area at the inner base of the pockets and a divergent area at the mouth of the pockets. A de Laval nozzle effect may be produced at the pockets using a convergent area and a larger divergent area to form a resonant cavity at the bottom of the pockets, which may create greater localized turbulence due to localized supersonic working fluid movement.

It is appreciated that the field of pockets described as being formed on or in the surfaces of the referenced vanes and bosses may instead be formed on or in the surface opposing these surfaces in alternative embodiments. It is also appreciated that the field of pockets described as being formed on or in the surface of the referenced vanes and bosses may also be formed on or in the surface opposing the piston in addition to being formed on or in the surfaces of the vanes and bosses.

The effectiveness of the sealing systems described in connection with FIG. 7, may be improved by increasing the pressure in the outer chamber 55 above that of the ambient environment atmosphere. An external relative motion oscillating supercharger may be used to pressurize the outer chamber 55. Bleed off from regulating this outer chamber 55 may be fed into the internal supercharger passage to the intercooler to augment the cooled and compressed air volume available for the engine and to serve as exhaust gas recirculation for any combustion gasses which may escape into the outer chamber 55.

Figure 10:
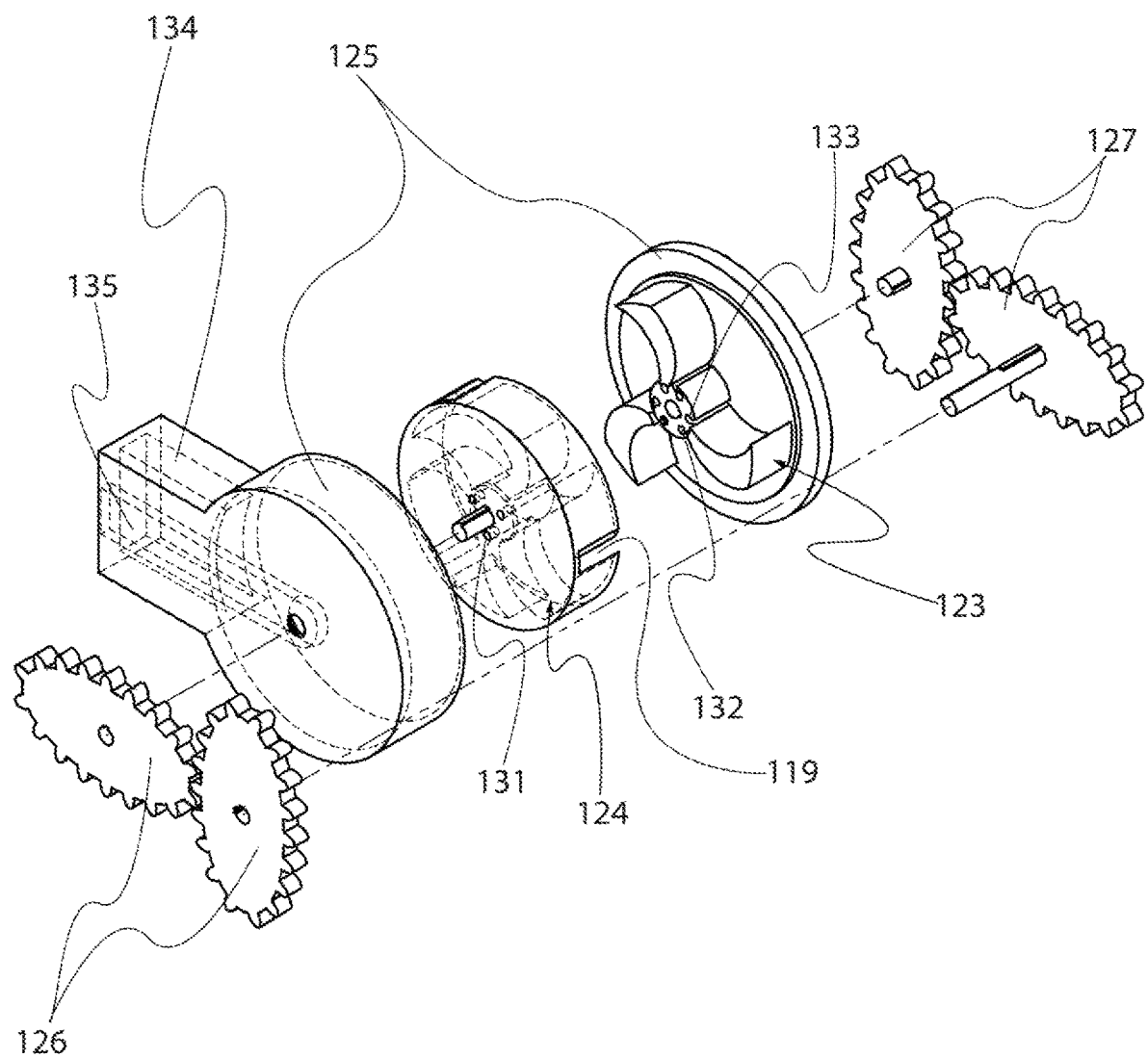
FIG. 10 is an exploded view of an example embodiment of an external supercharger that may be used with the engine shown in FIG. 1.

With reference to FIG. 10, an example embodiment of an external relative motion oscillating supercharger is illustrated. The external relative motion oscillating supercharger may be used to pressurize the outer chamber 55 via the supercharger port 57 (FIG. 3). Bleed off from regulating this outer chamber 55 may be fed into the internal supercharger passage 54 in the intercooler 52 via blow-off and transfer valve 122 to augment the cooled and compressed air volume available for the engine and to serve as exhaust gas recirculation for any combustion gasses which may escape into the outer chamber. The external supercharger may include an intake-exhaust manifold and cover 125, a front rotor 124, and a rear rotor 123. The manifold and cover 125 may incorporate an air inlet pocket and passage 134 and an exhaust passage 135. The rear rotor 123 may include three fins spaced at 120-degrees center-to-center with compressed air output slits 132, 133 and passages located around the center hub. The slits and passages 132, 133 in the rear rotor 123 line up with compressed air output passages 131 in the front rotor 124 hub when either group of chambers is near minimum volume. These compressed air output passages 131 in the front rotor 124 lead to the exhaust passage 135 in the intake-exhaust manifold and cover 125.

Three air intake slits 119 may be provided around the outside circumference of the front rotor 124 at equal distances from each other. The air intake slits 119 allow filtered fresh air to be pulled into the front rotor 124 from the large circular air inlet pocket and passage 134 within the intake-exhaust manifold and cover 125. Air may be pulled into one-half of the area between the fins on the front rotor 124, as the fins on the rear rotor 123 divide the three chambers in the front rotor 124 into three groups of mating half-chambers, for a total of six chambers. The rear rotor 123 may block the air intake slits 119 in the front rotor 124 when the fins of the rear rotor are at a center position in each of the three groups of half chambers, but reveal the intake slits 119 to a group of three half chambers when the other group of three half chambers are at a minimum volume.

The external relative motion oscillating supercharger may be driven using two sets of bi-lobe gears 126 and 127, otherwise known as elliptical or oval gears. The two supercharger components (i.e., the front rotor 124 and the rear rotor 123) may be geared at a 90-degree offset and the fins on the opposing rotors may located at a 60-degree displacement from each other. Accordingly, the supercharger shaft keys for the front rotor 124 and the rear rotor 123 may have a starting 30-degree offset from one-another. The bi-lobe gears 126 and 127 provide two alternating speeds in four areas and four areas of speed transition per input shaft rotation. The external relative motion oscillating supercharger could also be driven by an electronically controlled motion system, an oscillating mechanism, or by other gear types such as multi-lobe constant speed gearing, nautilus gears, or other gears which would allow the appropriate motion of the mechanism.

Figure 13:
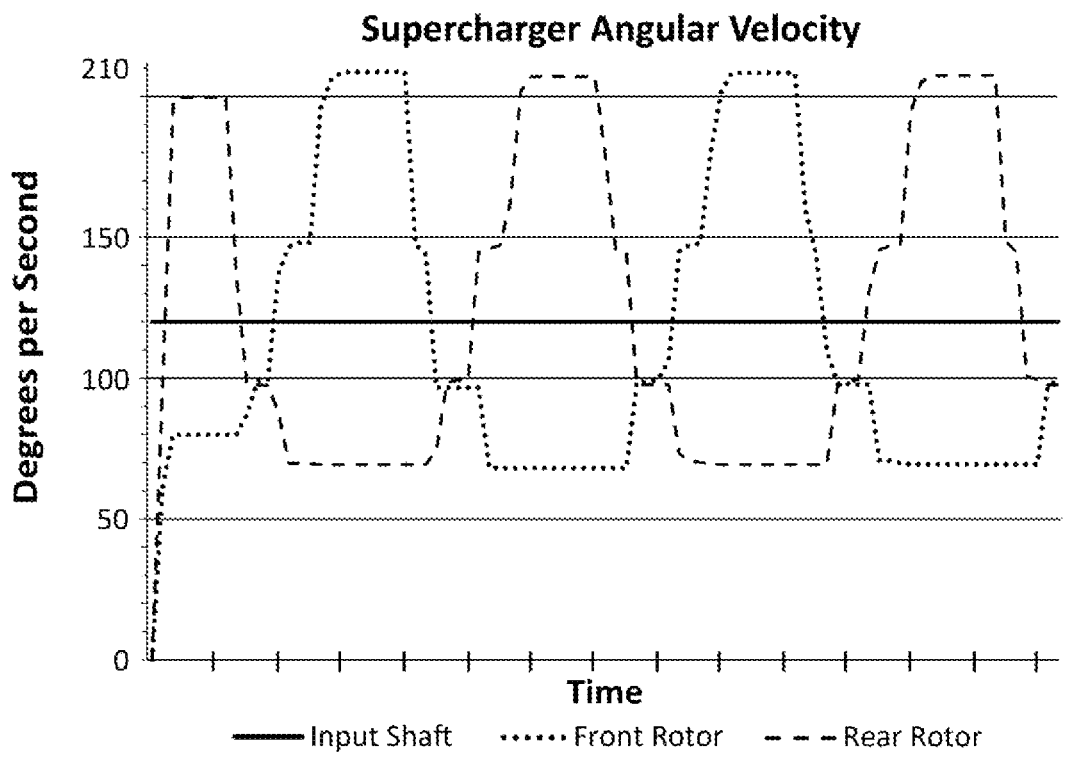
FIG. 13 is a prophetic graph of external supercharger angular position and clearance for the external supercharger shown in FIG. 10.
Figure 14:
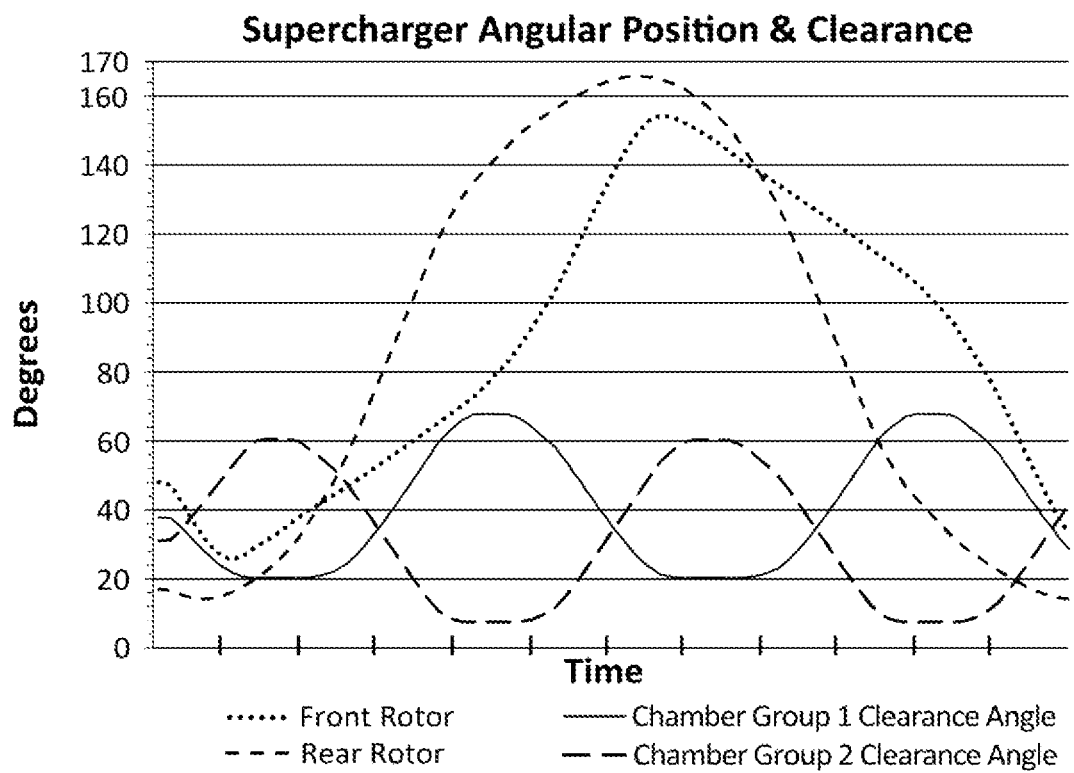
FIG. 14 is a prophetic graph of external supercharger angular velocity for the external supercharger shown in FIG. 10.

With reference to FIGS. 10, 13 and 15A-15C, the external relative motion supercharger may create a relative motion of the front rotor 124 fins and the rear rotor 123 fins by accelerating and decelerating each rotor between the two speeds provided by the gearing. Every time the two rotor angular velocity lines intersect as shown in FIG. 13, a first group of three of the six half chambers output compressed air at the half chamber minimum clearance angle as seen in FIG. 14. The minimum clearance angles shown in FIG. 14 translate to clearance distances of nearly zero between the front rotor 124 and rear rotor 123 fins due to the curved design of the fins themselves, which also accounts for the first group of half chambers appearing to have larger minimum angular clearances than the other group. In the simulation described by FIGS. 13 and 14, the input shaft was driven at 120-degrees-per-second, which would drive the supercharger parts at two speeds with the speed scaling factor being approximately 1.7 above and below the input speed. One input drive shaft rotation generates four compressed air output cycles from the groups with the chambers alternating every other from the six half chambers of the supercharger.

The output at the intersection of the front and rear rotor velocity lines is due to the chasing movement created where the front rotor 124 chases and catches the rear rotor 123, then the rear rotor 123 chases and catches the front rotor 124. During each chasing motion, air passes through the air intake slits 119 into the space between the front rotor and the rear rotor 123, and thereafter compressed between the rotors. This creates a pseudo or relative motion oscillation without having the one rotor start, stop, reverse, and stop constantly while the other rotor remains stationary. This allows the mechanism to conserve some momentum and increase the air output when compared with a piston compressor. Like a piston compressor, the compressed air output pulsing can be smoothed by using multiple chambers keyed at differing offset angles from the gear train to allow common gearing at a reduced cost but to create a more consistent and/or larger output volume and pressure.

Figure 15A:
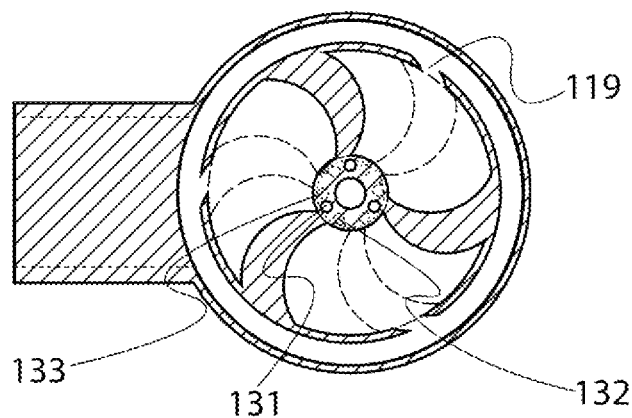
FIGS. 15A-15C are cross-sectional plan views of selected elements from FIG. 10 at different points of rotation.

With reference to FIG. 15A, the rear rotor fins are blocking the front rotor air intake slits 119 provided around the periphery of the rotor. Three half chambers are below atmospheric pressure if the design is equipped with one way valves (not shown) on the output passages or nearer to atmospheric pressure if it is not so equipped. The other three half of the chambers are at or slightly above atmospheric pressure. At this time, the front rotor is moving slowly and the rear rotor is moving briskly. As the drive shaft rotates counter-clockwise, the front rotor fins rotate clockwise. This causes three of the half chambers to intake air and the other three half chambers to begin compressing air.

Figure 15B:
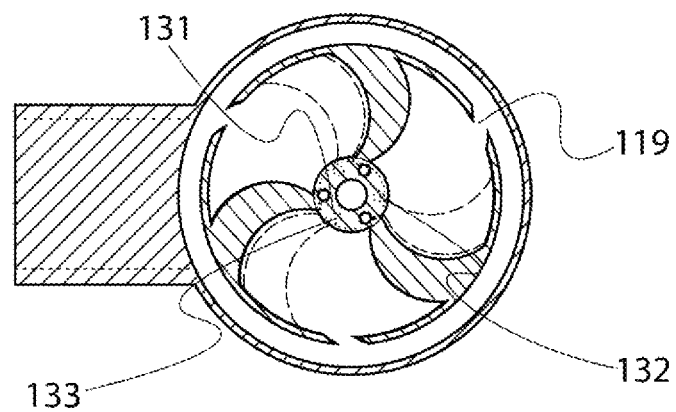

With reference to FIG. 15B, the front rotor is beginning acceleration and the rear rotor is almost completely decelerated. Air has been drawn in through the air intake slit 119 and fills the space between the rotors that is in communication with the air intake slits. At this time, the compressed air passages 132, 133 leading to the chambers in the rear rotor connect to the compressed air outlets 131 in the front rotor, causing the compressed air that has been compressed between the rotors to push through the compressed air outlets and through optional one-way valves (not shown). The new compressed air volume is added to the volume in the exhaust passage in the intake-exhaust manifold and cover.

Figure 15C:
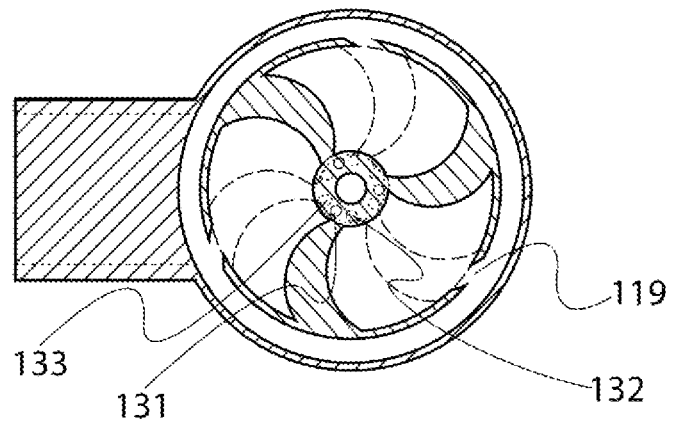

With reference to FIG. 15C, the rear rotor fins have rotated clockwise, blocking the front rotor 124 air intake slits 119. This begins the compression cycle for the second group of three half chambers and leads to a fresh air intake cycle for the previously compressed half chambers. At this time, the front rotor moves briskly and the rear rotor moves slowly. The compressed air passages 132, 133 leading to the chambers in the rear rotor connect to the compressed air outlets 131 in the front rotor as the drive shaft continues to rotate. This leads to a similar compression cycle and compressed air volume addition as previously described for the first group of half chambers. This process repeats so that three half chambers are outputting compressed air while the other three half chambers intake air.

Figure 16:
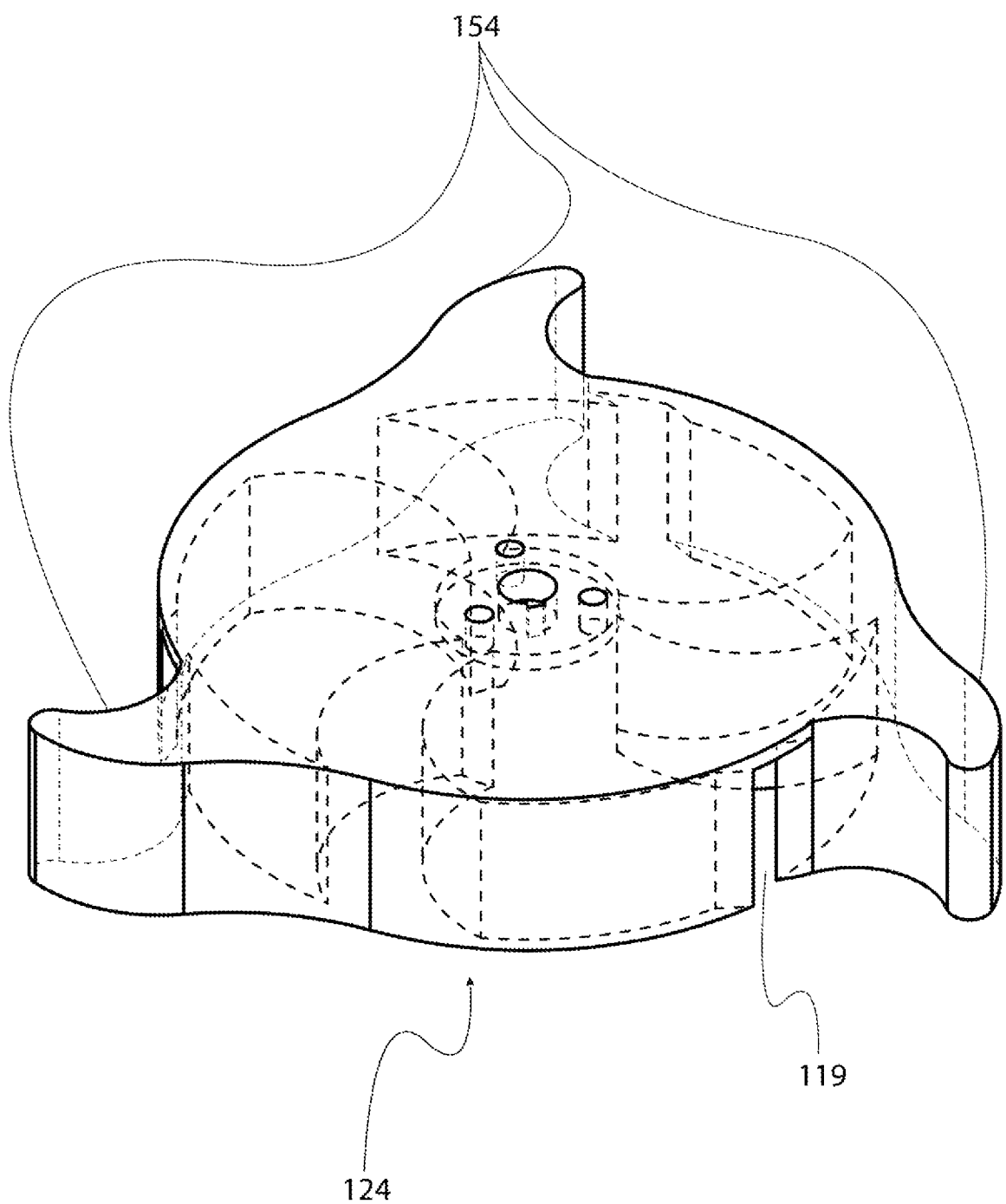
FIG. 16 is a pictorial view of an alternative embodiment external supercharger front rotor including a phantom illustration of internal chambers.

With reference to FIGS. 10 and 16, it may also be advantageous to shape the outside of the front rotor 124 with air directing ridges 154 adjacent to the air intake slits 119 to form an air fan/pump/compressor between the intake-exhaust manifold and cover and the front rotor 124. It may also be advantageous to employ one-way valves (not shown) on the intake slits 119 and on the compressed air output passages to increase the volume and pressure that the compressor can produce by allowing the chambers to intake for a longer period. These one-way valves may also be employed per group of three half chambers for reduced cost if the intake slit 119 number is increased from three to six with each intake slit being located at an offset distance from its original central location giving each half chamber a separate intake slit (not shown).

With reference to FIGS. 8A through 8D, in alternative embodiments, the spark plug(s) 138 may be mounted within one or more of the vanes, such as the type-A vane 65 and/or type-B vane 75. The spark plug 138 may be mounted within a vane to position the flame front propagation point near the center of the chamber. In order to do so, the energy required by the spark plug 138 must be delivered to it, and the spark plug must be serviceable.

Figure 8A:
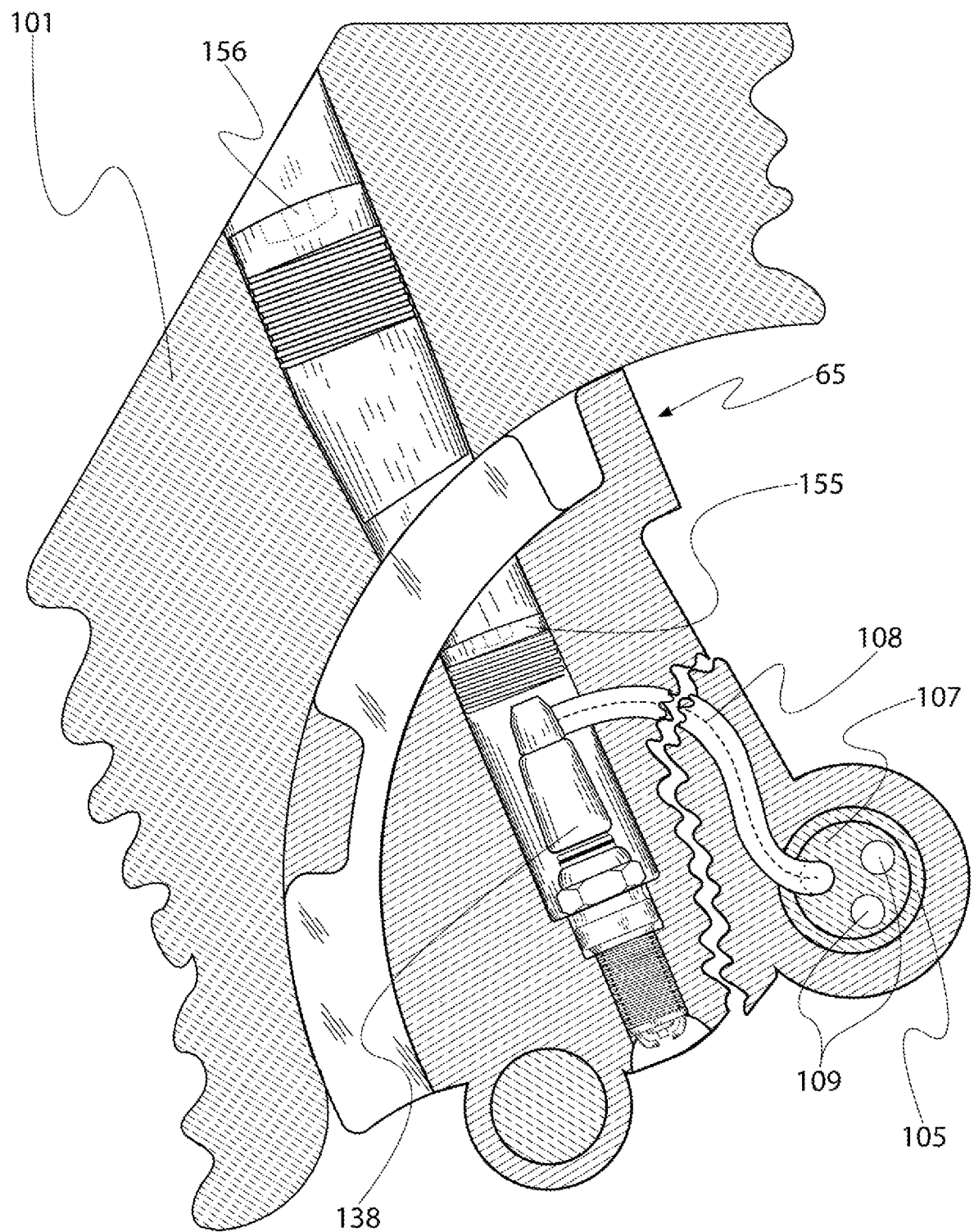
FIG. 8A is a cross-sectional view of the first vane and king pin shown in FIGS. 3, 5 and 7 illustrating spark plug or glow plug mounting and wiring in accordance with the first embodiment of the invention.

FIG. 8A illustrates an example spark plug 138 mounting in which the ignition pulse is delivered from the king pin 105 via a high voltage insulated wire 108 with potting 107 isolating the wire cavity from the king pin body and the oil passages 109. A first spark plug access cap 155 may be disposed in the type-A vane 65 and a second spark plug access cap 156 may be disposed in the horseshoe 101. The spark plug access caps 155 and 156 protect the spark plug 138 from contaminants. The wire 108 exits the king pin 105 and extends to the spark plug 138 through an opening in the type-A vane 65. The spark plug 138 may be replaced without disassembling the engine by rotating the engine to the proper crank angle to align the passage in the type-A vane 65 in which the spark plug 138 is mounted with a matching passage in the horseshoe 101. Once the passages are aligned, the spark plug access caps 155 and 156 may be removed providing access to the spark plug from outside of the horseshoe 101.

Figure 8B:
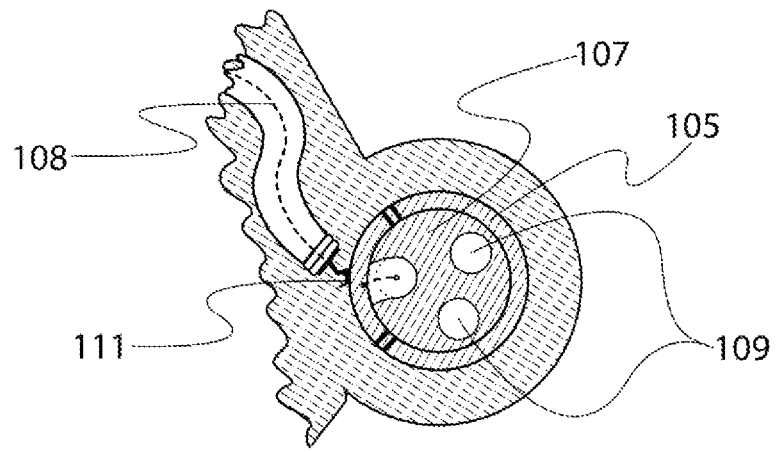
FIG. 8B is a cross-sectional view of the king pin shown in FIGS. 3, 5 and 7 illustrating spark plug or glow plug wiring in accordance with an alternative embodiment of the invention.

With reference to FIG. 8B, in an alternative embodiment, the wire 108 may be coupled to the spark plug 138 using a high-voltage brush/wiper contact assembly 111.

Figure 8C:
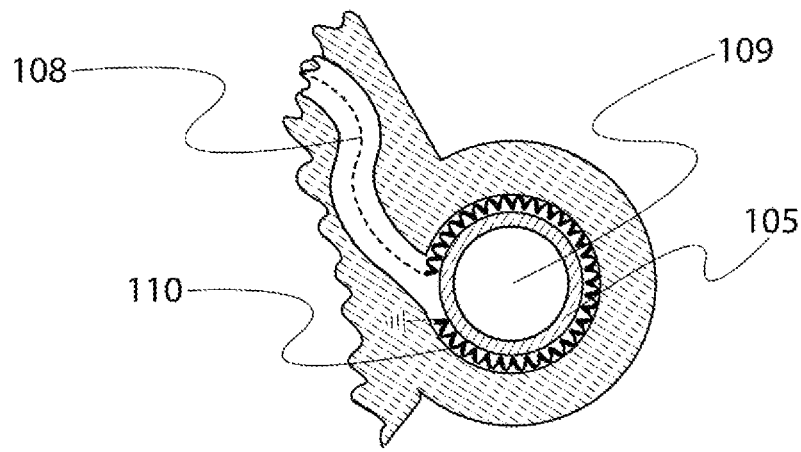
FIG. 8C is a cross-sectional view of the king pin shown in FIGS. 3, 5 and 7 illustrating spark plug or glow plug wiring in accordance with an alternative embodiment of the invention.

In another example, shown in FIG. 8C, the spark plug ignition energy may be transmitted by toroidal coil modules 110. The oil passage 109 is contained within the king pin 105. The coil may be grounded to the vane body and the positive side of the transformer may be coupled to the spark plug 138 via a spark plug wire 108. Energy is supplied to the matching toroidal coil modules 110 when a spark is to be output.

Figure 8D:
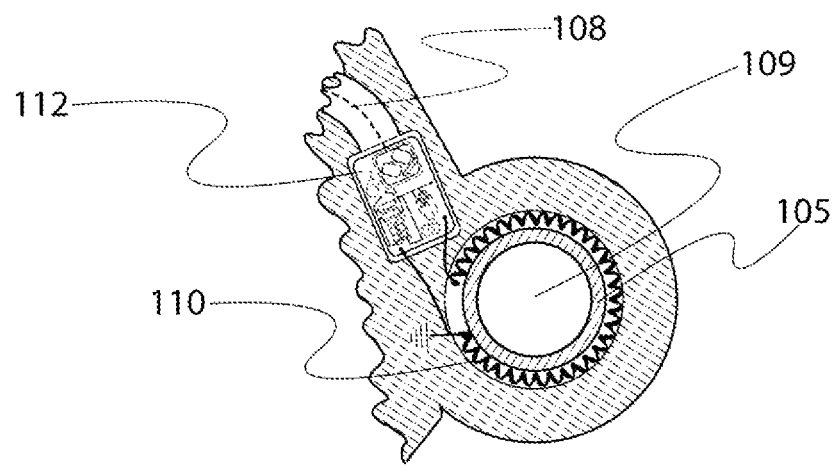
FIG. 8D is a cross-sectional view of the king pin shown in FIGS. 3, 5 and 7 illustrating spark plug or glow plug wiring in accordance with an alternative embodiment of the invention.

In yet another example, shown in FIG. 8D, continuous energy and data may be transmitted via toroidal coil modules 110. The coil may be grounded to the vane body and both sides of the transformer may be coupled to a spark module 112. This allows the spark module 112 to harnesses the continuous energy and read the high-frequency composite or differential data streams to supply a spark output from the module at the proper time(s) through a spark plug wire 108 attached to the spark plug 138. This configuration does not require additional ignition coils as this function is integrated into the module but it does require a more complex control system to supply the proper continuous energy and data stream to the module.

The motion of the engine described in connection with FIGS. 1-7 is illustrated in FIGS. 9A through 9I. The motion of crank 60 in this preferred embodiment is counter-clockwise with the twelve o'clock position defined as 0 crank degrees of rotation. The cranks 60 may be attached to the drive bar 62 in such a way that all of the cranks remain parallel as the cranks travel through their complete rotations. This crank 60 parallel motion may cause the drive bar 62 to translate in a purely circular path. The drive bar 62 and cranks 60 may clear the horseshoe at the horseshoe windage recesses (FIG. 3, 104) which helps to reduce air turbulence and encourage cooling of type-A side plate 31 and the type-B side plate 32. The circular translation motion is illustrated by progressive positions through 360 crank degrees of rotation in FIGS. 9A-9I.

Figure 9A:
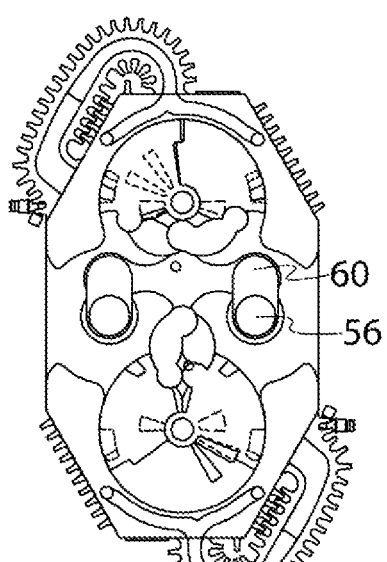
FIGS. 9A-9I are plan views of the FIG. 3 elements shown at different crank degree orientations.
Figure 9B:
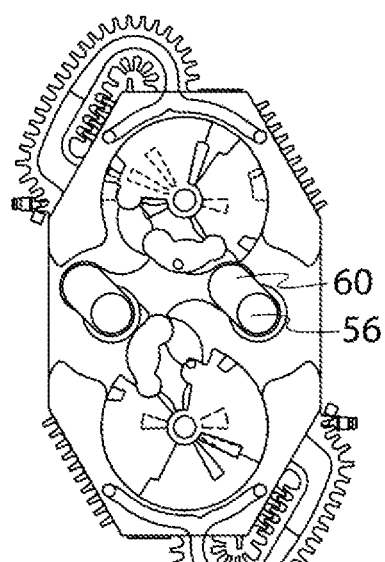
Figure 9C:
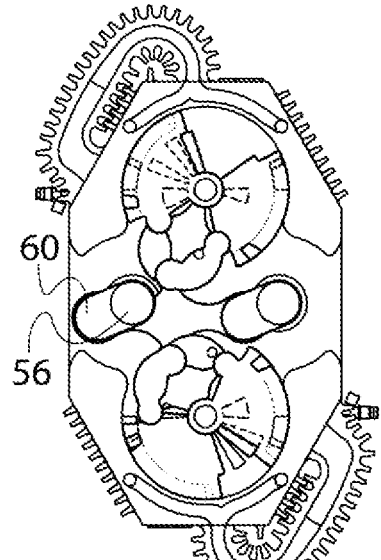
Figure 9D:
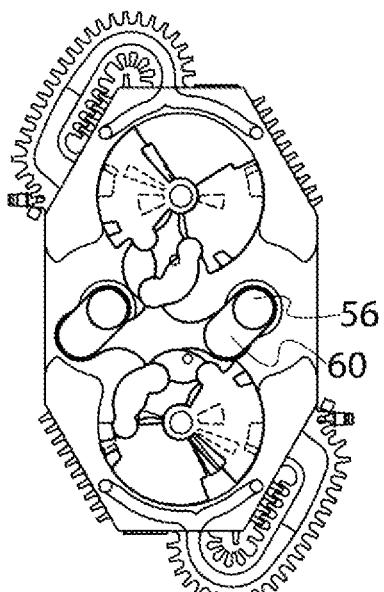
Figure 9E:
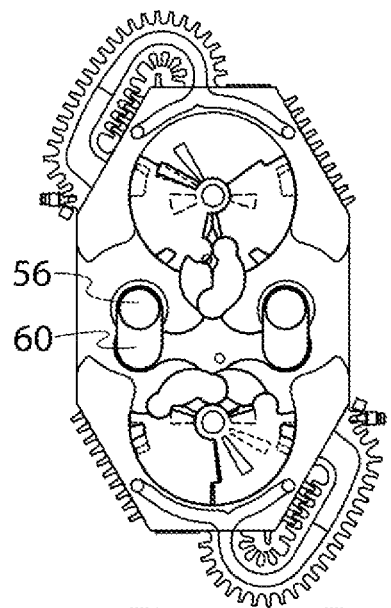

With reference to FIGS. 1-7 and 9A-9I, the motion of the example engine to provide the internal supercharger function may begin its cycle when the engine is cranked starting from about 180 crank degrees, as shown in FIG. 9E. At this engine position, filtered fresh air flows through openings in the type-A side cover 37 and the type-B side cover 38 into the internal supercharger air channels 48 in the type-A side plate 31. The air may flow over the type-A side plate 31, cooling the plate until it reaches the internal supercharger air inlets 49.

Figure 9F:
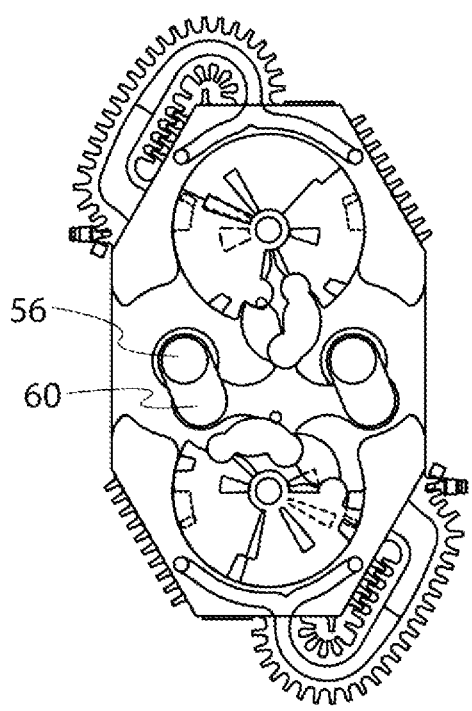
Figure 9G:
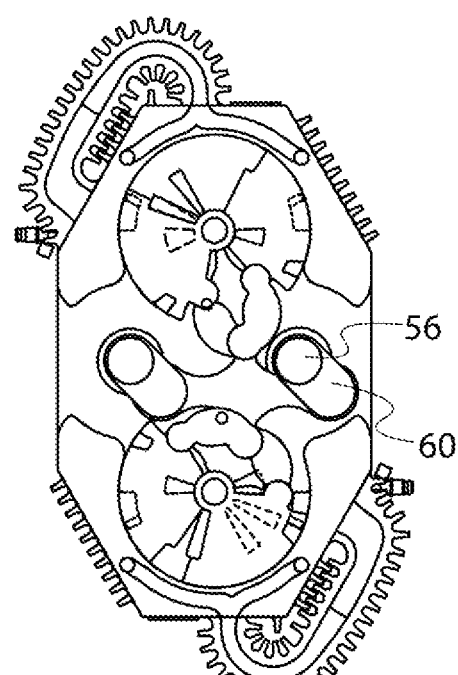
Figure 9H:
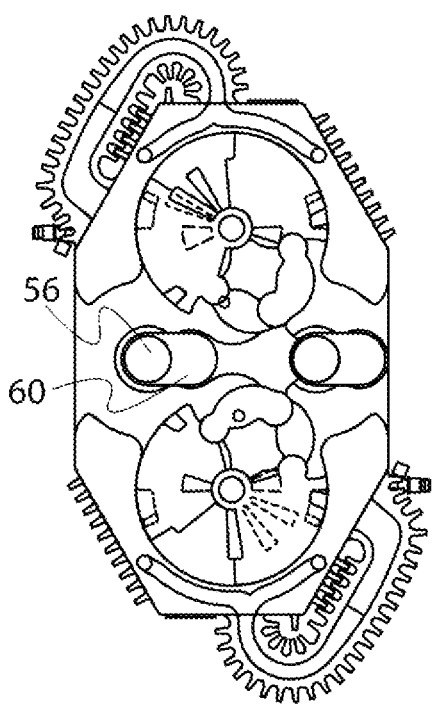
Figure 9I:
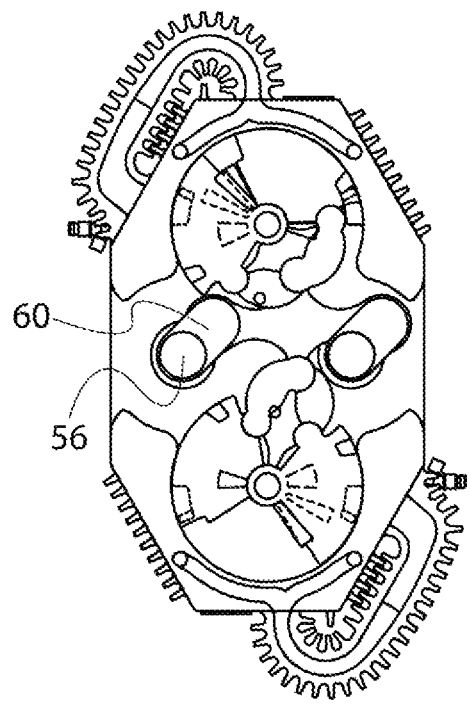

When the engine reaches about 315 crank degrees, as shown in FIG. 9I, the filtered fresh air flows from the internal supercharger air inlet 49 to the internal supercharger inlet slit 77 in the type-B vane 75, and from there into a first internal supercharger chamber 47. The flow may be encouraged since the internal supercharger chamber 47 may be below atmospheric pressure due to the chamber expansion motion during the pivoting motion of the type-B vane 75.

When the engine reaches about 45 crank degrees, as shown in FIG. 9B, the filtered fresh air flows from the internal supercharger air inlet 49 to the internal supercharger inlet slit 67 in the type-A vane 65, and from there into a second internal supercharger chamber 47. Again, the flow may be encouraged if the internal supercharger chamber 47 is below atmospheric pressure due to the chamber expansion motion during the pivoting motion of the type-A vane 65.

As the engine continues to crank, the type-A and type-B vanes 65 and 75 pivot away from each other so that the first and second internal supercharger chambers 47 steadily decrease in volume as the chambers advance toward the first and second internal supercharger bosses 102 and 103, respectively. The internal supercharger chamber 47 formed by the type-B 75 may be at full compression at about 135 crank degrees, as shown in FIG. 9D, and the internal supercharger chamber 47 formed by the type-A vane 65 may be at full compression at about 225 crank degrees, as shown in FIG. 9G.

When the internal supercharger chambers 47 are near their minimum volumes, the internal supercharger outlet slits 68 and 78 provide an egress for the compressed gasses in the chambers to flow into the internal supercharger outlet passages 50 in the type-B side plate 32. The internal supercharger outlet passages 50 connect to the internal supercharger compressed air passage 51 in the horseshoe 101, the first intercooler passage 53 in the type-A side plate 31, and the second intercooler passage 54 in the type-B side plate 32. These passages (51, 53 and 54) extend through the intercooler 52, which cools the compressed air. The internal supercharger compressed air passage 51 also may provide a small flow of blowdown air through the heat engine blowdown port 46 located on the bottom of the type-A side plate 31 for the heat engine chamber 43 when uncovered by the type-B vane 75 (i.e., when the type-A vane 65 and the type-B vane 75 are positioned to the right most rotational position above the king pin 105 with the heat engine chamber 43 volume at a maximum value).

As the engine continues to crank for the generation of positive power, the air pressure in the intercooler 52 and the outer chamber 55 may increase. The cooled compressed air drawn in from the intercooler 52 via the type-B side plate 32 intercooler passage 54 has an appropriate amount of fuel added by port injector 136 at the appropriate time or times on the way to the combustion charge inlet port 40 to allow for proper fuel vaporization and atomization to create an appropriate charge.

At about 45 crank degrees, as shown in the upper half of FIG. 9B, the combustion charge inlet port 40 is revealed to the combustion chamber 39 at the full port open position of the charge intake stroke. The charge may be drawn through the combustion charge inlet port 40 in the type-B side plate 32 and over type-A combustion compression wedge 70 into the combustion chamber 39. The combustion chamber 39 progresses through about 90 crank degrees where the combustion chamber is at the piston equivalent of bottom dead center and approximately maximum intake volume. The charge is fully loaded into the combustion chamber 39 and the combustion charge inlet port 40 in the type-B side plate 32 is mostly covered by the type-A vane 65. The cranks 60 are at an inflection point at which the momentum of the attached components must provide proper carry through to keep the engine running through this position.

When the engine reaches about 112.5 crank degrees, as shown in the upper half of FIG. 9C, the charge is fully loaded into the combustion chamber 39, the combustion charge inlet port 40 in the type-B side plate 32 is fully covered by the type-A vane 65, and the combustion chamber 39 begins to compress the charge.

When the engine reaches about 135 crank degrees, as shown in the upper half of FIG. 9D, the combustion chamber 39 is nearing full compression and is ready for spark plug ignition. The spark plug 138 ignites the charge while carry through of the component masses continues to compress the burning charge and increase turbulence with squish and swirl encouraged by the type-C and type-D gas guide slits 90 and 98 provided in the type-C side bosses 86 and type-D side boss 94, respectively. Alternately, the spark plug 138 or a second spark plug could be provided to ignite the charge at a later crank angle or even within a vane (see FIGS. 8A-8D).

When the engine reaches about 180 crank degrees as shown in the upper half of FIG. 9E, which is at the piston equivalent of top dead center, the ignited charge in the combustion chamber 39 may be at maximum compression. The ignited charge may be pushed into intimate contact with the exposed surface area of the vanes in the combustion chamber 39 with very little surface area of the type-A and type-B side plates 31 and 32 exposed to the ignited charge. At this point, the combustion chamber 39 is at or near maximum compression, the type-A combustion compression wedge 70 is near the type-B combustion compression wedge 80, and the type-C combustion compression boss 89 is near the type-D combustion compression boss 97. The cranks 60 are again at an inflection point when the momentum of the engine components must provide proper carry through to keep the engine running through this position.

When the engine reaches about 202.5 crank degrees, as shown in the upper half of FIG. 9F, the combustion chamber 39 is starting expansion. At this time, the charge continues to burn and expands in the combustion chamber 39 allowing the conversion of chemical energy into thermodynamic energy to increase the chamber pressure and push the combustion chamber open at the free pivot points. This is accomplished by pivoting the type-B vane 75 relative to the type-C vane 85 at the type-A wrist pin 114, and by pivoting the type-A vane 65 relative to the type-D vane 93 at the type-B wrist pin 116, which draws the drive bar 62 upwards at drive bar wrist pin 118 connection to the type-C vane 85 and the type-D vane 93. The cranks 60 may be positioned at useful geometric locations in that they are offset from the centerline of the king pin 105 to allow the forces to be efficiently converted into torque. The cranks 60 also may be set at a shallow angle from the centerline of the king pin 105 at this time which may allow the amount of pressure being generated to be efficiently added to the momentum of the components to generate useful torque.

When the engine reaches about 225 crank degrees, as shown in the upper half of FIG. 9G, the combustion chamber 39 may be about half way through the expansion stroke. The charge continues to burn and to expand in the combustion chamber 39 at this time, allowing the thermodynamic energy to continue to be converted into useful torque via pressure acting on the internal surface area of the vane assembly which pulls the drive bar 62 upward and drives the crank 60 counter-clockwise.

When the engine reaches about 270 crank degrees, as shown in the upper half of FIG. 9H, which is at the piston equivalent of bottom dead center, the combustion chamber 39 is at approximately maximum expansion volume. The charge is nearly completely expanded and beginning to transfer the hot exhaust gasses through the revealed combustion exhaust port 41 into the transfer channel 42 on the non-combustion chamber side of the type-B side plate 32. The exhaust gasses pass from the transfer channel 42 into the heat engine chamber 43 via the heat engine inlet port 44 and around the heat engine deflection projection 69. The size and shape of the transfer channel 42 may be tailored to control generated pressure and acoustic waves and to control the pressures in the combustion chamber 39 and the heat engine chamber 43. The cranks 60 are again at an inflection point. The exposed vane surfaces in the combustion chamber 39 and the heat engine chamber 43 begin to compress the exhaust gasses. This further increases the temperature of the gasses and also pressurizes the transfer channel 42.

Figure 11:
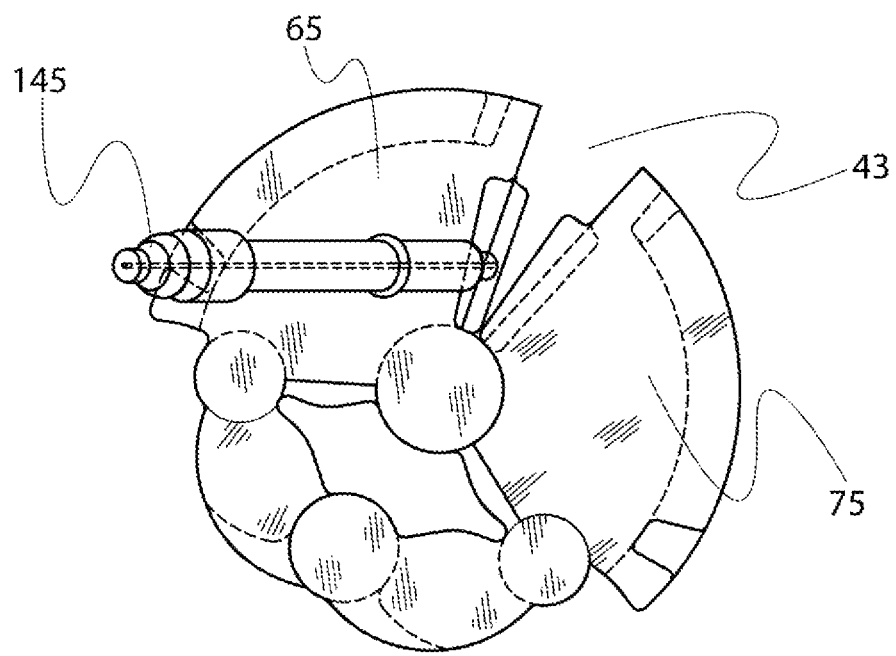
FIGS. 11 and 12 illustrate the placement of an example water injector relative to a vane assembly and a side plate in the engine shown in FIG. 1.
Figure 12:
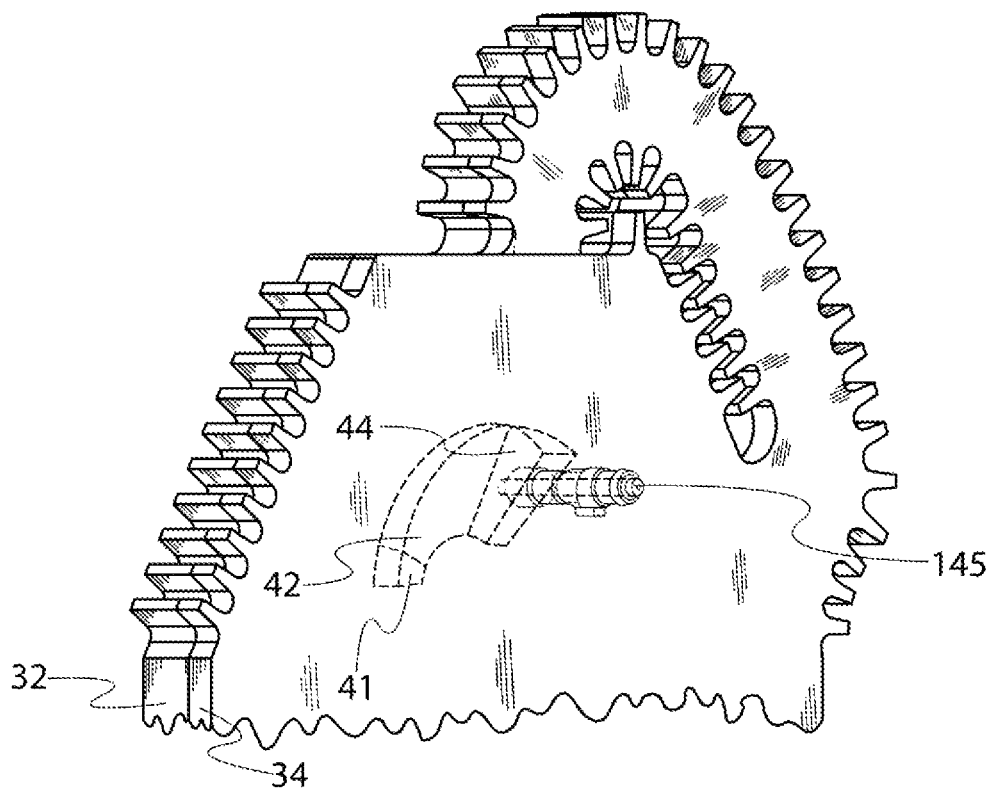

With reference to FIG. 11, the engine may include a water injector 145 having an injector end that communicates with the heat engine chamber 43 between the type-A vane 65 and the type-B vane 75. The water injector 145 may be activated near this crank angle, for example (and/or other crank angles) to mist water vapor into the hot exhaust gasses in the heat engine chamber 43 one or more times per engine cycle. The water may nearly instantly flash to steam and significantly increase the heat engine chamber 43 pressure and also cool the chamber to further increase efficiency. With reference to FIG. 12, in an alternative embodiment, the water injector 145 may extend through the type-B end plate 34 and into the type-B side plate 32 to provide water to the transfer channel 42 extending between the combustion exhaust port 41 and the heat engine inlet port 44 in the type-B side plate.

When the engine reaches about 315 crank degrees, as shown in FIG. 9I, the heat engine chamber 43 is nearly done receiving hot gasses from combustion chamber 39. Both the combustion chamber 39 and the heat engine chamber 43 ports are narrowed and the vanes continue to compress the hot gasses in both chambers, which also increases the pressure of the gasses which will be stored in the transfer channel 42 until later in the heat engine cycle. The transfer channel 42 can be anodized or otherwise treated to decrease the heat transfer rate between the available surface area in the channel and the gasses, which allows the gasses to retain their heat and pressure.

When the engine reaches about 0 crank degrees, as shown in the upper half of FIG. 9A, which is at the piston equivalent of top dead center and minimum parasitic volume, the exhaust gasses remaining in the combustion chamber 39 are in intimate contact with the vane surfaces with very little of the type-A side plate 31 and the type-B side plate 32 exposed, allowing these gasses to begin cooling via the vanes. The combustion charge inlet port 40 is beginning to communicate with the combustion chamber 39 and the combustion exhaust port 41 is still communicating with the combustion chamber and connected to the transfer channel 42, but the heat engine inlet port 44 is blocked. Some of the intake air may blow down some of the remaining exhaust gasses and further pressurize the transfer channel 42 before it is blocked off from the combustion chamber 39. The heat engine chamber 43 may attain full compression with minimum volume and is halfway through the pivoting phase before starting expansion. The cranks 60 are again at an inflection point. The combustion chamber 39 may continue to cycle through these strokes repeatedly.

With regard to the heat engine function of the engine, when the engine reaches about 45 crank degrees, as shown in the upper half of FIG. 9B, the heat engine expansion cycle begins. At this engine position, more exhaust gas pressure and thermal energy may be recovered by allowing the heat engine chamber 43 to increase the overall expansion stroke to increase the engine efficiency. If the engine includes a water injector 145, it may be activated near this crank angle, for example, to flash water droplets to steam and increase the heat engine chamber 43 pressure and cool the chamber to further increase efficiency (see FIG. 11).

When the engine reaches about 112.5 crank degrees as shown in the upper half of FIG. 9C, the gasses in the heat engine chamber 43 may still be expanding. At this time, compressed air may be injected via a passage leading from the supercharger compressed air passage 51 to the heat engine blowdown port 46 in the type-A side plate 31 to help increase pressure and to decrease temperature during expansion. The engine blowdown port 46 may also have an optional control valve (not shown) incorporated within it to allow the engine control system to modify the timing and/or volume of blowdown.

When the engine reaches about 135 crank degrees as shown in the upper half of FIG. 9D, the heat engine chamber 43 may still be expanding and injecting compressed blowdown air. Around this point, the heat engine chamber 43 may reconnect with the transfer channel 42 as the type-A vane 65 reveals the heat engine inlet port 44. This may introduce some further thermodynamic energy from the last of the pressurized exhaust gasses combined with some blowdown from the combustion chamber 39 which was stored when the combustion exhaust port 41 was still open but the heat engine inlet port 44 was closed as seen at 0 crank degrees in FIG. 9A.

When the engine reaches about 180 crank degrees, as shown in the upper half of FIG. 9E, the heat engine chamber 43 may still be expanding and the heat engine blowdown port 46 in the type-A side plate 31 may be nearly blocked off by the heat engine deflection projection 79. At this time, the transfer channel 42 may still communicate with the heat engine chamber via the heat engine inlet port 44, and the heat engine exhaust port 45 may start to be revealed to the heat engine chamber. At this point, a reduced flow of compressed air may blowdown through the heat engine chamber 43 and out the heat engine exhaust port 45 into the exhaust pipe 130 connected to the exhaust opening 129.

When the engine reaches about 202.5 crank degrees, as shown in the upper half of FIG. 9F, the heat engine blowdown port 46 may be blocked and the heat engine exhaust port 45 may be fully revealed to the heat engine chamber 43. As the type-B vane 75 pivots toward the heat engine exhaust port 45, exhaust gasses may be driven out of the heat engine chamber 43 through the heat engine exhaust port 45. This may create momentum in the gas flow which assists in the evacuation of the chamber. This evacuation can be further assisted by using a tuned exhaust and/or a divergent-convergent chamber on the exhaust to create reflected pressure waves, reflected acoustical waves, and/or resonance in a manner similar to the method employed on a two-stroke cycle piston engine.

When the engine reaches about 225 crank degrees, as shown in the upper half of FIG. 9G, the heat engine may complete its exhaust cycle by beginning to close the heat engine exhaust port 45 and continuing to drive exhaust gasses out as the type-A vane 65 and the type-B vane 75 pivot toward each other. This pivoting motion decreases the volume of the heat engine chamber 43. The heat engine inlet port 44 and exhaust port 45 may be located selectively to cause a slight parasitic compression of any residual exhaust gasses within the heat engine chamber 43 before the next heat engine cycle begins.

The engine described in connection with FIGS. 1-7 includes two externally accessible crankshaft assemblies, and two engine layers each having two vane assemblies defining two variable volume combustion chambers 39 per layer. The engine described in FIGS. 1-7 also incorporates two supercharger chambers 47 per vane assembly, as well as one heat engine chamber 43 per vane assembly. It is appreciated that alternative embodiments of the invention may have more or fewer crankshaft assemblies. It is also appreciated that alternative embodiments may include variable volume chambers, such as those described in FIGS. 1-7 as a combustion chamber, supercharger chambers, and a heat engine chamber, that are used to pump fluids, or for other functions, instead of being used for combustion, supercharging, and heat engine operation, respectively. It is also appreciated that such alternative embodiments may include more or fewer than two layers of vane assemblies, and more or fewer than two vane assemblies per layer. It is also appreciated that such alternative embodiments may include one or more variable volume chambers of the type described in the FIGS. 1-7 embodiment as a combustion chamber, a supercharger chamber, and a heat engine chamber.

Figure 18:
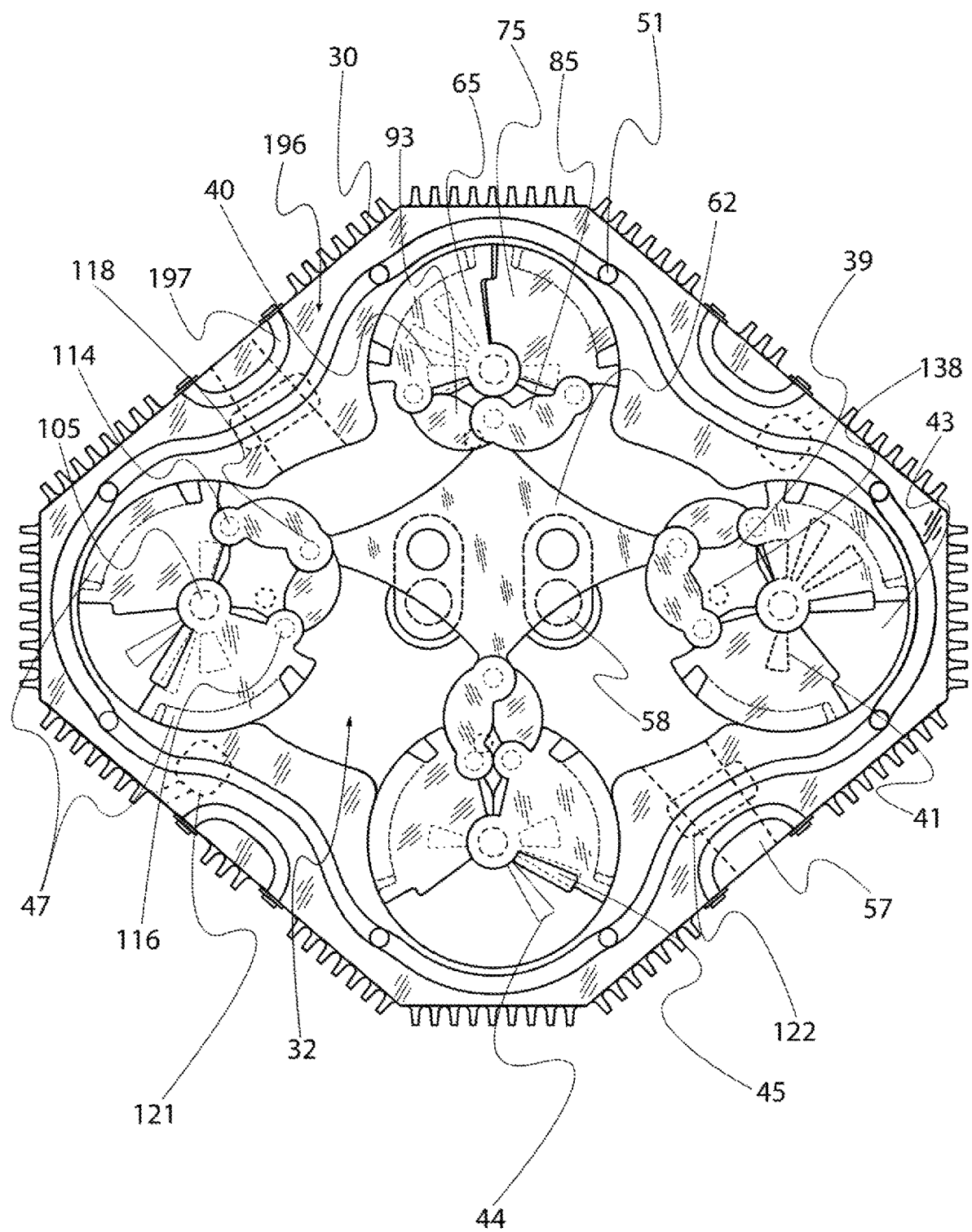
FIG. 18 is a plan view of, inter alia, four vane assemblies as arranged and interconnected in an alternative embodiment of the invention.

For example, with reference to FIG. 18, each layer of an alternative embodiment variable volume chamber device is illustrated. The device may include a type-B side plate 32 provided with spark plugs 138 and four sets of vane assembly ports and passages, each including a combustion charge inlet port 40, a combustion exhaust port 41, a heat engine inlet port 44 and a heat engine exhaust port 45. The device also includes cooling fins 30 disposed along an outer edge of a wrap-around horseshoe 196. Intercooler fluid passages 197 and supercharger compressed air passages 51 may be provided in the horseshoe 196. An external supercharger inlet passage 57 also may extend through the horseshoe 196 from an ambient environment side to the outer chamber defined in part by the type-B side plate 32. A blow-off passage and valve 122 may connect the external supercharger inlet passage 57 to the internal supercharger compressed air passage 51. A blow-off passage and valve 121 may connect each internal supercharger compressed air passage 51 to the ambient environment. The device may further include four vane assemblies each having a type-A vane 65, a type-B vane 75, a type-C vane 85, and a type-D vane 93, connected together with a king pin 105, a type-A wrist pin 114, a type-B wrist pin 116 and a drive bar wrist pin 118. The vane assemblies may define two variable volume supercharger chambers 47 each, as well as a combustion chamber 39 and a heat engine chamber 43. The vane assemblies may be connected to two internal crankshafts via a drive bar 62. Each variable volume chamber 39 may be rotated 90 degrees more than the previous chamber progressing clockwise around the device layout. The variable volume chamber 39 at the twelve o'clock position is in the parasitic compression phase (0 crank degrees), the variable volume chamber 39 at the nine o'clock position is at complete expansion and starting the exhaust phase (270 crank degrees), the variable volume chamber 39 at the six o'clock position is in full compression phase (180 crank degrees), and the variable volume chamber at the three o'clock position is at nearly complete intake phase at maximum volume (90 crank degrees). This arrangement may have improved balanced as compared with the embodiment illustrated in FIGS. 1-7 and may be more efficient for applications requiring four or more chambers.

Figure 19:
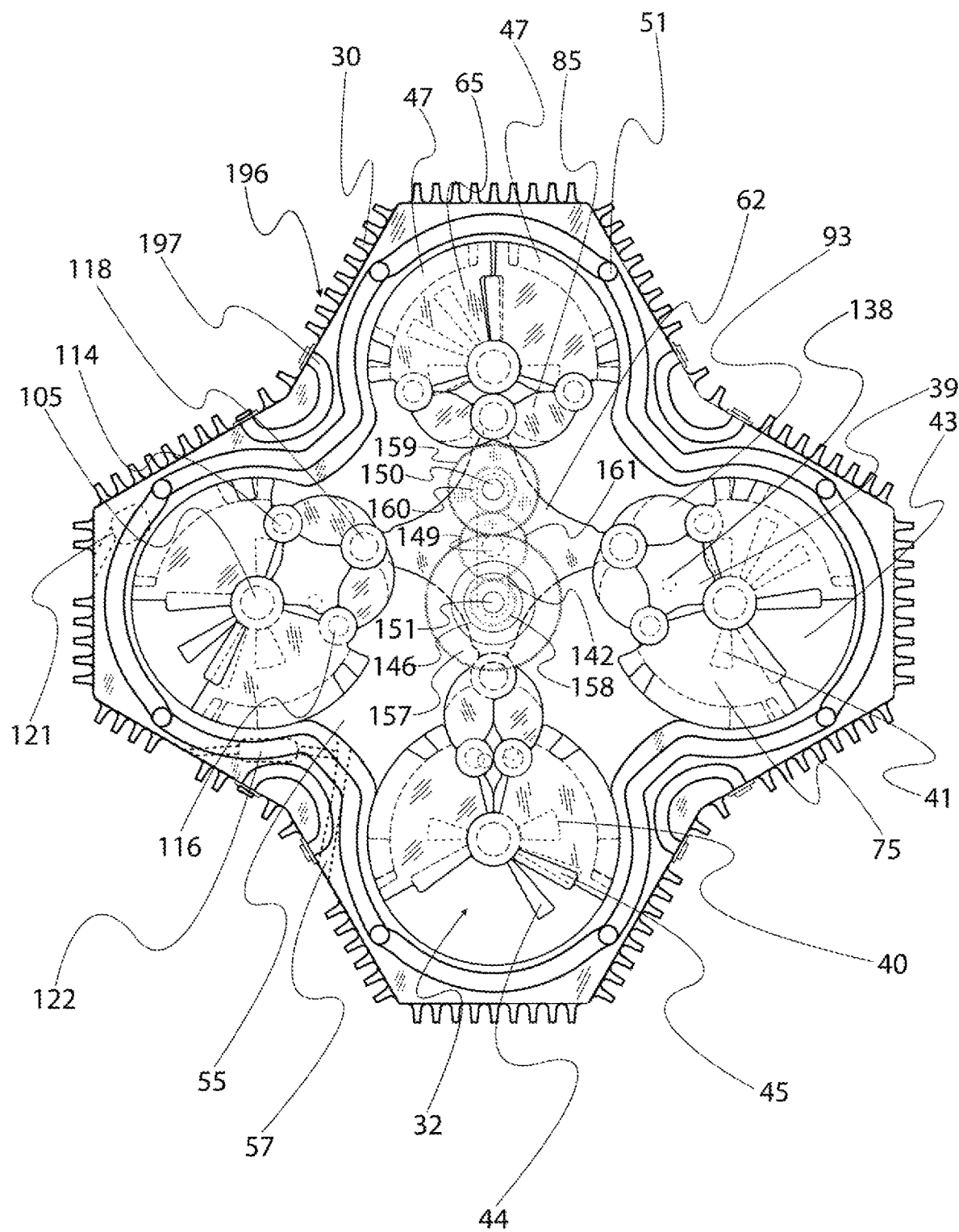
FIG. 19 is a plan view of, inter alia, four vane assemblies as arranged and interconnected in an alternative embodiment of the invention.
Figure 20:
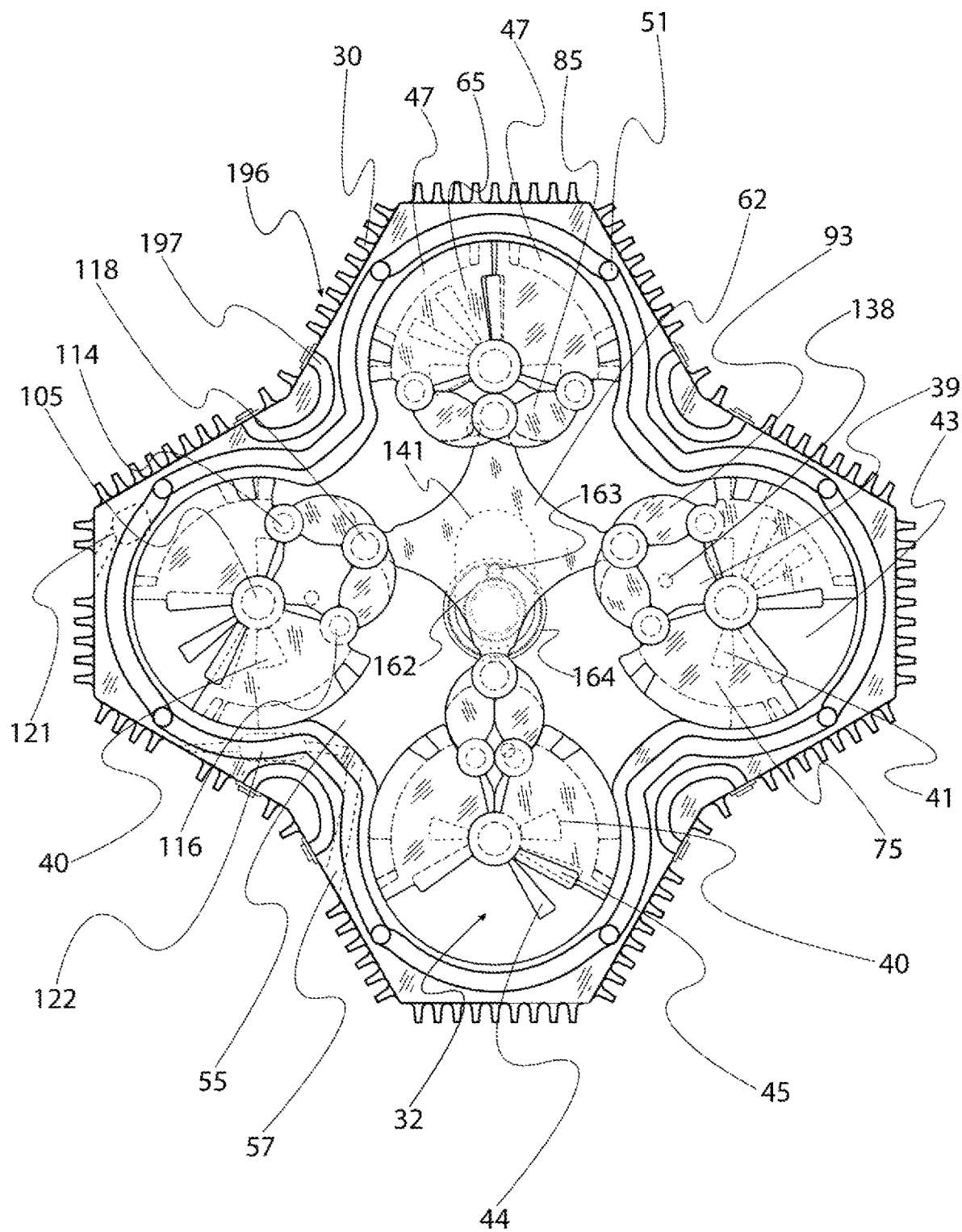
FIG. 20 is a plan view of, inter alia, four vane assemblies as arranged and interconnected in an alternative embodiment of the invention.

FIGS. 19 and 20 illustrate two more alternative embodiments of variable volume chamber devices that include four vane assemblies defining four sets of two variable volume supercharger chambers 47, as well as a combustion chamber 39 and a heat engine chamber 43, like that of FIG. 18. The FIGS. 19 and 20 embodiments differ from the FIG. 18 embodiment in that they incorporate a single crankshaft 146, and gear assemblies (shown in FIGS. 22A and 22B) that limit the motion of the drive bar 62 by providing counter-spin during the crank 142 motion of the single crankshaft 146. The gear assemblies may cause the drive bar 62 to follow a circular path while maintaining the same orientation relative to the center of the crankshaft 146 and the vane assemblies.

Figure 22A:
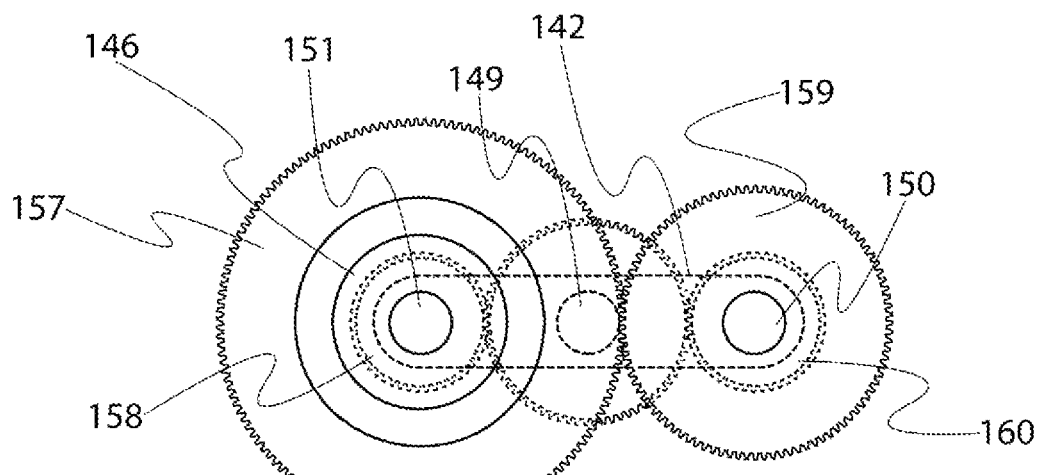
FIGS. 22A-22C illustrate example gear assemblies used in alternative embodiments of the invention.

The gear assembly shown in FIG. 19 is illustrated in more detail in FIG. 22A. With regard to FIGS. 19 and 22A, the gear assembly may include a type-A sun gear 157 that is mounted concentric, but not interfacing, with a type-A concentric crankshaft 146. The type-A sun gear 157 may be rigidly affixed to a side plate (not illustrated) so that it cannot rotate relative to the overall device. The crank 142 may be rigidly affixed to the type-A concentric crankshaft 146. A type-A planet gear 159 may be affixed to a type-B shaft 150 and enmeshed with the type-A sun gear 157. The type-B shaft 150 may extend through the crank 142 and attach to a type-B planet gear 160 causing both the type-A planet gear 159 and the type-B planet gear 160 to rotate synchronously. A type-C planet gear 161 may be attached to a free spinning type-A shaft 149 held by the crank 142 and enmeshed with the type-B planet gear 160. The type-C planet gear 161 may be rigidly mated to the drive bar 62 in such a manner as to restrict the drive bar motion via imbued counter-spin and allow it to translate without rotation about the circular path provided by the single crank's motion. The type-B sun gear 158 may be enmeshed with the type-C planet gear 161 and be attached to the crank 142 on a type-C shaft 151 which is concentric, but not synchronized, with the type-A concentric crankshaft 146.

The crank 142 rotation may cause the type-A planet gear 159 to rotate over the fixed teeth of the type-A sun gear 157. The type-A planet gear 159 in turn may drive the type-B planet gear 160 in sync due to the common enmeshed shaft between them. The type-B planet gear 160 may drive the type-C planet gear 161, which creates the proper counter-spin on the type-C planet gear 161 and also drives the type-B sun gear 158. The final gear ratio for the type-A sun gear 157 to the type-C planet gear 161 may be set at 1:1 to induce the proper counter-spin. The type-B sun gear 158 should be allowed to freely rotate to induce the balanced forces necessary for proper counter-spin on the type-C planet gear 161.

Figure 22B:
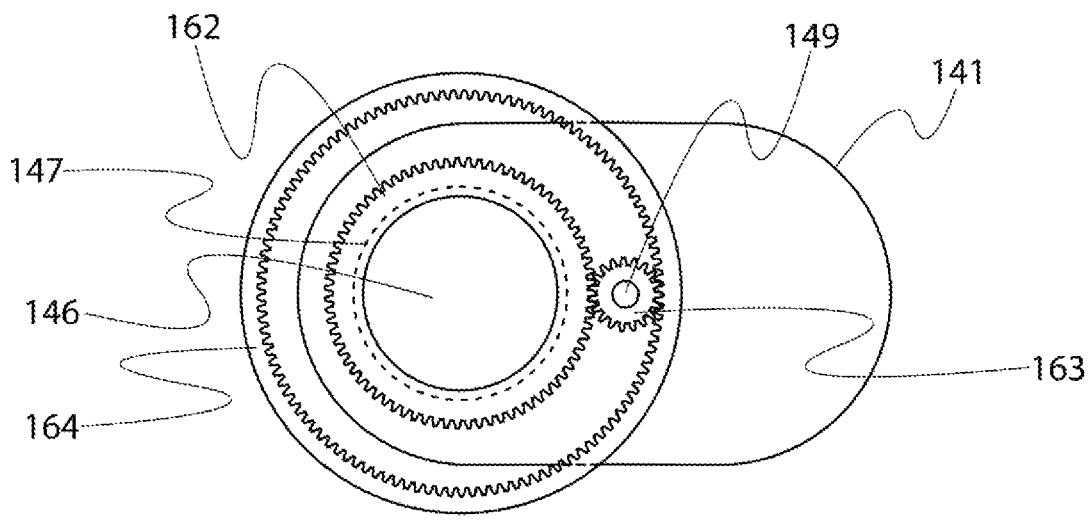

The gear assembly shown in FIG. 20 is illustrated in more detail in FIG. 22B. With regard to FIGS. 20 and 22B, the gear assembly may include two concentric shafts, specifically an inner type-A concentric crankshaft 146 and an outer thin-wall type-B concentric crankshaft 147 to drive a type-C sun gear 162 or a ring gear 164. The synchronized gearing (not illustrated) may be located elsewhere to reduce the space requirements within the engine. The synchronized gearing may connect the type-A concentric crankshaft 146 and the type-B concentric crankshaft 147 to rotate the concentric shafts at a different angular velocity than the crank 141. The type-B concentric crankshaft 147 may drive either the type-C sun gear 162 or the ring gear 164 at an angular velocity set to induce the proper counter-spin on the type-D planet gear 163. If the type-C sun gear 162 is driven, it ordinarily must be driven faster than the main crankshaft angular velocity. If the ring gear 164 is driven, it ordinarily must be driven slower than the crankshaft angular velocity. The un-driven gear must be allowed to freely rotate to induce the forces necessary for proper counter-spin. The type-D planet gear 163 may be directly or indirectly coupled to the drive bar to transfer the required counter-spin rotation, thereby allowing the drive bar to follow a circular path about the crankshaft.

Figure 22C:
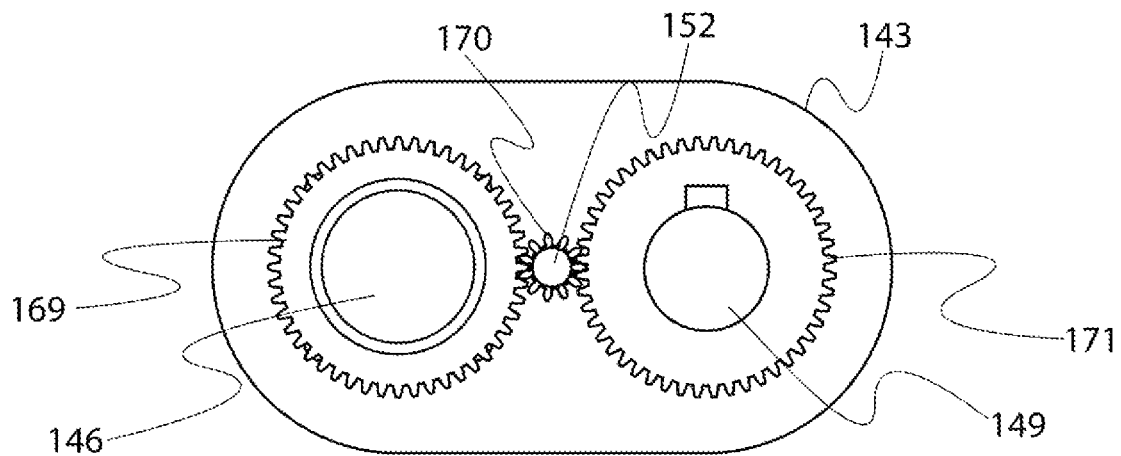
Figure 23:
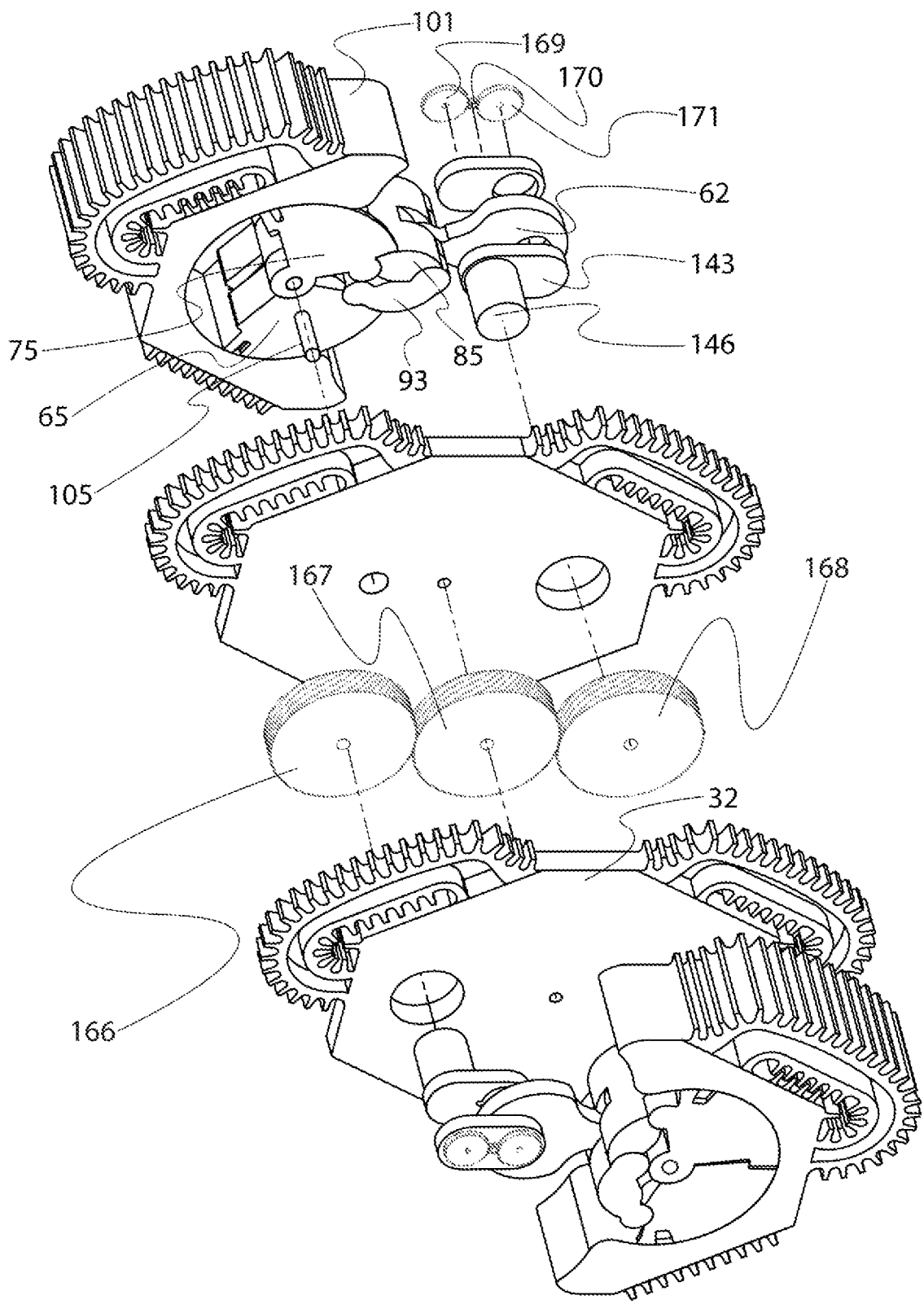
FIG. 23 is an exploded view of, inter alia, two staggered vane assemblies as arranged and interconnected in an alternative embodiment of the invention.
Figure 24:
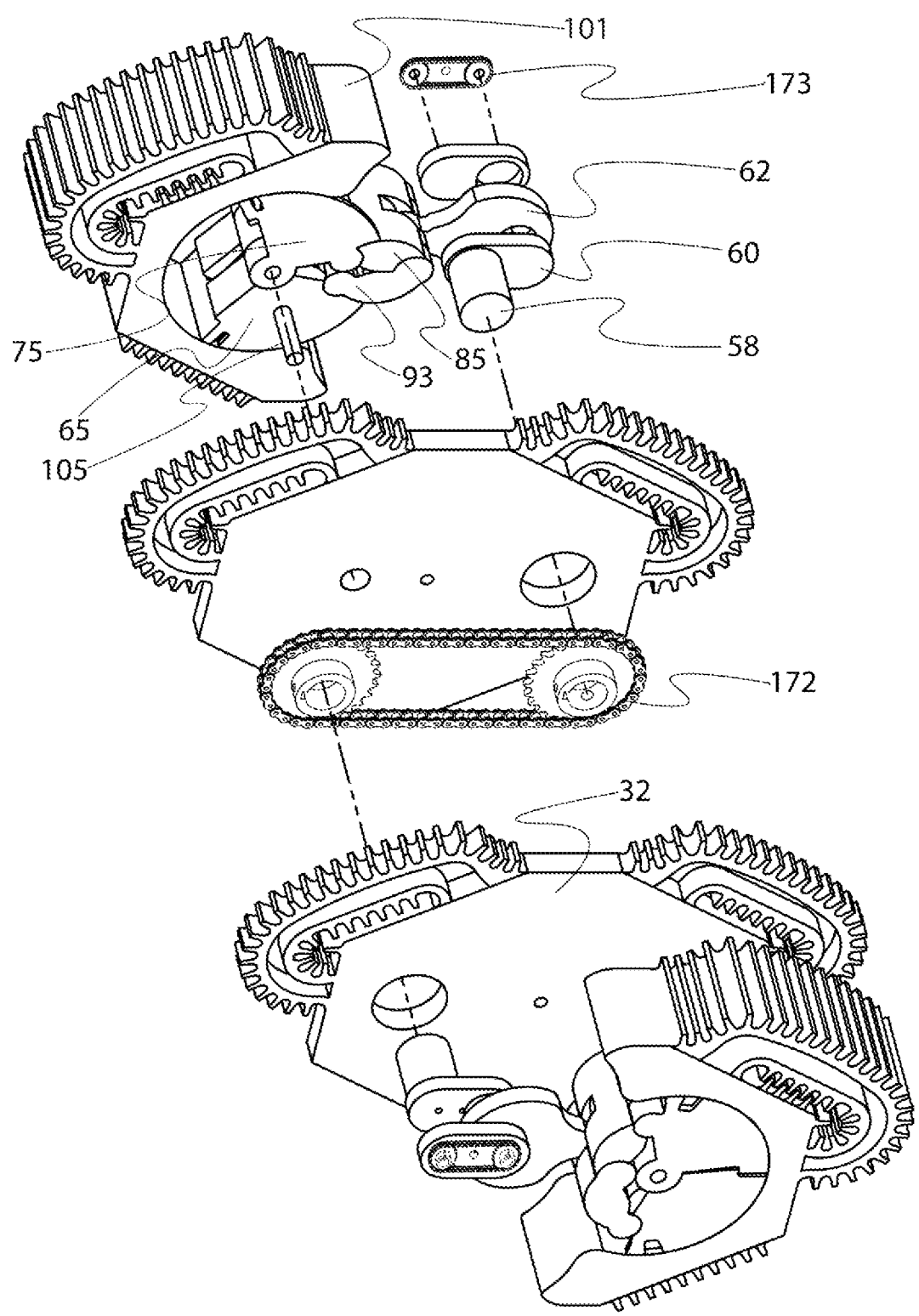
FIG. 24 is an exploded view of, inter alia, two staggered vane assemblies as arranged and interconnected in an alternative embodiment of the invention.

FIGS. 23 and 24 illustrate two more alternative embodiments of variable volume chamber devices that incorporate one crankshaft and one vane assembly defining a single variable volume chamber per device layer. The FIG. 23 embodiment may incorporate a gear assembly (shown in FIG. 22C), and the FIG. 24 embodiment may incorporate a chain and gear assembly. The staggered offset two chamber configurations of the FIGS. 23 and 24 embodiments may allow two or more chambers to create a more compact engine by allowing the drive bar and cranks to be offset in separate layers thereby decreasing the width of the device in exchange for increasing the depth. The variable volume chamber device, alternatively, could include only a single chamber with proper balancing or with the addition of a counter rotating balancing shaft at the appropriate speed to cancel simple and/or higher order harmonic vibrations.

With regard to the FIGS. 23 and 22C embodiment, the cranks 143 may be attached to a gear train consisting of a type-A coupling gear 166, a type-B coupling gear 167, and a type-C coupling gear 168 with a final ratio of 1:1 from crankshaft 146 to crankshaft. To provide counter-spin rotation for the drive bar, a type-D sun gear 169 may be fixed concentric to the crankshaft 146 and not allowed to rotate by affixing it to the side plate (not illustrated). A type-E planet gear 170 may be attached to the crank 143 to induce a counter-spin at a final ratio of 1:1 on the type-E sun gear 171. The type-E planet gear 170 may be rigidly affixed to the drive bar through a shaft 149 to constrain the drive bar to a circular path motion.

With regard to FIG. 24, chain or toothed belt assemblies 172 and 173 may be used instead of the gear assemblies shown in FIG. 23. It may be necessary to incorporate one or more tensioning idlers if the mechanism or side plates experience significant temperature swings in the intended design application. One pulley may be mounted concentric to the crankshaft and not allowed to rotate, while the other pulley is mounted on the crank and affixed to the drive bar to induce the proper counter-spin. This configuration may cause the chain or toothed belt to crawl around the fixed pulley with proper engagement and thereby induce counter-spin rotation on the other pulley. The pulleys may be geared at a 1:1 ratio, which limits the drive bar motion to a purely translational circular path.

Figure 21:
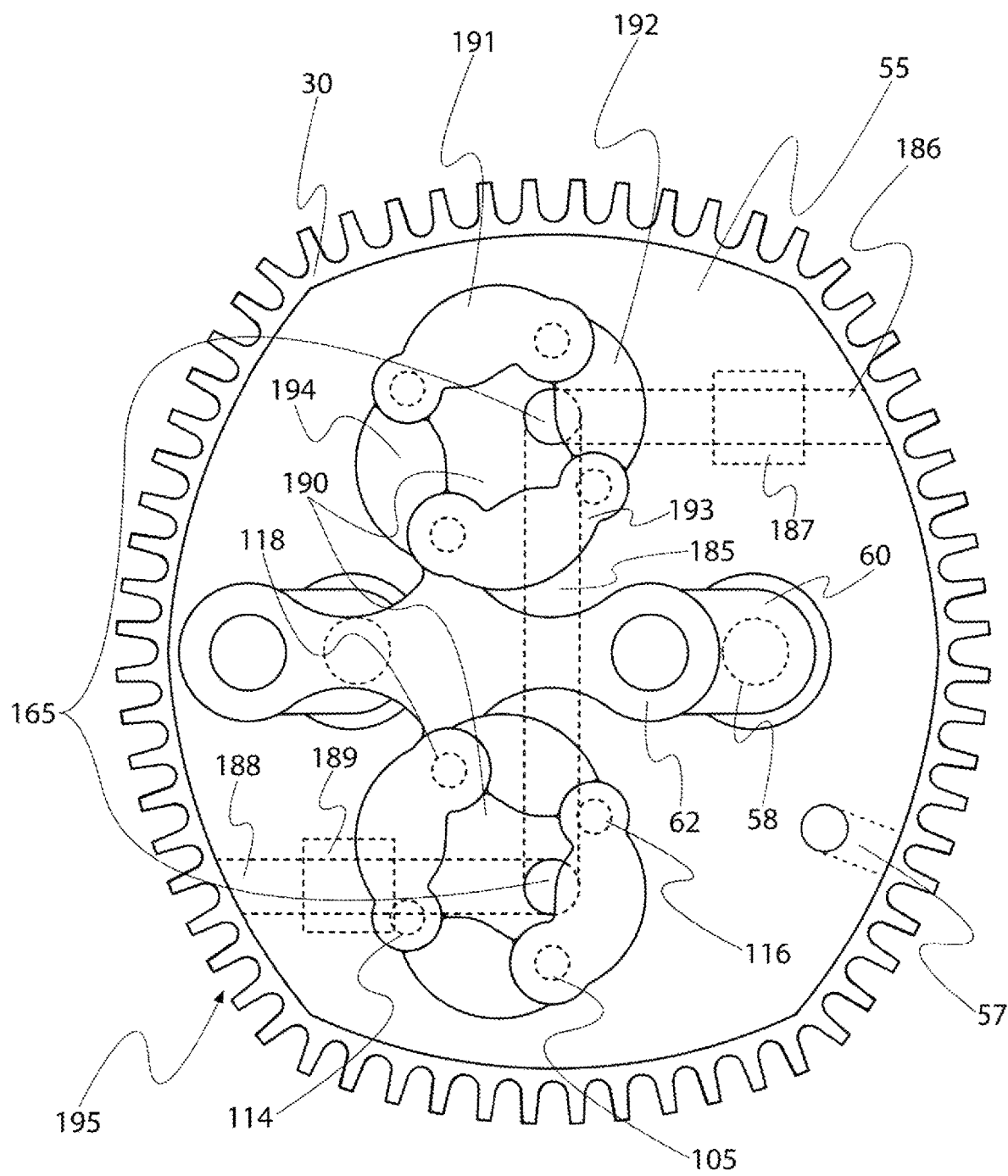
FIG. 21 is a plan view of, inter alia, two vane assemblies as arranged and interconnected in an alternative embodiment of the invention.

Apart from the use as an internal combustion engine, the described variable volume chamber devices could be used as steam engines or pressure operated machines (with gasses or liquids), or with power input as a pump or compressor. For example, a variable volume chamber device for pumping or compressing is shown in FIG. 21. The device may include a side plate 195 including cooling fin 30 wall and defining an outer chamber 55 when paired with a parallel side plate (not shown). An external supercharger inlet port 57 may lead to the outer chamber 55 from an external supercharger (not shown). An air intake passage 186 may extend from an ambient environment past a one-way intake valve 187 to a first common port 165 for a first vane assembly comprised of four pivotally connected vanes 191, 192, 193 and 194. Each set of four vanes may be pivotally connected together by a king pin 105 and wrist pins 114, 116 and 118. A common passage 185 may extend from the first common port 165 to a second common port 165 for a second vane assembly comprised of a second set of four pivotally connected vanes. An exhaust passage 188 may extend from the second common port 165 past a one-way exhaust valve 189 to a pump or compressor outlet or reservoir (not shown). Each vane assembly may define a pump chamber 190. The vane assemblies may be connected to a drive bar 62 that receives input motion from a crankshaft 58. Only the parallelogramic or rhombic variable volume chamber is used in this example which completes two intake cycles, two compression cycles, and two output cycles with one full crank rotation. The ports may be simplified to a central common port location 165, which employs the use of one-way valves behind the side plate 195 to allow fresh air to enter on one side and compressed air to exit on the other side. The outer chamber area 55 also may be reduced in volume relative to engine embodiments, and may remain near ambient environment pressure. The pump chambers may be configured as single, double, or quadruple per layer, and the dual crankshafts may be replaced by a single crankshaft with an appropriate mechanism to ensure the proper circular translation of the drive bar occurs.

Figure 25:
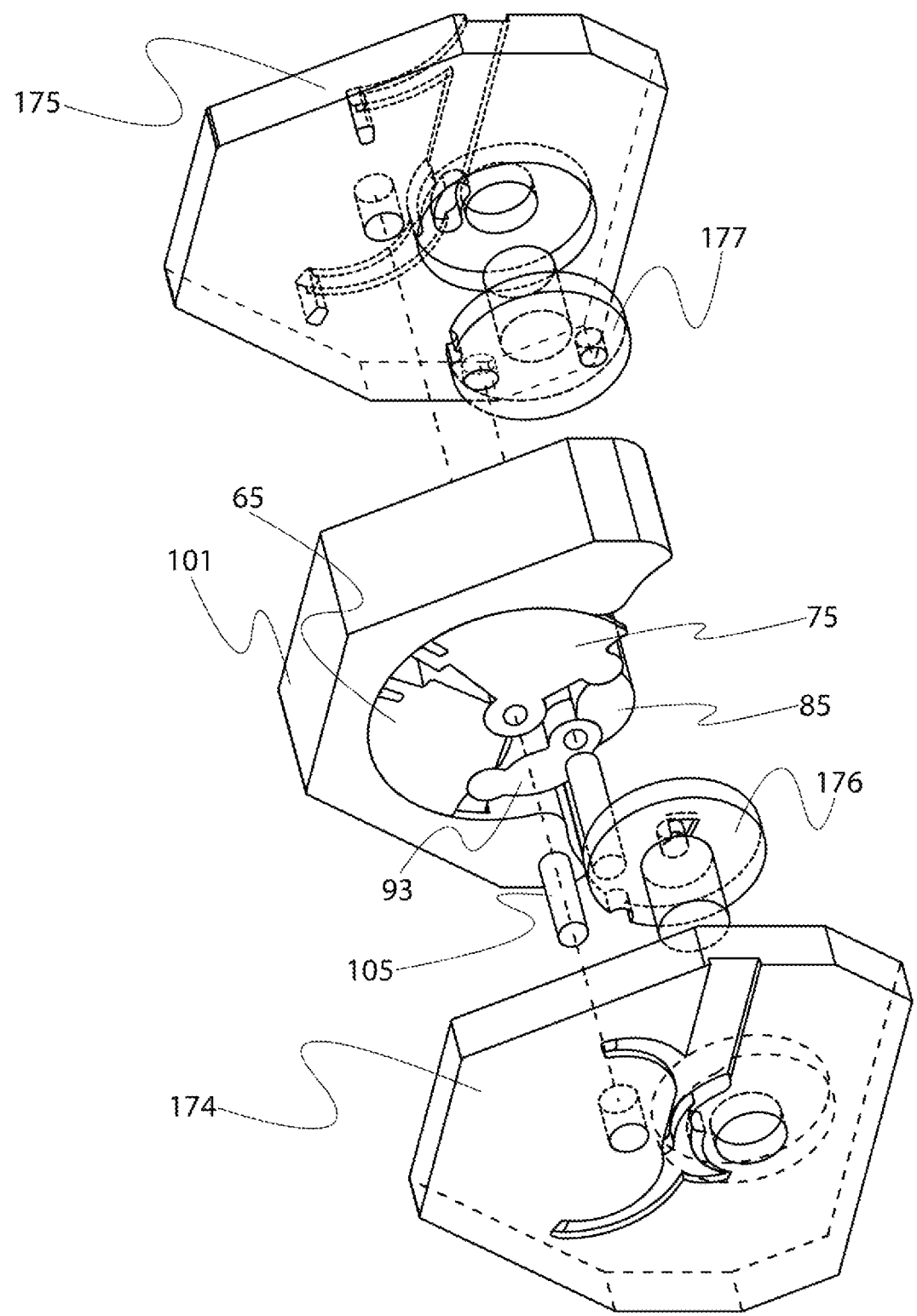
FIG. 25 is an exploded view of, inter alia, a vane assembly as arranged in an alternative embodiment of the invention.

In FIG. 25, an alternative embodiment two-cycle compressor is illustrated which does not require the combination of a drive bar and crank. The compressor includes a horseshoe 101 that surrounds a vane assembly including a type-A vane 65, a type-B vane 75, a type-C vane 85 and a type-D vane 93. The type-A vane 65 and the type-B vane 75 pivot relative to a king pin 105 that is fixed relative to side plates 174 and 175. An exhaust crank assembly 176 and an intake crank assembly 177 directly engage the type-C and type-D vanes 85 and 93 which eliminates the need for counter-spin. The previously required one-way valves for the example shown in FIG. 21 may also be eliminated by introducing appropriately located ports in crank assemblies 176 and 177 with mating passages appropriately located in each of the side plates. In the FIG. 25 pump/compressor, air may be drawn in through the passages in intake side plate 175 and through the intake ports in the intake crank assembly 177. When the variable volume chamber is in the needed orientation, the vanes reveal one port and block the other three. The two exhaust ports and passages may be located within the exhaust crank assembly 176 and the exhaust side plate 174. This two-cycle compressor may include three pumping chambers—the main parallelogramic or rhombic chamber and the two finned chambers above the upper two vanes. This allows the larger main chamber and the two smaller chambers to work together to fill one reservoir, as shown, or to be alternately configured as a multi-stage compressor by employing different but appropriate passages in the side plates.

Figure 26:
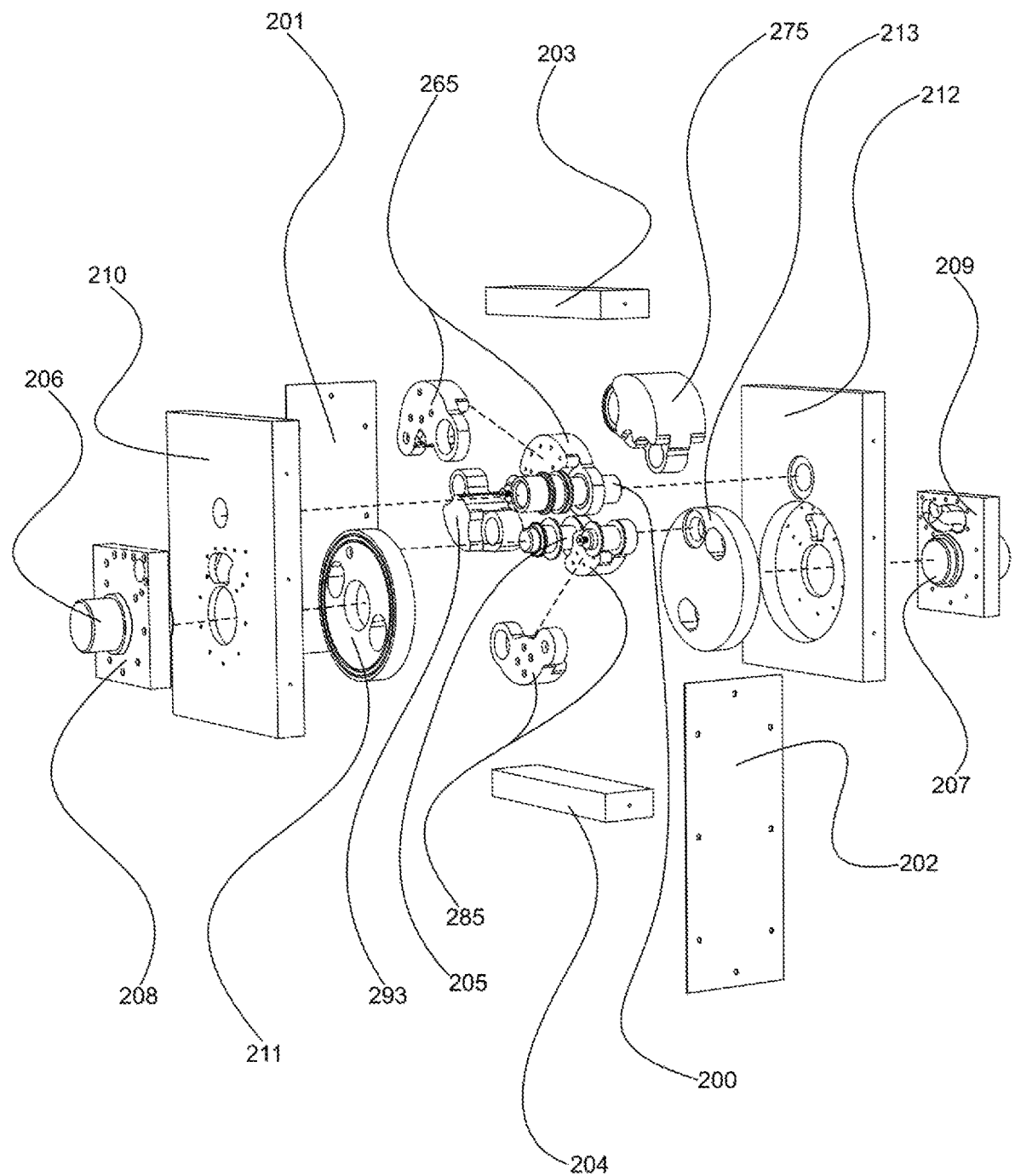
FIG. 26 is an exploded view of a variable volume chamber device as arranged in an alternative embodiment of the invention.

In exploded view FIG. 26, another alternative embodiment two-cycle pump, compressor, or engine is illustrated that does not require the combination of a drive bar and crank. The two-cycle embodiment shown in FIG. 26 may have a vane assembly including a type-A vane 265 (shown as a two-piece assembly), a type-B vane 275, a type-C vane 285 (shown as a two-piece assembly), and a type-D vane 293. The type-A vane 265 and the type-B vane 275 may pivot about a king pin 200 that is fixed relative to an exhaust side plate 210 and an intake side plate 212. The exhaust and intake side plates 210 and 212 may form part or all of a device housing. An exhaust crank assembly 211 and an intake crank assembly 213 may directly engage the type-C vane 285 and the type-D vane 293 through the crank pin 205 which may eliminate the need for a drive bar assembly with counter-spin.

Figure 39:
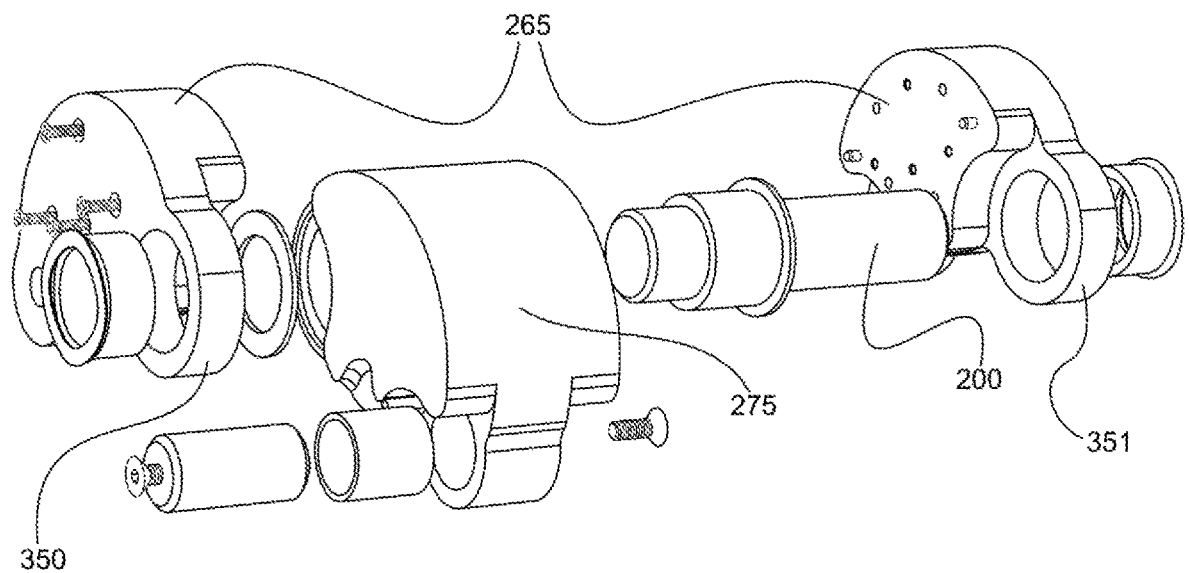
FIG. 39 is an exploded view of vane assemblies constructed in accordance with an alternative embodiment of the invention.

With reference to FIGS. 26 and 39, the kingpin 200 may be connected to or interface with the type-A vane 265 and the type-B vane 275. With reference to FIG. 39, in one example embodiment, the type-A vane 265 may be constructed from of number of sub-assemblies joined together to form a single assembly. FIG. 39 is a detailed view of some of the components previously shown in FIG. 26. This example design may use bearing, thrust-washers, and wave-washers to maintain proper spacing between the side plates and proper seal and pressures. The bearings may be oil impregnated sintered bearings, such as sintered bronze, sintered iron-copper or dry lubricated bearings, all of which require little maintenance and no oil flow or grease reservoirs. This design may be preferable for devices that routinely experience lower loads, such as in five horsepower or less compressors, pumps, or combustion/heat engines. Because no oil flow or grease reservoirs are required, not all vanes must be made from multiple pieces.

In FIG. 39, the type-B vane 275 may have inner style bosses that each receive a pin and are sandwiched by the outer style bosses provided on the vanes connected to the type-B vane. For example, the outer style bosses on the type-A vane 265 first piece 350 and second piece 351 may be located on either side of one of the bosses on the type-B vane 275. Due to the use of outer style bosses on the type-A vane 265 it may be desirable for ease of manufacturing to split the type-A vane into at least two pieces 351 and 350. These pieces also may utilize fastener elements, such as pins for example, to align and/or affix the two pieces together. The kingpin 200 may be at a fixed location and pass through both vanes into both side plates (shown in FIG. 26). It is also possible that the kingpin 200 may only be firmly affixed to one side plate (not illustrated) in very low power applications if the side plate material can appropriately resist the applied cantilevered forces from the two connected vanes.

With renewed reference to FIG. 26, the remaining pin connections are between (i) the type-A vane 265 and the type-D vane 293, (ii) between the type-B vane 275 and the type-C vane 285, and (iii) between the type-C vane 285 and type-D vane 293. These pins are not required to connect to any external points, and therefore the vanes with outer style bosses (type-A vane and type-C vane in this design) may encompass the ends of these side pins and may be firmly affixed to these pins. The inner style vanes (type-B vane 275 and type-D vane 293 in this design) are free to rotate on these remaining pins. The area for the vanes to operate within is maintained by the upper case spacer 203 and the lower case spacer 204 instead of horseshoe components. The assembly may be enclosed by the two side covers 201 and 202

Similar to the previously discussed embodiments, the requirement for one-way valves may be eliminated by providing appropriately located ports in exhaust and intake crank assemblies 211 and 213 with mating intake and exhaust ports and/or passages appropriately located in each of the exhaust and intake side plates 210 and 212 and in the exhaust and intake manifold/bearing housings 208 and 209. The terms intake and inlet are used interchangably herein, as are the terms exhaust and outlet. Air may be drawn in through the passages in the intake manifold/bearing housing 209 into the intake side plate 212 and through the intake ports in the intake crank assembly 213. When the variable volume chamber assumes each orientation in a sequence of multiple specified orientations, the vanes may reveal one or more of the ports and block the others. For example, the vanes may reveal one port and block the other three. The two exhaust ports and passages may be located within the exhaust crank assembly 211, the exhaust side plate 210, and the exhaust manifold/bearing housing 208 through which the exhaust may flow when an exhaust port(s) is revealed. Each respective crankshaft 206 and 207 may pass through to the respective crank assemblies 211 and 213. The respective crank assembly 211 and 213 may be rigidly affixed to one another through the crank pin 205 so that the crankshafts, cranks, and crank pin all maintain properly synchronized orientation.

Embodiments of the invention, such as but not limited to that shown in FIG. 26, may include an intake port and/or passage that imparts spinning to the air or charge before entering the variable volume chamber using helix patterns in the ports or passages. Providing helix patterns in the intake ports and passages may be less complex in terms of casting and machining. These helix patterns may create a swirling outer boundary layer without fuel that retains swirl and stays separate from an inner fuel-containing flow. This may create a buffer that reduces direct heat transfer from combustion to the variable volume chamber walls, so more of the generated high pressures translate to useful work. This may also keep hydrocarbons from being trapped in gaps and reduce wall-based flame quenching and allow a very lean overall charge that is rich towards the center.

Embodiments of the invention such as shown in FIG. 26 also may include angled surfaces on the vanes 265, 275, 285 and 293 that cover and uncover the intake ports. The angled surfaces may be similar to a chamfered edge between the sealing face, which glides over a side plate, and the combustion chamber face. These angled surfaces can be planar deflecting surfaces, for example, an angled surface that is set at a 45-degree angle with respect to the side plate. Alternatively, these surfaces may include curved surfaces and/or raised ridges that direct air or charge flow. A deflecting surface may tend to make the charge or air flow into the combustion chamber at that surface angle drafting the charge/air mainly diagonally into the chamber so as to glide over the opposing vane face and around to the opposing side plate. This may cause the flow to continue back towards the intake port along the opposing wall, then down the face of the vane above the intake port and then tumble back around again filling the entire chamber. The use of two intake ports, with one in each side plate, may create impinging gas streams that enhance the continued swirling of the charge after loading it into the chamber.

Grooves and/or ridges on the vane 265, 275, 285 and 293 faces or bosses may further encourage swirl during vane motion. Grooves and planar faces or reduced-radius boss arc-segments may be provided on the bosses to allow the chamber outline shape to change slightly at different crank angles potentially affecting compression ratio, flame-front propagation, and swirl.

Figure 40:
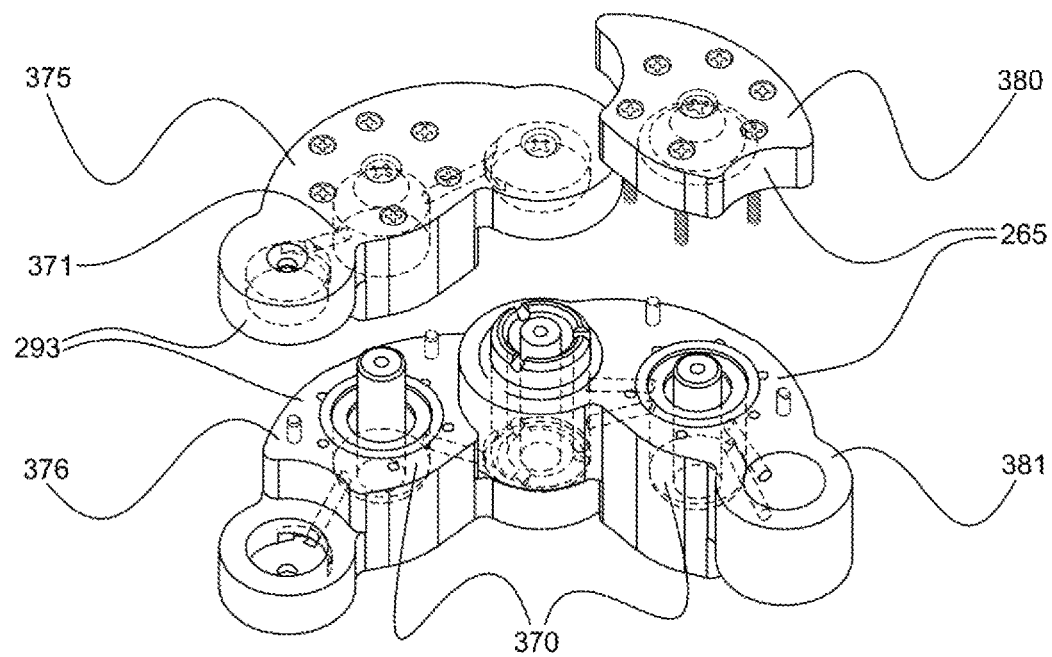
FIG. 40 is an exploded view of vane assemblies constructed in accordance with an alternative embodiment of the invention.

FIG. 40 illustrates other alternative vane assemblies to that shown in FIGS. 26 and 39. In FIG. 40, some example vanes are shown with alternative end bosses and alternative thicknesses for individual pieces. The type-A vane 265 may be comprised of first piece 380 and second piece 381 of unequal thicknesses which cooperate to form inner style bosses in the vane. The type-A vane 265 first piece 380 may contain grooves and holes on the face forming a wall of the combustion chamber, and also may include grooves and a sealing surface for an oil reservoir 370 in the second piece 381.

With continued reference to FIG. 40, the type-D vane 293 may have an outer style boss and consequently rigidly affixes to the pins. The type-D vane 293 may be assembled from two pieces 375 and 376, however, it should be noted that it could be assembled from more than two pieces (not illustrated), if this assists in manufacturing. The pin may be provided as a two component assembly including an inner keeper rod and an outer load-bearing hardened hollow pin with grooves and holes. This pin may allow oil to flow both through and around it, which may lubricate the bearing, cool the components it touches, and allow the flow of oil to continue between vanes via multiple cross-drilled passages 371. These cross drilled passages may be most easily created during manufacturing using jigs or CNC equipment starting from the oil reservoir sides. The illustrated components may use multiple O-rings, seals, and backer washers (where appropriate) around fasteners, reservoirs, and pins to contain the oil flow within the vanes and pins while providing minimal frictional resistance. It also may be beneficial to use heavy weight oil, such as 20w50, to keep the oil contained during any possible high-speed seal wrinkling that may occur during oscillatory motion at some of the pins. The reservoirs are also illustrated with their own keeper rods to assist in guiding oil flow. These keeper rods may assist in maintaining an ordered, directional oil flow between the cross-drilled passages and increase oil contact time with the vane bodies and reduce coking tendencies for more-efficient cooling in the reservoirs.

Figure 27:
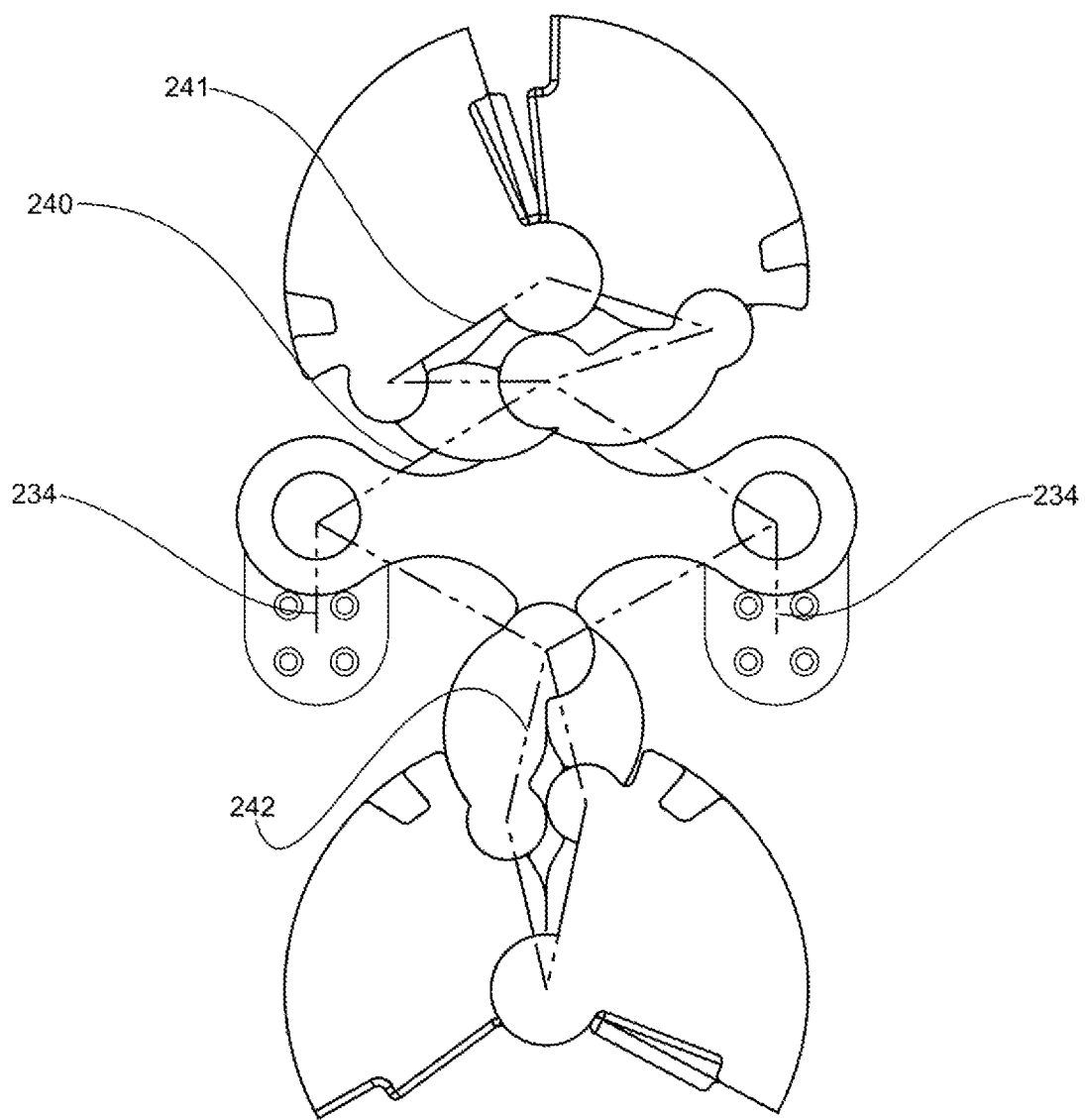
FIG. 27 is a plan view of a vane and drive bar assembly for a variable volume chamber device in accordance with an alternative embodiment of the invention in which the vanes are of unequal length.

The two-cycle embodiment shown in FIG. 26 may include vanes of differing length, an example of which is shown in FIG. 27 and discussed below; however, it is recommended for diagonal opposing vane pairs to have the same length to keep both cycle portions equal or nearly equal per crank rotation. The FIG. 26 embodiment may function as an engine by locating at least two sparkplugs (not shown) in at least one of the side plates so that a charge may be ignited through an appropriate port opening in the respective crank assembly. Alternatively, a system may be employed which allows for the intake of a charge that may be provided at a source of ignition during the loading into the vane chamber, thus providing an entry ignition system. Such a stratified stream system is described in U.S. patent application Ser. No. 16/257,859, hereby incorporated by reference.

FIG. 27 shows an embodiment of the invention having two sets of four cooperating vanes each and two synchronized offset cranks in which the vanes are of unequal length. Linear representations of each of the vanes and cranks are illustrated using a "skeleton diagram" that shows where each skeleton element is connected to another at respective pivot points and which permits the apparatus to be evaluated as a multi-bar planar linkage mechanism. Other embodiments having vanes of various equal or unequal lengths may be evaluated using similar skeleton diagrams. Each crank skeletal element 234 may be synchronized through external means (not illustrated), such as but not limited to an interconnected chain, that keeps the cranks at the same angle when rotated. A first end of each of the drive bar represented by skeletal elements 240 may be connected to a crank represented by skeletal element 234 and a second end of each of the drive bar skeletal elements may be connected to the upper chamber quadrilateral represented by skeletal element 241 or the lower chamber quadrilateral represented by skeletal element 242. As a result of this arrangement, the drive bar represented by skeletal element 240 may not substantially change shape during rotation of the crank represented by skeletal elements 234 but instead the skeletal elements maintain a quadrilateral shape, which is more specifically a parallelogram in this particular embodiment due to drive bar dimensional choices. Further, the skeletal element 240 may maintain substantially the same internal angles (e.g., within a tolerance of 1.5 to 3 degrees or ideally less due to possible sub-second flex and twist during the most extreme operating conditions) and move in a circular path of purely translational motion due to the previously discussed counter-rotation. In this embodiment, the drive bar may maintain its top and bottom vane connections as vertical and its left and right crank connections as horizontal, as can be observed in the similar motion examples of FIGS. 9A through 9I.

Figure 28:
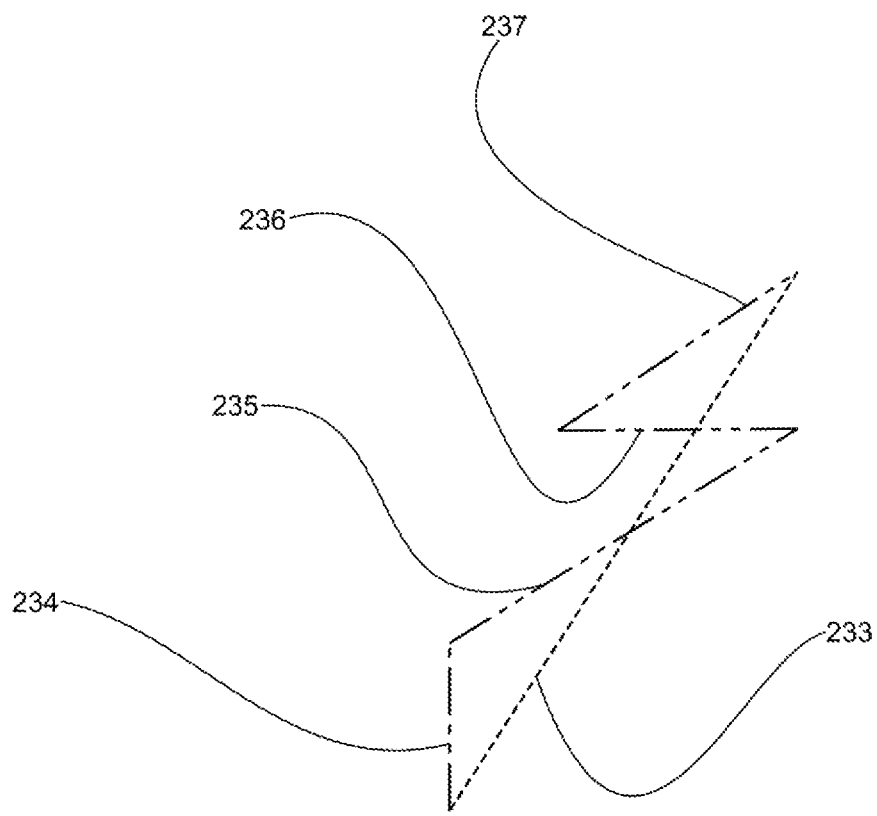
FIG. 28 is a skeleton diagram for a vane assembly as arranged in accordance with an embodiment of the invention.
Figure 29:
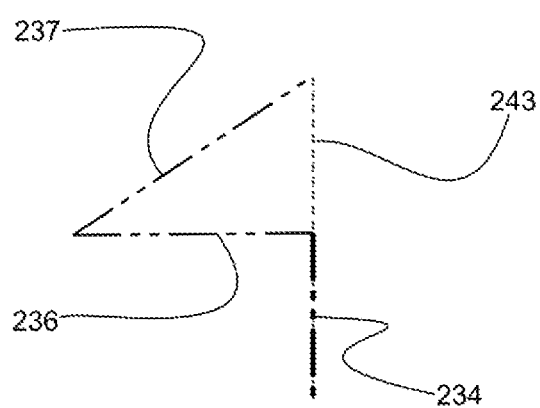
FIG. 29 is a simplified skeleton diagram for a vane assembly as arranged in accordance with an embodiment of the invention.
Figure 30:
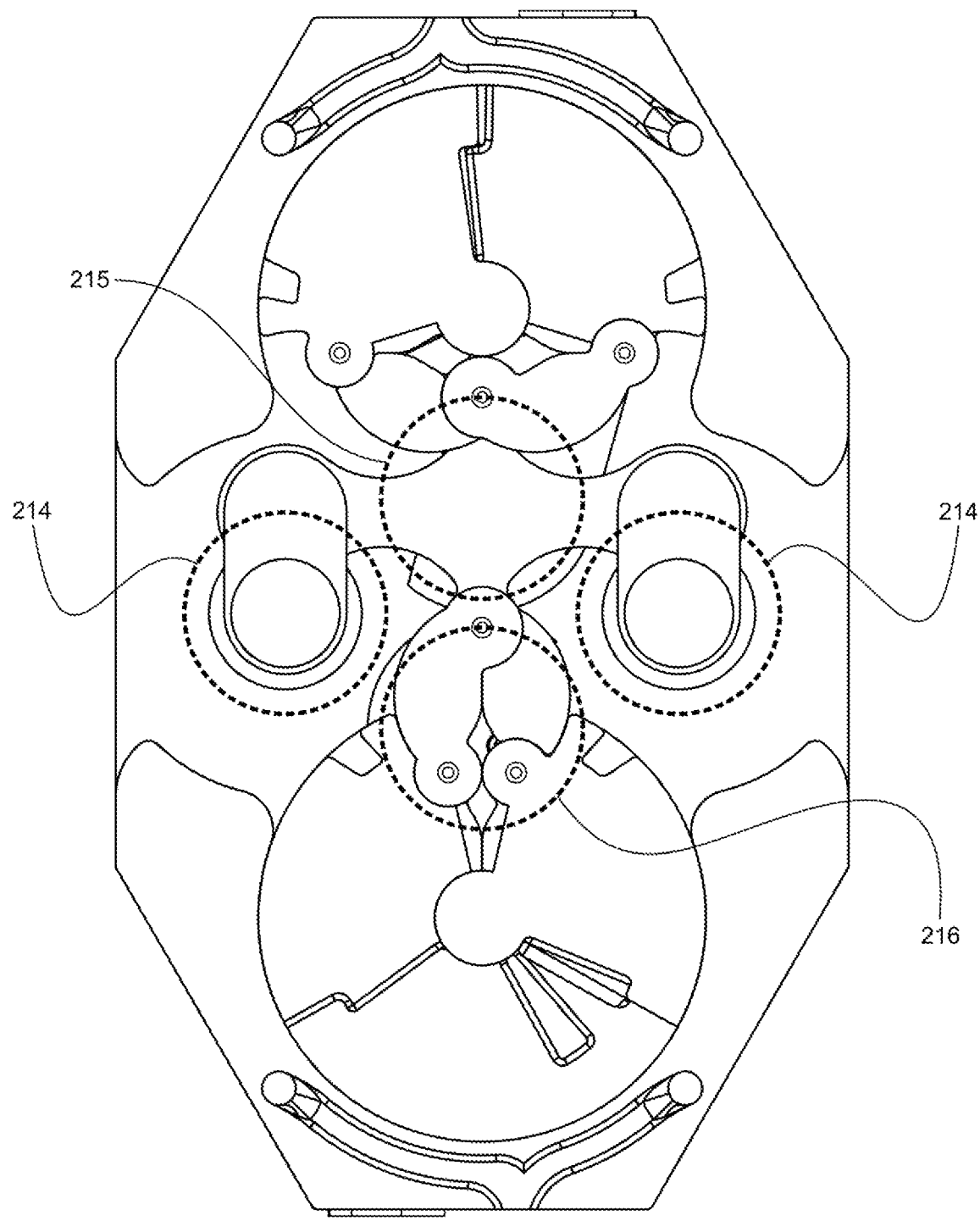
FIG. 30 is plan view of an embodiment of the invention shown in FIGS. 3-4 including overlaid motion paths for the drive bar end centers.
Figure 31:
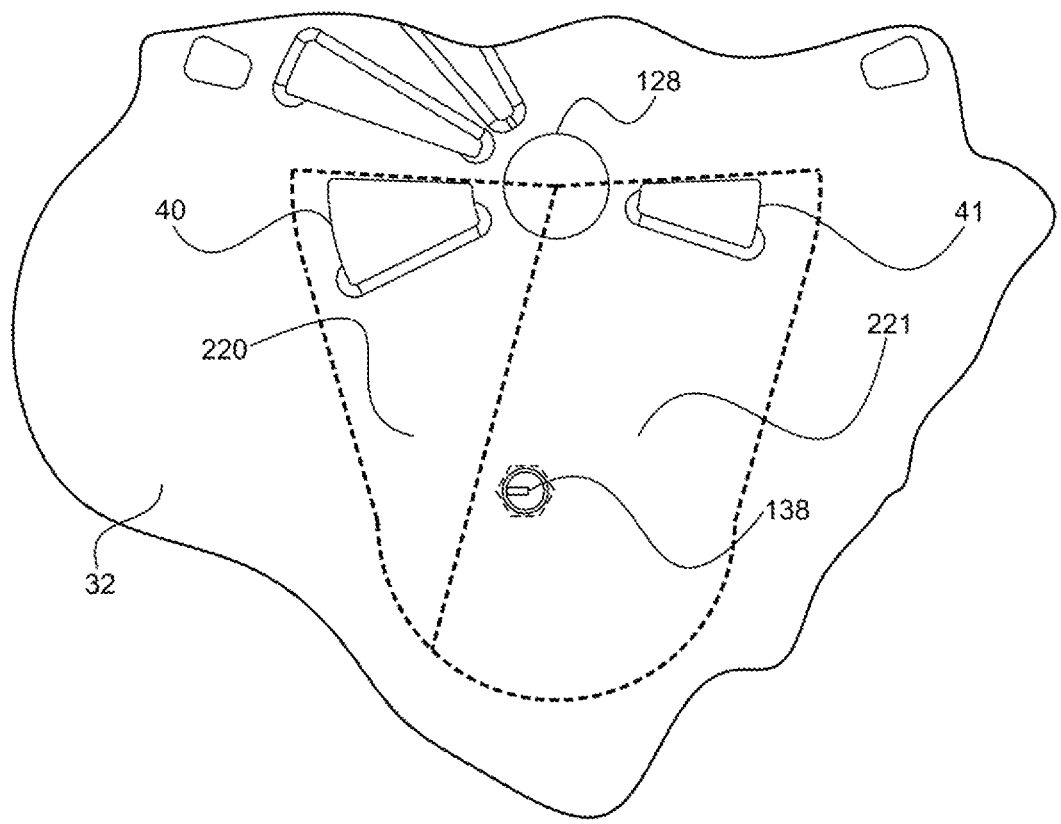
FIG. 31 is a cut-away plan view of the embodiment of the invention shown in FIG. 4 with time-temperature areas overlaid.

FIGS. 28 and 29 illustrate the mechanics of various embodiments of the invention such as, but not limited to, the one shown in FIG. 27. If the mechanism shown in FIG. 27 is divided into quadrant sections and depicted as a skeletal diagram, the upper left section may be illustrated as shown in FIG. 28. This illustration of the mechanism includes five pivot points and may be quadrant piecemeal evaluated as a 5-bar mechanism with conditional dependencies. The crank represented by skeletal element 234 may be connected to a single piece of the drive bar represented by skeletal element 235, which in turn may be connected to the type-D vane represented by skeletal element 236 and the type-A vane represented by skeletal element 237. The ground plane represented by skeletal connection 233 may join the kingpin side of the type-A vane represented by skeletal element 237 to the shaft side of the crank represented by skeletal element 234 and may be immobile in the 5-bar analysis, as is standard kinematic analysis practice. However, since the single piece of the drive bar represented by skeletal element 235 may be part of a larger rigid body element of the drive bar represented by skeletal element 240 from FIG. 27, it may only move in a circular translational path as a dependent condition of the larger assembly.

With renewed reference to FIG. 27, the drive bar represented by skeletal element 240 may be considered as purely an offset distance for analysis due to this particular condition and may be further simplified using the skeleton diagram of FIG. 29. In this simplification, the drive bar represented by a skeletal element is reduced to a length of zero, connecting the crank represented by skeletal element 234 directly to the type-D vane represented by skeletal element 236, which may necessitate a revised ground plane represented by skeletal connection 243 with a different length and connection angle.

Some of the pin connection points shown in FIG. 29 move in arcs. This is illustrated, for example, with reference to FIGS. 3, 4, 9A-9I and 30, where it can be appreciated that the type-A wrist pin 114 of the type-A vane 65 and the type-B wrist pin 116 of the type-B 75 move in arcs while drive bar wrist pin 118 connecting the type-C vane 85, the type-D vane 93, and the drive bar 62 move in a complete circle as depicted by the upper drive bar circle 215 and the lower drive bar circle 216. It may also be observed that the upper drive bar circle 215 and the lower drive bar circle 216 are equal in size to each crank circle 214. It is readily apparent that the drive bar 62 provides an offset to the crank motion and applies it to each vane mechanism.

In all cases of crank-rocker mechanisms, only the shortest link may achieve complete rotation, and as such, that must be the crank(s) in the presented vane mechanism. Therefore:
  if the crank center-to-center distance is the shortest link and the ground plane link distance is the longest link, and
  if the sum of the crank center-to-center distance and the ground plane link is less than the sum of the two vane center-to-center distances, then the quadrant piecemeal mechanism may properly function as a crank-rocker mechanism. This may also be stated as: $c+g<v_1+v_2$.

It is also possible to use the more traditional four-link configuration link crank-rocker, which may severely limit compression and may have a larger parasitic volume. This configuration may be summarized as:
  if the crank center-to-center is shortest link and the lower vane (type-D or type-C) is the longest link, and
  if the sum of the crank center-to-center distance and the lower vane (type-D or type-C) center-to-center is less than the sum of the upper vane (type-A or type-B) center-to-center distance and the ground plane link, then the quadrant piecemeal mechanism may properly function as a crank-rocker mechanism. This may also be stated as: $c+v_2<v_1+g$.

Following these analysis requirement(s) on the piecemeal linkage evaluation, each piecemeal mechanism quadrant should have the same length crank as these skeletal elements are common to each quadrant piecemeal evaluation. Also, each upper or lower half (the two quadrants which have common connection points to a kingpin and a drive bar) should have the same length ground plane link or the piecemeal linkage motion may not be representative of the more complete mechanism motion. However, each piecemeal linkage may have differing lengths of vane links as long as each piecemeal mechanism quadrant still satisfies the criterion of Grashof's Condition as a crank-rocker mechanism and does not present any individual, piecemeal, or complete mechanism lock conditions.

The combustion chamber 39 or the like may be more fully defined geometrically as a quadrilateral. Considering the previous mechanism discussions, this allows vanes of differing lengths subject to specific conditions and does not require the sides to be parallel in the quadrilateral. However, specific cases of a quadrilateral may have specific shape dependent geometric properties—such as a parallelogram, a trapezoid, or a rhombus. These specific shapes may further evidence other more specific geometric cases at particular crank angles, such as a kite, a rectangle, or a square.

Therefore, the linkage lengths may determine the combustion chamber 39 (or the like) angles, shapes, and movements dependent upon the crank angle. This dependence upon the crank angle may be verified using a common practice degree of freedom or mobility analysis. This may be accomplished piecemeal for the upper half or lower half of the complete mechanism as skeletally illustrated in FIG. 27. For this embodiment, the half piecemeal analysis may include both of the crank skeletal elements 234 (with the condition of their angular interlock considered without link or joint counts), a single common ground planar link (not illustrated) which ties the cranks and the kingpin at rotational joints to the side plate (not illustrated). Other embodiments with more chambers, single cranks, and/or geared cranks with counter-spin elements may be analyzed in a similar manner, but with different particular conditions on elements within the analysis. The drive bar skeletal element 240 must be counted as a single link in the half piecemeal analysis since it is rigid and does not change shape, internal angles, or dimension. This yields a total count of eight links for the half piecemeal analysis. Counting the joints of the links yields ten single order joints assuming pure rotational motion at the joints and therefore no second order joints. The counted joints should take into consideration that the vane links which have multiple connections, such as at the two vanes to the kingpin (ground plane link) and at the drive bar where two links connect to the drive bar. The common practice formula for degrees of freedom or mobility (M) is:

$$M=(3\times(\text{Number of Links}-1))-(2\times\text{Number of 1stOrder Joints})-\text{Number of 2ndOrder Joints}$$

This confirms that the system possesses one degree of freedom or mobility and therefore the crank angle solely determines the position of the mechanism just like traditional piston engines. A similar skeletal degree of freedom or mobility analysis may be performed on an embodiment such as shown in FIGS. 25 and 26, which also yields one degree of freedom or mobility.

The chosen geometric lengths affects the highest point the type-A and type-B vanes may reach (rocker upper inflection point), the lowest point the type-A and type-B vanes may reach (rocker lower inflection point), the sweep arc length, the sweep time, and the maximum velocity attained during the rapid sweep motion while pivoting about the king pin. Referring again to FIGS. 3 and 4, in addition to the discussed motion changes to the combustion chamber 39, vane lengths and the resulting motion parameters also affect integrated functions in the type-A and type-B vanes, such as the heat engine chamber 43 and the first and second internal supercharger chambers 47.

The term supercharger as referenced herein refers to any structure for producing elevated air or charge pressure for a combustion process. Therefore the referenced internal supercharger refers to structure integrated into embodiments of the present invention that elevate air or charge pressure in any manner. For example, embodiments of the present invention may integrate a heat engine for which at least some of the energy provided to the process of elevating the air or charge pressure may be derived from further expansion of exhaust gases via heat and pressure.

The geometric changes directly affect the combustion charge inlet port 40 and/or the combustion exhaust port 41 area and timing that may be obtained. The maximum port area may be obtained with a length ratio of 1, meaning both vane lengths on a side are equal. However, it may be desirable to increase the radial port length at a cost of sweep arc length for some designs and may result in a small percentage reduction in overall port area. This may be accomplished by lengthening the top vane of a side, which consequently requires the shortening of the lower vane to maintain the same minimum combustion chamber 39 volume and therefore the same compression ratio for the engine. This may be accomplished as a simple addition and subtraction. For example, if 0.25" is added to the top vane length, 0.25" is subtracted from the bottom vane length. If done correctly, this may be useful for combustion chamber exhaust being fed through a rectangular passage to the heat engine portion of the engine. This may reduce shape transitional turbulence and may have flow increase advantages. If the port arc length is not modified, this can cause the exhaust port to open early and close late. This may be desirable to feed a higher-pressure charge to the heat engine and to allow more blow-down and less EGR through the parasitic compression time of the combustion cycle.

Changing the vane length ratios changes the crankshaft angle at which maximum volume intake and exhaust occur. It also changes the timing of compression and expansion, which may result in different crank timing angles for ECU control programs. It is also this difference in crank angles which may improve or worsen the effective power transfer from the chamber to the crank shaft due to the angle at which the pressures generate force to transfer to the crankshaft. This may be calculated using standard formulas for forces applied at angles. The complete mechanism can be validated to insure it still satisfies the criteria of the Grashof Condition for crank-rockers. It is also recommended to 3D model the mechanism in computer software to perform analysis that may verify volumes and movements. This allows verification that no lock conditions exist experimentally without the need to build physical models. This also allows finite element analysis to verify component design durability.

Having equally longer center-to-center vane distances on all the vanes increases the maximum attainable radiating length of the intake and exhaust ports. This may increase overall breathability if the vane heights are decreased to maintain the same chamber volume. This increased breathability is due to a constant chamber volume but an increase in the maximum available port area that may be designed into the side plates. This change to the center-to-center vane distances also may require recalculating the crank arm length and possibly the crank offset for the drive bar. It may further require recalculating the king-pin to crank distance. This may be comparable with stroke changes in piston engine designs.

Increasing the vane height while keeping the vane center-to-center distances the same may decrease the intake breathability of the engine at higher RPM, as the engine must pull in a larger volume of air in very short time periods. The chamber volume to port area ratio may limit the maximum RPM the engine may achieve without internal or external supercharging/turbocharging. Air at one atmosphere pressure being drawn in by a partial vacuum may be more limiting than exhaust gases being expelled at high pressures against one atmosphere.

Breathability for the various embodiments of the present invention may be determined using modified formulas based on 2-cycle wall port area calculations. These formulas may be used for a 4-cycle process with intake and exhaust events in the same amount of time as a 2-cycle. The calculations are easiest to use with an easily modifiable 3D computer model to determine port open and port close angles that are required by the formulas. These port areas, open time angles, and test RPM may be input into the time-area formulas for analysis. It may be beneficial to reverse calculate the desired timing and mean port area by starting with a suggested time-area, combustion chamber volume, and then fit a port which satisfies the calculations. The following example formulas may be used:

Forward Calculations:

Port Open Time ($T$) in seconds=Port Open Time in Crank Degrees÷(Engine $RPM\times 6$)

Port Mean Area in $cm^2$=((Actual Measured/Calculated Port Area in $cm^2$@open crank degree+ Actual Measured/Calculated Port Area in $cm^2$@closed crank degree)÷2)

Port Time-Area in seconds-$cm^2/cm^3$=(Port Open Time ($T$) in seconds*Port Mean Area in $cm^2$)÷ (Maximum Combustion Chamber Volume in $cm^3$)

Some suggested Port Time-Area ranges are:
0.00014-0.00016 seconds-$cm^2/cm^3$ (0.00018-0.00019 seconds-$cm^2/cm^3$ if using variable valve timing mechanisms or a high performance/RPM design target) for a combustion intake port 0.00008-0.00010 seconds-cm²/cm³ for a transfer port between the combustion chamber and the heat engine 0.00014-0.00015 seconds-cm²/cm³ for a final heat engine exhaust port or for combustion exhaust if a heat-engine is not implemented If more than one port is being used, the total of the ports is suggested to be within the suggested ranges listed above.

If variable valving is implemented, the ECU should modify sizes and timings to accomplish these recommendations for specific RPM ranges using tables or calculate it on the fly with short and long-term correction factors as necessary Port to Mean Port Area Factor in cm²/cm³=Port Mean Area in cm²/Port Area in cm³

Suggested Port Area Factor should be:
0.65 cm²/cm³ for combustion intake
0.75 cm²/cm³ for transfer between combustion and heat engine
0.70 cm²/cm³ for heat-engine exhaust or for combustion exhaust if a heat-engine is not implemented Reverse Calculations:

Target Port Mean Area in $cm^2$=[Port Time-Area in seconds-$cm^2/cm^3$(use the numbers from the suggested ranges above)×Chamber Max·Volume(in $cm^3$)]÷Port Open Time in seconds Target Port Area in $cm^2$=Target Port Mean Area in seconds-$cm^2/cm^3$÷Port to Mean Port Area Factor in seconds-$cm^2/cm^3$(use appropriate numbers from suggested list above)

In combustion engine chemical reactions, increased exposure time to elevated temperature components within the combustion chamber may be detrimental to the desired process. Processes involving low ignition energy fuels, such as Hydrogen, may be especially susceptible to cycle to cycle variance and control issues if exposure time to heat sources adds energy to the reactions. This detrimental time-temperature exposure may increase the likelihood of two undesirable potentials, pre-ignition/knock and increased NOx emissions. Preignition/knock may occur when the combustion reaction occurs at an earlier than intended time during the cycle process whether due to hot components, compression, or secondary compression thereby causing some or all of the combustion energy to be converted to heat and pressure when it cannot be properly controlled and converted to usable work efficiently. Increased NOx emissions may occur when sufficient energy is provided to split N2 molecules and provide alternate elements to form new undesirable compounds. Such energy may be provided by localized high-temperature pockets from the combustion reaction itself or from hot components in the combustion chamber, such as spark plugs and exhaust poppet valves. Embodiments of the present invention do not, generally, require conventional exhaust and intake poppet valves to prevent elevated temperatures. Additionally, embodiments of the present invention may benefit from establishing separate cold and hot exposure areas through ordinary operation.

The components, the component motion, and the two time-temperature exposure product areas for a section of the type-B side plate 32 are depicted in FIGS. 3, 9A through 9I, and 31. The cooler time-temperature exposure product area 220 is depicted as starting above and encompassing the combustion charge inlet port 40 and sweeping counter-clock-wise about the king pin mount recess 128 towards, but not encompassing the spark plug 138. The hotter time-temperature exposure product area 221 encompasses the spark plug 138 and sweeps counter-clock-wise about the king pin mount recess 128 towards and encompassing the combustion exhaust port 41. The areas depicted are not constant value areas, but are overall chiefly a double-gradient which increases along two vectors. Both areas have generally increasing values following along a counter-clock-wise arc from the upper left boundary about the king pin mount recess 128 and also generally increasing values progressing starting farthest from and progressing radially towards the king pin mount recess 128. Additionally, there is a third gradient which is generally a small partly annular shape with increasing values when progressing radially towards the spark plug 138. The type-A vane (not shown) and the type-B vane (not shown) pivot around the king pin mount recess 128, which produces the top shape of the time-temperature exposure product areas. The type-D vane (not shown) and the type-C vane (not shown) follow a circular path at the connection to the drive bar 62, which produces the large sweeping arc at the bottom of the areas.

Figure 32:
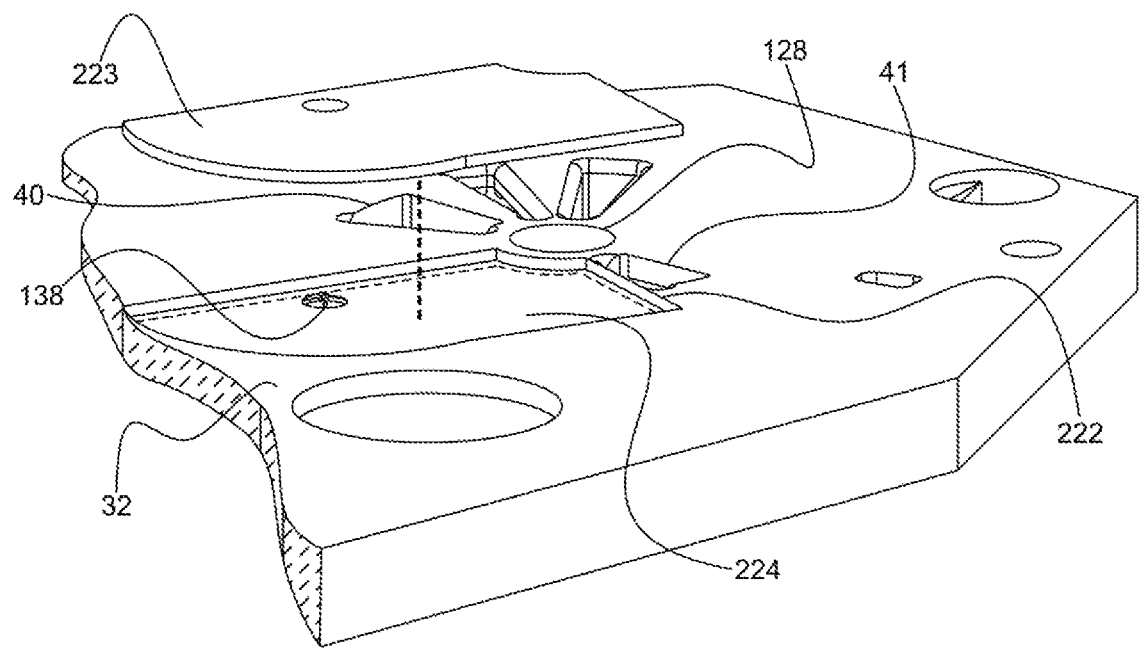
FIG. 32 is a cut-away pictorial view of an alternative embodiment of the invention including a side plate insert.

Piston internal combustion engines and compressor/pumps use chamber sleeves for many beneficial reasons. Sleeves allow for the use of: different materials for the block and the chamber sleeve, coatings on the chamber sleeve with less processing difficulties, different sleeves for different displacements while using the same block allowing for inventory reduction, and rebuilding or repairing the engine/pump/compressor. Referring to FIG. 32, similar benefits may be accomplished in an example alternative embodiment of the present invention by employing a side plate insert 223, which is firmly affixed to the type-B side plate 32 within the side plate insert recess 222. This example employs the side plate insert 223 about most of the combustion expansion area 224 and has an opening to expose the spark plug 138. However, the side plate insert 223 does not encompass the combustion charge inlet port 40, the king pin mount recess 128, or the combustion exhaust port 41. Cooling may also be achieved by directly interfacing the side plate insert 223 to fluid passages (not illustrated) as is done for some direct sleeve cooling implementations in piston internal combustion engines. The insert may be comprised of two or more individual pieces, for example a different material for the cold side (not illustrated) and the hot side. The side plate insert 223 also may employ plating or coating, such as thermal barrier coating to improve thermal efficiency of the engine.

Figure 33:
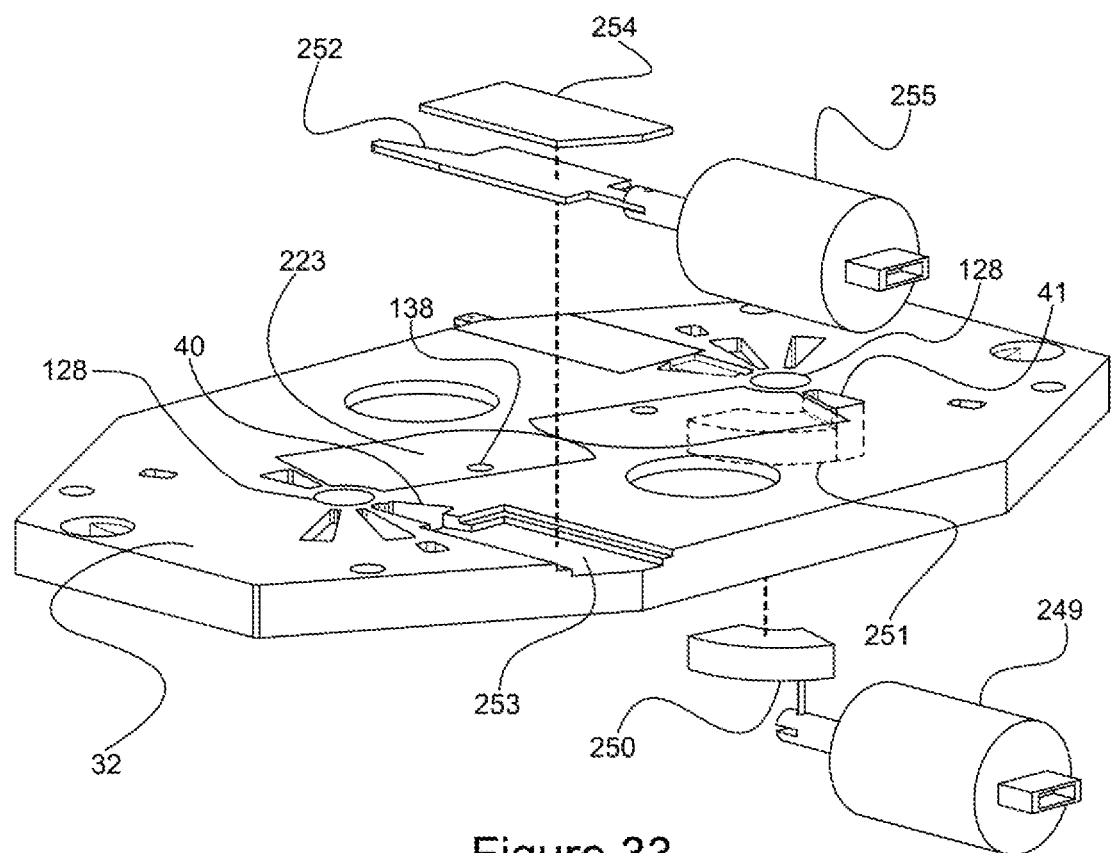
FIG. 33 is a pictorial view of an alternative embodiment of the invention including VVA assemblies.
Figure 34:
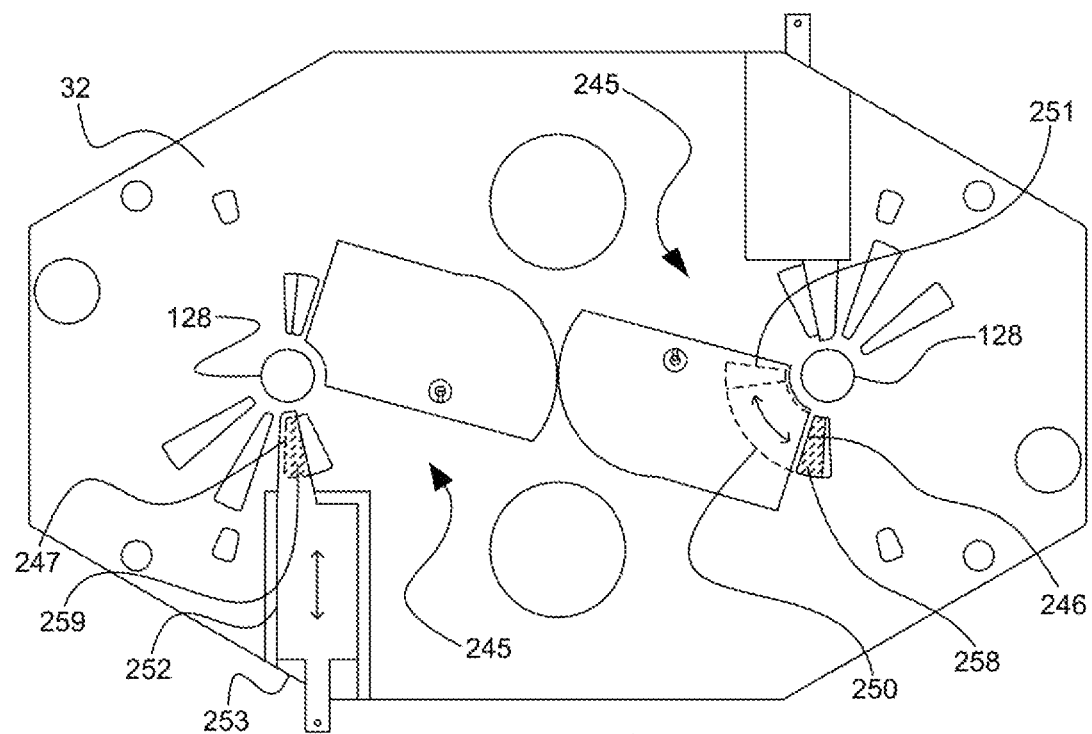
FIG. 34 is a plan view of the embodiment shown in FIG. 33.

An alternate embodiment of the present invention is illustrated in FIGS. 33 and 34 which provide two example approaches to variable port timing that may be implemented in a type-B side plate 32 or other side plates (not shown). Variable port timing may be directly compared with piston engines implementations using Variable Valve Actuation (VVA) on poppet valves. The design shown in FIGS. 33 and 34 is intended to be non-limiting. The type-B side plate 32 may include king pin mount recesses 128, combustion charge inlet ports 40, and combustion exhaust ports 41 formed therein. A side plate insert 223 may be provided with an opening for a spark plug 138.

One end of the type-B side plate 32 having a first combustion chamber area 245 may be provided with a variable area port slide recess 253 that receives a variable port slide gate 252. A slide cover 254 may be installed over the slide gate 252. The slide gate 252 may be selectively moved relative to the slide recess 253 under the control of a first actuator 255. Moving the slide gate 252 selectively blocks and unblocks the combustion charge inlet port 40 by varying the location of the slide gate relative to the apex port edge 247 and thus changes the effective size of the inlet port 40. The inlet port 40 may vary within the range defined by the slide gate modulation area 259. This edge is set along a radius from a king pin mount recess 128 and may not directly abut the combustion chamber area 245. Preferably the apex port edge 247 is set at or near the peak arc position a type-A or similar vane (not shown on drawing for overall clarity) may assume while the charge inlet port 40 is open. Therefore, this edge of the port is only revealed during the middle time of the port open duration.

The variable area port slide gate 252 may solely affect the charge inlet port 40 area and therefore it will affect flow and related parameters such as volumetric efficiency, swirl, impingement, etc. due to blocking a portion of the port. This first presented method may instead be implemented on the remaining two adjacent sides or a combination thereof. However, modulating the port area along the apex port edge 247 as presented allows the widest port and accordingly creates a flow which more closely resembles the flow shape of the unmodulated port. This allows higher repeatability from cycle to cycle between modulated and unmodulated port area, while implementing a modulation along the length of either adjacent side may not allow this repeatable flow pattern.

Figure 35:
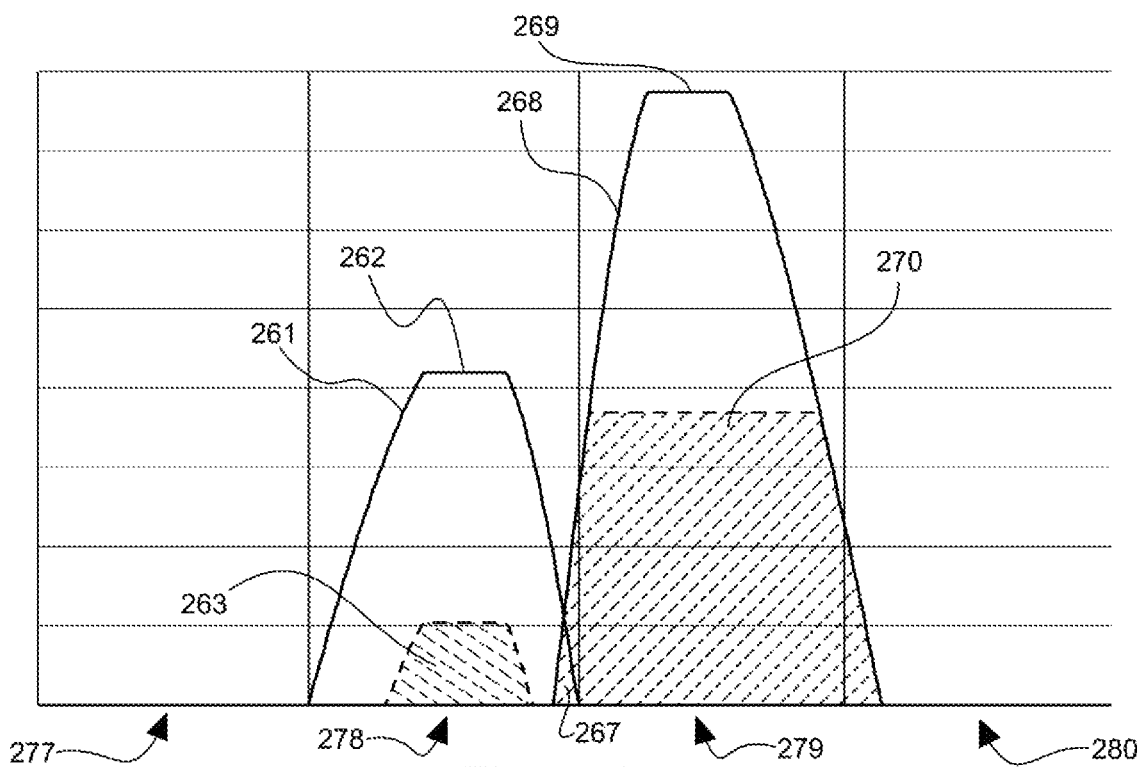
FIG. 35 is a prophetic graph of variable port opening versus crank angle in accordance with an embodiment of the invention.

Referencing FIGS. 33, 34 and 35, this exemplary implementation may not affect the lower portion form of the intake port degree-area 268, as can be seen by the shape of the modulated intake port degree-area 270 within the end of the exhaust area 278 (approximately 270 to 0 crank degrees along the x-axis), the intake area 279 (approximately 0 to 90 degrees), and the beginning of the compression area 280 (approximately 90 to 180 degrees). This demonstrates that the modified intake port degree-area 270 retains the same: starting point (port open crank angle), starting slope, ending slope, and end point (port close crank angle). Therefore, the modulated intake port degree-area 270 retains the same port open duration in degrees, but does not attain the same maximum intake port degree-area 269 as the intake port degree-area 268, rather it truncates the upper portion between the modulated intake port degree-area 270 and the maximum intake port degree-area 269. Furthermore, implementing only the first modulation method may not affect the exhaust/intake overlap area 267, which allows for blow down of the exhaust gases from the combustion chamber.

It may be appreciated that this variable area port slide gate 252 may be implemented as a simple two-position system, or it may be implemented with a variable valve actuator (VVA) which would allow several different positions and resulting port areas comparable to continuously variable valve lift (CVVL) implemented with poppet valves on piston based internal combustion engines. It may also be appreciated that the variable area port slide gate 252 may be moved multiple times per crank rotation to provide a continuously variable actuation that may function more real-time or it may be actuated intermittently after a determined number of cycles dependent upon changing engine operating conditions and determined adjustments. It may also be appreciated that the variable area port slide gate 252 may block some or even all of the port, which may be advantageous when more than one charge inlet port 40 is used such as in opposing side plates. It may also be appreciated that the ECU (not shown) may implement a closed loop system to validate and correct the position of the variable area port slide gate 252.

The other end of the type-B side plate 32 having a second combustion chamber area 245 may be provided with a variable port timing/duration rotary recess 251 that receives a variable port timing/duration rotary gate 250. The rotary gate 250 may be selectively moved relative to the rotary recess 251 under the control of a second actuator 249. Moving the rotary gate 250 selectively blocks and unblocks the combustion exhaust port 41 by varying the location of the rotary gate relative to the leading/trailing port edge 246 and thus changes the effective size of the exhaust port 41. The exhaust port 41 may vary within the range defined by the rotary gate modulation area 258.

The second example implementation modulates the port area in the rotary gate modulation area 258 via a variable port timing/duration rotary gate 250 along the leading/trailing port edge 246. This edge may be set along a radius from a king pin mount recess 128 and directly abuts the combustion chamber area 245. The leading/trailing port edge 246 is passed over before and after the peak arc position of a type-B or similar vane (not shown on drawing for overall clarity) while the combustion exhaust port 41 is open. Therefore, this edge of the port is revealed at the start time of the port open until it is hidden at the port close time.

The variable port timing/duration rotary gate 250 may pivot about the king pin mount recess 128 in the variable port timing/duration rotary recess 251 and may be driven by the second actuator 249. The variable port timing/duration rotary gate 250 may use a rotary-style gate valve and may affect combustion exhaust port 41 area and therefore it may affect timing as well as affect flow due to blocking a portion of the port. This second exemplary implementation may affect port open crank angle, port close crank angle, and port open duration which is due to the chosen port edge location for the variable port timing/duration rotary gate 250.

Referencing FIGS. 33, 34 and 35, this exemplary implementation may change the overall scale of the exhaust port degree-area 261, as can be seen by the modulated exhaust port degree-area 263 at the end of the expansion area 277 (approximately 180 to 270 crank degrees), within the exhaust area 278 (approximately 270 to 0 degrees), and possibly extending into the beginning of the intake area 279 (approximately 0 to 90 degrees) dependent upon the amount of modulation desired. This demonstrates that the modulated exhaust port degree-area 263 may have a differing start point (port open crank angle), end point (port close crank angle) and port open duration. The exhaust port degree-area 261 may also have a higher maximum exhaust port degree-area 262 than what the modulated exhaust port degree-area 263 may achieve. However, the modulated exhaust port degree-area 263 may retain a similar starting slope, ending slope, and general overall shape showing that the result may be a scaled version of the exhaust port degree-area 261. Implementing this second variable valve example may also affect combustion chamber blow down if there is little or no exhaust/intake overlap area 267. If the blow down does not occur, more exhaust gases will be retained into the next cycle, increasing EGR. Increased EGR will reduce peak combustion temperatures, but may result in less power as there will be less fuel required.

It may be appreciated that this variable port timing/duration rotary gate 250 may be implemented as a simple two-position system, or it may be implemented with a variable position second actuator 249 that would allow several different positions and resulting port areas. It may also be appreciated that the variable port timing/duration rotary gate 250 may be moved multiple times per crank rotation to provide a function comparable to continuously variable valve duration (CVVD) that may function more real-time. This would provide the ability to change the start, stop, and area that affects the overall port open duration. It may be actuated intermittently after a determined number of cycles dependent upon changing engine operating conditions and determined adjustments. It may be appreciated that either slide or rotary modulation methods may be applied to intake and/or exhaust ports. It also may be appreciated that slide and/or rotary modulation methods may be applied to either the apex port edge 247 or the leading/trailing port edge 246. It also may be appreciated that the variable port timing/duration rotary gate 250 may block some or even all of the port, which may be advantageous when more than one combustion exhaust port 41 is used, such as in opposing side plates. It also may be appreciated that the ECU (not shown) may implement a closed loop system to validate and correct the position of the variable port timing/duration rotary gate 250. It also should be appreciated that either or both side plates or similar housing structure including the ports or parts of the ports may implement one or more variable port modulation methods.

Figure 36:
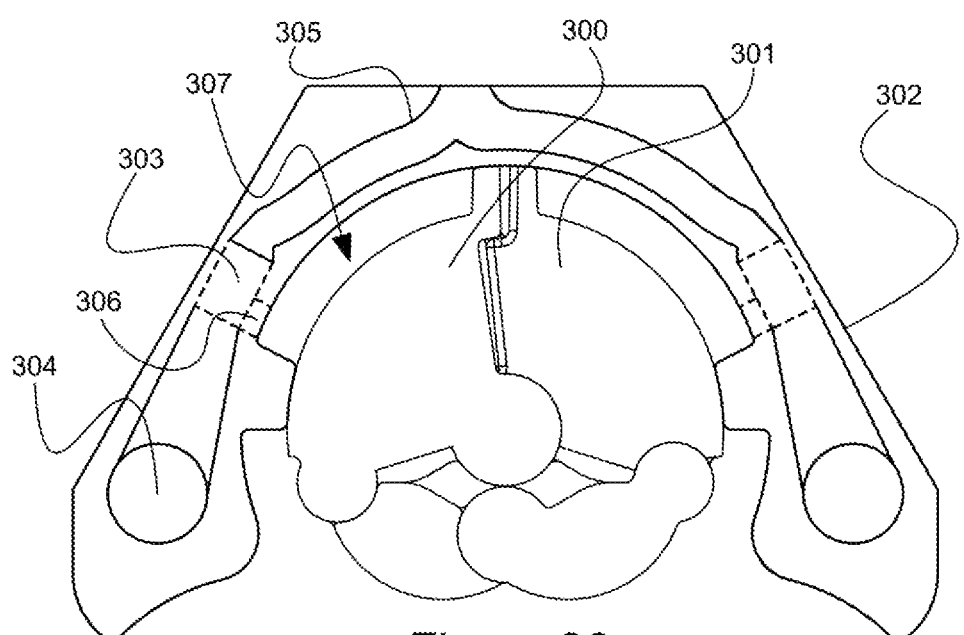
FIG. 36 is a plan view of an alternative embodiment of the invention including finless vanes.

Another alternative embodiment of the invention is depicted in FIG. 36. This embodiment allows for larger supercharge air volumes within the same space by eliminating the fins on the vanes to produce the finless type-A vane 300 and the finless type-B vane 301. A finless internal supercharger chamber 307 may be defined between the two side-plates (not illustrated), the larger bosses located on opposite sides of the horseshoe 302, and the curved outer surfaces of the finless type-A and type-B vanes 300 and 301. Since the vanes do not have fins, there are no slits to allow air in and out at the proper times to accomplish intake, compression, and exhaust. Instead this embodiment employs a double-acting composite valve 303 which communicates with the finless internal supercharger chamber 307 via the communication passage 306. The double-acting composite valve 303 may keep the finless internal supercharger chamber 307 constantly connected with the small volume of air in the communication passage 306. The supercharger chamber 307 may be intermittently connected with (i) no other passage, (ii) the air intake passage 304, or (iii) the compressed air passage 305 when the finless internal supercharger chamber 307 generates a neutral pressure condition, a vacuum/low-pressure condition, or a higher-pressure condition, respectively.

The double-acting valve 303 may be made up of two one-way valves which are oppositely biased, such as, but not limited to: reed valves, ball valves, butterfly valves, flutter valves, valvular conduits or the like, etc. However, the double-acting valve 303 may also utilize a spring-loaded A-B shuttle valve or the like, that is setup with an opposing double spring-biased center position that may supply no connection to the common port while in a neutral pressure condition. The shuttle valve may have a single valve position control port which actuates the valve between the A port and the B port based on vacuum/low-pressure or higher-pressure applied to the control port. The shuttle valve may have the control port and the common port connection connected to the internal supercharger chamber 307 via the communication passage 306, while the A port and the B port are appropriately connected to the air intake passage 304 and the compressed air passage 305, respectively.

With renewed reference to FIG. 1 and with renewed reference to the previous discussion accompanying this figure, the engine may incorporate two variable volume combustion chambers per layer. With renewed reference to FIG. 3, each layer may contain two variable volume combustion chambers per layer linked by a common drive bar 62 and common cranks 60. The two linked variable combustion chambers may be arranged such that they are mirror images of one another that may be phased 180-degrees apart in their respective cycles. With renewed reference to FIGS. 1 and 3, these layers may furthermore be linked together via common crankshafts 58 and arranged as mirror images back-to-back with a 180-degree phase offset as is evidenced by the locations of the type-B side plates 32 and type-A side plates 31. Such an arrangement configures the top variable volume combustion chamber in one layer being at the same cycle location as the bottom variable volume combustion chamber, but reverses the respective left-side and right-side locations during the mechanism cycle due to the mirroring the layers being back-to-back.

With renewed reference to FIG. 3 and FIGS. 9A through 9I, it can be observed that each of the variable volume combustion chambers per layer nearly balance each other out when phased at 180-degrees as presented. This small imbalance in each layer of the mechanism, when analyzed as a single layer in piecemeal, has motion which may cause the center of mass to orbit about a central point in each layer on a small elliptical path, which is approximately 0.2 inches to approximately 0.5 inches from the central point. The elliptical path may have a larger radius top to bottom than side to side. The central point may be approximately located in-line with the center point of the crankshafts 58 and centered between them, thereby putting it in-line with the kingpins 105 and equidistantly located between them. The center of mass may be located approximately above the central location when the mechanism is rotated at 0 degrees as shown in FIG. 9A. The center of mass may be located more left when the mechanism is rotated at 90 degrees, which is between the depicted positions in FIGS. 9B and 9C. The center of mass may be located approximately below the central location when the mechanism is rotated at 180 degrees as shown in FIG. 9E. The center of mass may be located more to the right of the central location when the mechanism is rotated at 270 degrees as shown in FIG. 9H.

When the two layers of variable volume combustion chambers are configured in a mirrored 180 degree out-of-phase stack, as previously discussed, the overall center of mass is approximately centrally located between the layers and may not deviate from this point as each layer contributes opposing forces from opposing locations. This counterbalance may be achieved without the complication of a double speed spinning balance shaft(s) or counter rotating shafts. This may create an overall well-balanced mechanism, but may still present some reduced vibration and shaking moments due to limited crankshaft deflection loading at the bearings.

However, these deflections are small as the crankshafts are short in length and supported well by bearings in the side plates. There may also be some torsional induced vibration and moments, but these should be small as well due to the short length of the crankshafts. The embodiment may not require a harmonic balancer, but may still benefit from usage of it to reduce design induced torsional harmonics at specific RPMs. The crankshafts are significantly shorter and may be narrower, therefore the crankshafts are stiffer and more resistant to bend and twist. The crankshaft is also sectional between cranks and therefore has significantly higher frequency harmonics that tend to dampen faster depended upon the design and materials implemented.

Boxer configured piston engines innately achieve better balance than most other piston configurations. Boxer configurations require smaller counterweights than other configurations and due to this improvement, these configurations tend to also perform well in higher RPM implementations. Boxer engines have the advantages of better primary and secondary balance and a low center of gravity. However, the Boxer configuration does not have the opposing piston cylinders directly in-line with each other. Therefore, this engine configuration induces a significant rocking couple. This requires a stiffer casting between cylinders which may compromise cooling designs and may require larger engine mounts to provide stiffness against this rocking couple while providing enough dampening to not transmit such vibrations to the chassis.

The Boxer engine configuration has the disadvantage of the added complexity from two cylinder-heads and the associated valve trains for each. This increases manufacturing cost and requires a higher component count to build the engine when compared with other piston-based configurations. It also has an engine footprint that is wider with a larger side-to-side engine bay space requirement and the complications of performing maintenance in a tighter engine bay when wheel axles are short. This is also frequently further complicated by the use of turbo-chargers and the additional plumbing required to route exhaust and intake pipes from each side of the engine.

With renewed reference to FIGS. 1 through 4, the dual opposing chamber configuration is similar in many respects to a piston-based Boxer engine configuration. As previously discussed, the variable volume combustion chambers present a well-balanced mechanism when compared with even the best piston-based implementations. Therefore, it may have a smaller rocking couple located between these back-to-back layers when configured as four variable volume combustion chambers with two chambers in two different true planar layers. These layers may be configured 180 degrees out of phase, so that the rocking couple is located between the layers within the side-plate structure of the engine and not through any shafts. This allows embodiments of the present invention to be stiffened against this smaller rocking couple while requiring less bracing in and about the shafts.

Therefore, some embodiments of the present invention may build on the advantages of a Boxer engine configuration and eliminate several of the disadvantages. Some embodiments may have an overall lower component count than traditional piston engine designs and a much lower component count than Boxer configurations. Also, there is no need for two complex valve trains, or any valve trains at all unless variable valve timing is desired. This advantage is due to the use of wall ports instead of poppet valves with an associated valve train(s).

Figure 37:
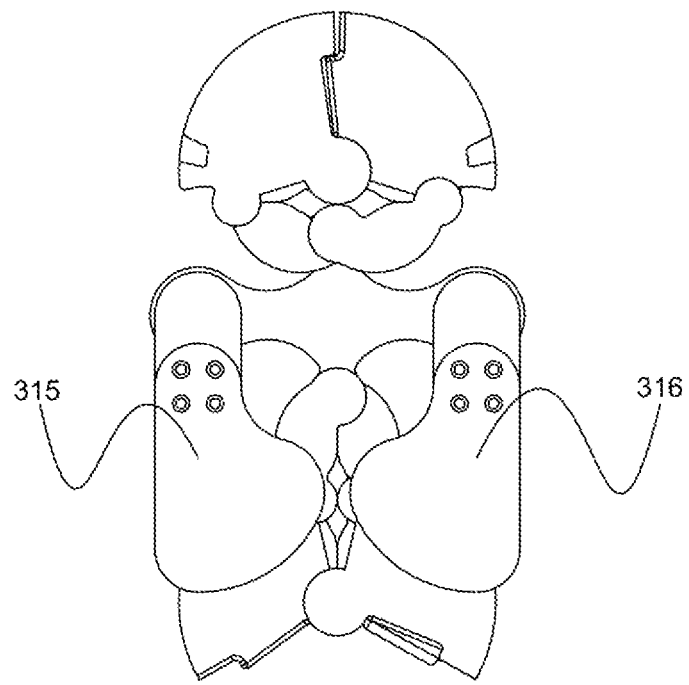
FIG. 37 is a plan view of a vane and crank assembly having ax-head shaped crank counterweights in accordance with an embodiment of the invention.
Figure 38:
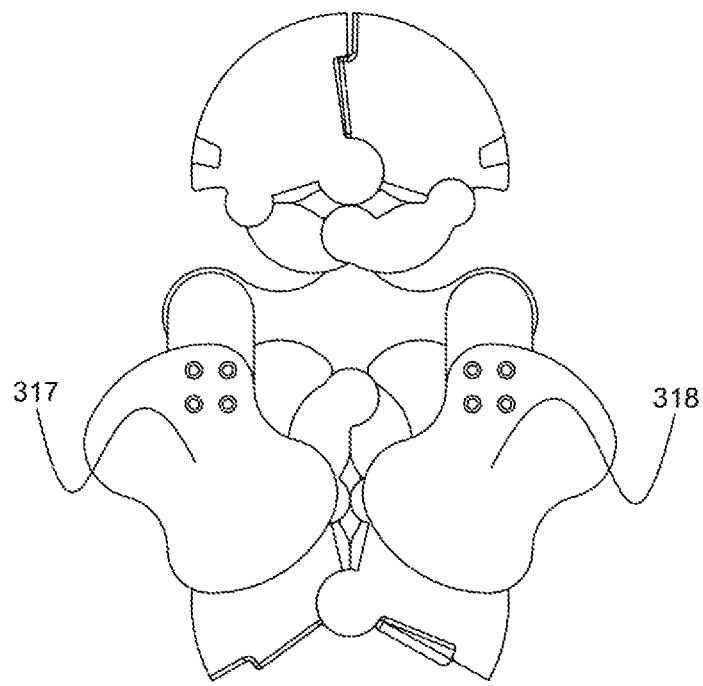
FIG. 38 is a plan view of a vane and crank assembly having figure-eight shaped crank counterweights in accordance with an embodiment of the invention.

FIGS. 37 and 38 depict embodiments of the invention that include two beneficial counter-weight shapes that may be used when an engine is configured with an odd number of layers, for example with one or three layers. In such configurations it is not possible to have mirrored pairs, however different phasing between layers may assist balance. The illustrated counterweight shapes take advantage of opposing forces from oppositely phased secondary mass lobes. In FIG. 37, the ax-head counterweights 315 and 316 may essentially be opposite hand versions of each other, which when rotated in angular sync cause the opposing secondary counterweight lobes to oppose each other. These secondary mass lobes are integral with the primary mass on the counterweight, both of which are located distant from the axis of rotation at the crankshaft. When the angularly synchronized crankshafts rotate the rigidly affixed counterweights; the primary masses, which are shown as downward facing in the illustration, stay in phase with each other and counter-balance the larger up-down center of mass radius of orbit. The out-of-phase secondary weights oppose each other, depicted as a right lobe on the type-A ax-head counterweight 315 and a left lobe on the type-B ax-head counterweight 316. As the crankshafts rotate in angular sync, the out-of-phase secondary masses will continue to oppose each other. This assists in reducing the smaller left-right center of mass radius of orbit. In FIG. 38, a similar strategy is employed with the type-A figure-eight counter weight 317 and the type-B figure-eight counterweight 318. However, this style of counterweight also employs an additional third lobe of opposing mass which is close to the axis of rotation at the crankshaft and diagonally opposite from the secondary mass lobe. This reduces the smaller left-right center of mass radius of orbit to a greater degree, which may primarily be due to the motion of the variable volume combustion chamber across the hot and cold sides of the combustion chambers. Such counterweights are best applied at the cranks themselves if designed for such space allowances. However, counterweights may be applied, as illustrated, to the four crankshafts at the cost of extra bearing pressure. While the figure-eight counterweights transfer the most torque to the crankshaft and also provide significant weight for an integrated flywheel, this shape may impose the most force on the crankshaft bearings with a large form of the force being thrust.

Both designs may reduce the vibration and shaking moments induced by running odd numbers of layers. However, it may be beneficial to apply smaller mass counterweights on even numbers of layer applications with large power stroke forces, that may be intended to operate at higher RPMs for longer durations. These counterweights may also be beneficial in embodiments that utilize odd numbers of variable volume combustion chambers per layer which is possible but not presented in the illustrations.

As will be understood by those skilled in the art, the invention may be embodied in other specific forms without departing from the spirit or essential characteristics thereof. The elements described above are illustrative examples of one technique for implementing the invention. One skilled in the art will recognize that many other implementations are possible without departing from the intended scope of the present invention as recited in the claims. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed is:
1. A variable volume chamber device comprising:
a housing;
an assembly including a first vane, a second vane, a third vane, and a fourth vane disposed within said housing,
wherein the first vane is pivotally connected to the second vane at a fixed location relative to the housing,
wherein the second vane is pivotally connected to the third vane,
wherein the third vane is pivotally connected to the fourth vane,
wherein the fourth vane is pivotally connected to the first vane, and wherein said assembly defines a variable volume chamber.

2. The variable volume chamber device of claim 1 further comprising inlet and outlet ports provided in said housing wherein the locations of said inlet and outlet ports are configured to permit the device to operate as a four-cycle internal combustion engine.

3. The variable volume chamber device of claim 1 further comprising inlet and outlet ports provided in said housing wherein the locations of said inlet and outlet ports are configured to permit the device to operate as a two-cycle internal combustion engine.

4. The variable volume chamber device of claim 1, further comprising:
an inlet port provided in the housing communicating with the variable volume chamber;
a first rotary valve disposed in the housing adjacent to the inlet port;
an outlet port provided in the housing communicating with the variable volume chamber; and
a second rotary valve disposed in the housing adjacent to the outlet port;
wherein the first rotary valve is configured to expose and block the inlet port from communicating with the variable volume chamber at least twice per rotation of a device crankshaft; and
wherein the second rotary valve is configured to expose and block the outlet port from communicating with the variable volume chamber at least twice per rotation of the device crankshaft.

5. The variable volume chamber device of claim 1 wherein at least two of the first, second, third and fourth vanes are of unequal length as measured between centers of pivotal connections for a vane.

6. The variable volume chamber device of claim 1 wherein at least a first one of the first, second, third and fourth vanes are comprised of a first piece and a second piece.

7. The variable volume chamber device of claim 6 further comprising:
a pin fixed to a first outer boss provided on the first piece and a second outer boss provided on the second piece.

8. The variable volume chamber device of claim 7 further comprising inlet and outlet ports provided in said housing wherein the locations of said inlet and outlet ports are configured to permit the device to operate as a two-cycle internal combustion engine.

9. The variable volume chamber device of claim 7, further comprising:
an inlet port provided in the housing communicating with the variable volume chamber;
a first rotary valve disposed in the housing adjacent to the inlet port;
an outlet port provided in the housing communicating with the variable volume chamber; and
a second rotary valve disposed in the housing adjacent to the outlet port;
wherein the first rotary valve is configured to expose and block the inlet port from communicating with the variable volume chamber at least twice per rotation of a device crankshaft; and
wherein the second rotary valve is configured to expose and block the outlet port from communicating with the variable volume chamber at least twice per rotation of the device crankshaft.

10. The variable volume chamber device of claim 1 further comprising:
a side plate forming a portion of the housing;
an outlet port provided in the side plate; and
a side plate insert contacting the side plate adjacent to the outlet port, said side plate forming a wall portion for said variable volume chamber.

11. The variable volume chamber device of claim 10 wherein the side plate comprises a first material and wherein the side plate insert comprises a material selected from the group consisting of: a material other than the first material, coated first material, and plated first material.

12. The variable volume chamber device of claim 10 wherein the side plate insert comprises material configured to provide a thermal barrier.

13. The variable volume chamber device of claim 1 further comprising:
an inlet or outlet port provided in the housing communicating with the variable volume chamber;
a blocking member provided adjacent to the inlet or outlet port, said blocking member configured to selectively block a variable portion of the inlet or outlet port; and
an actuator connected to the blocking member.

14. The variable volume chamber device of claim 13 wherein the blocking member is a slide gate.

15. The variable volume chamber device of claim 13 wherein the blocking member is a rotary gate.

16. The variable volume chamber device of claim 13 further comprising an engine control unit (ECU) connected to the actuator, said ECU configured to provide variable valve actuation control for the actuator.

17. The variable volume chamber device of claim 1, further comprising:
first and second crankshafts connected to the assembly;
a first counterweight with an offset mass connected to the first crankshaft; and
a second counterweight with an opposite hand offset mass connected to the second crankshaft,
wherein the offset mass and the opposite hand offset mass oppose each other as the first and second crankshafts rotate.

18. The variable volume chamber device of claim 17, further comprising:
a tertiary offset mass provided on the first counterweight; and
an opposite hand tertiary offset mass provided on the second counterweight.

19. The variable volume chamber device of claim 1, further comprising:
first and second crankshafts connected to the assembly;
a first offset crank firmly affixed to a first crankshaft;
a second offset crank firmly affixed to a second crankshaft; and
a drive bar pivotally connected to the first and second offset cranks.

20. The variable volume chamber device of claim 1, further comprising:
a supercharger chamber formed in the housing; and
a double-acting composite valve disposed between the supercharger chamber and an ambient environment.

21. The variable volume chamber device of claim 20, further comprising:
an air intake passage provided in the housing, said air intake passage connected to the ambient environment; and
a compressed air passage provided in the housing,
wherein the double-acting composite valve is configured to intermittently connect to the air intake passage and the compressed air passage.

22. In an internal combustion engine experiencing, in relative terms, repeated and sequential cool inlet events and hot combustion events, the method of:
- repeatedly moving a variable volume chamber to a first engine region for the cool inlet events; and
- repeatedly moving the variable volume chamber to a second engine region for hot combustion events.

23. A variable volume chamber device comprising:
- an engine, pump, or compressor housing;
- a variable volume chamber provided in the housing;
- an inlet or outlet port provided in the housing communicating with the variable volume chamber;
- a slide gate or a rotary gate provided adjacent to the inlet or outlet port, said slide gate or rotary gate configured to selectively block a variable portion of the inlet or outlet port; and
- an actuator connected to the slide gate or rotary gate.

* * * * *